United States Patent
Bowers

(10) Patent No.: US 7,828,551 B2
(45) Date of Patent: Nov. 9, 2010

(54) METHOD AND SYSTEM FOR COMPUTER BASED TESTING USING CUSTOMIZABLE TEMPLATES

(75) Inventor: Clarke Daniel Bowers, Baltimore, MD (US)

(73) Assignee: Prometric, Inc., Baltimore, MD (US)

( * ) Notice: Subject to any disclaimer, the term of this patent is extended or adjusted under 35 U.S.C. 154(b) by 1036 days.

(21) Appl. No.: 10/292,897

(22) Filed: Nov. 13, 2002

(65) Prior Publication Data

US 2003/0203342 A1 Oct. 30, 2003

Related U.S. Application Data

(60) Provisional application No. 60/331,228, filed on Nov. 13, 2001.

(51) Int. Cl.
*G09B 11/00* (2006.01)
(52) U.S. Cl. ............... 434/118; 434/323; 717/124; 715/243
(58) Field of Classification Search ........... 434/323, 434/350, 353, 365, 322, 362, 118, 307 R; 717/124, 125
See application file for complete search history.

(56) References Cited

U.S. PATENT DOCUMENTS

| | | | |
|---|---|---|---|
| 5,157,782 A | 10/1992 | Tuttle et al. | |
| 5,195,033 A | 3/1993 | Samph et al. | |
| 5,318,450 A | 6/1994 | Carver | |
| 5,359,546 A | 10/1994 | Hayes et al. | |
| 5,513,994 A | 5/1996 | Kershaw et al. | |
| 5,565,316 A | 10/1996 | Kershaw et al. | |
| 5,629,878 A | 5/1997 | Kobrosly | |
| 5,743,743 A | 4/1998 | Ho et al. | |
| 5,827,070 A | 10/1998 | Kershaw et al. | |
| 5,854,930 A | 12/1998 | McLain, Jr. et al. | |
| 6,000,945 A | 12/1999 | Sanchez-Lazer et al. | |
| 6,018,617 A | 1/2000 | Sweitzer et al. | |
| 6,029,257 A | 2/2000 | Palmer et al. | |
| 6,112,049 A | 8/2000 | Sonnenfeld | |

(Continued)

OTHER PUBLICATIONS

May 12, 2003, International Search Report, from PCT/US02/36287.

(Continued)

*Primary Examiner*—Kathleen Mosser
(74) *Attorney, Agent, or Firm*—Wilmer Cutler Pickering Hale and Dorr LLP

(57) ABSTRACT

A system for computer-based testing includes a test driver that delivers the test to an examinee using a display device and controls progression of the test, a template module that stores presentation format information comprising the presentation format of the test, the presentation format information being accessible to the test driver, and a data module that stores data content information comprising the data content of the test, the data content information being accessible to the test driver, the presentation format information combining with the data content information to create the presentation format and the data content of the test. A method of computer-based testing includes retrieving presentation format information from a template module, the presentation format information dividing the display device into a predetermined number of areas in a predetermined arrangement, retrieving data content information from a data module, and combining the presentation format information and the data content information to create the presentation format and data content of the test.

69 Claims, 61 Drawing Sheets

U.S. PATENT DOCUMENTS

| | | | |
|---|---|---|---|
| 6,138,252 | A | 10/2000 | Whitten et al. |
| 6,149,438 | A | 11/2000 | Richard et al. |
| 6,149,441 | A | 11/2000 | Pellegrino et al. |
| 6,243,835 | B1 | 6/2001 | Enokido et al. |
| 6,289,472 | B1 | 9/2001 | Antheunisse et al. |
| 6,418,298 | B1 | 7/2002 | Sonnenfeld |
| 6,431,875 | B1 | 8/2002 | Elliott et al. |
| 6,505,342 | B1 | 1/2003 | Hartmann et al. |
| 6,632,248 | B1 * | 10/2003 | Isaac et al. .................. 715/273 |
| 6,681,098 | B2 | 1/2004 | Pfenninger et al. |
| 6,704,741 | B1 | 3/2004 | Lively, Jr. et al. |

OTHER PUBLICATIONS

Mar. 14, 2003, International Search Report, from PCT/US02/36286.
Mar. 13, 2003, International Search Report, from PCT/US02/36288.
Jan. 27, 2003, International Search Report, from PCT/US02/36264.

* cited by examiner

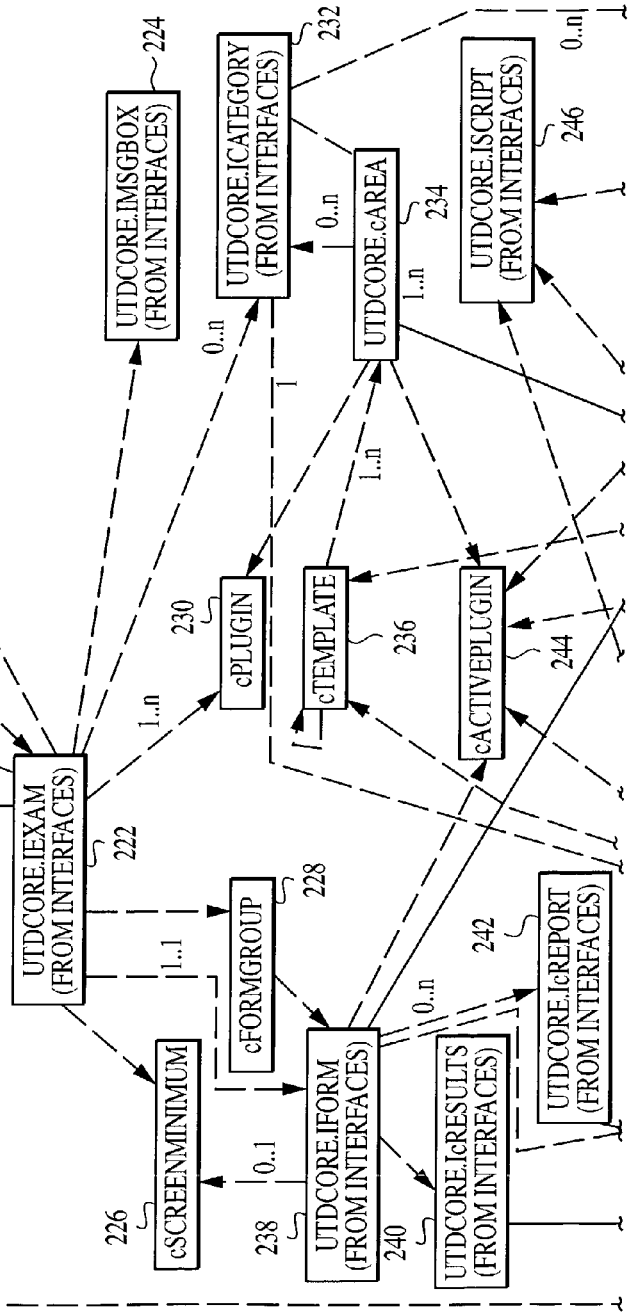

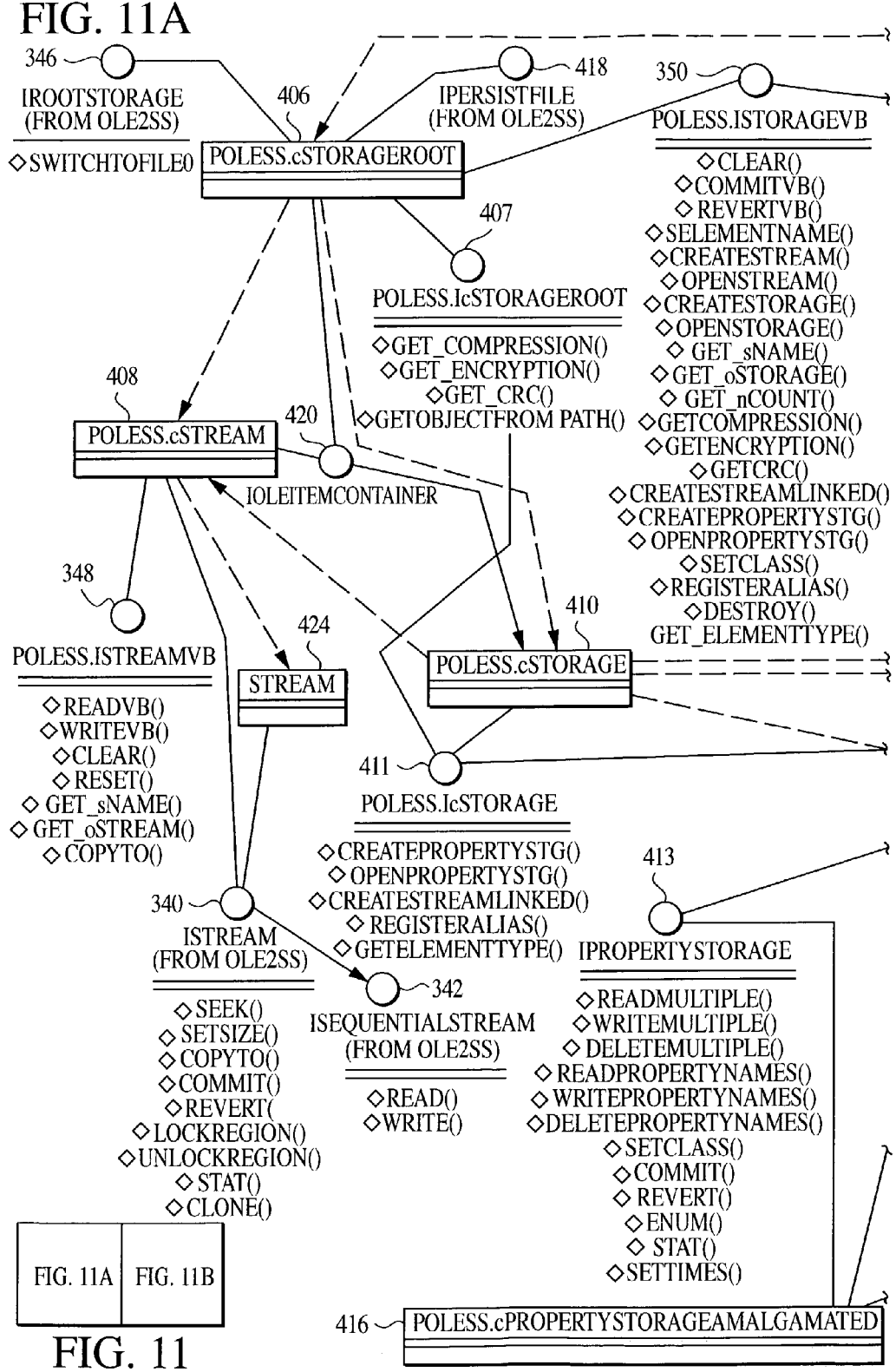

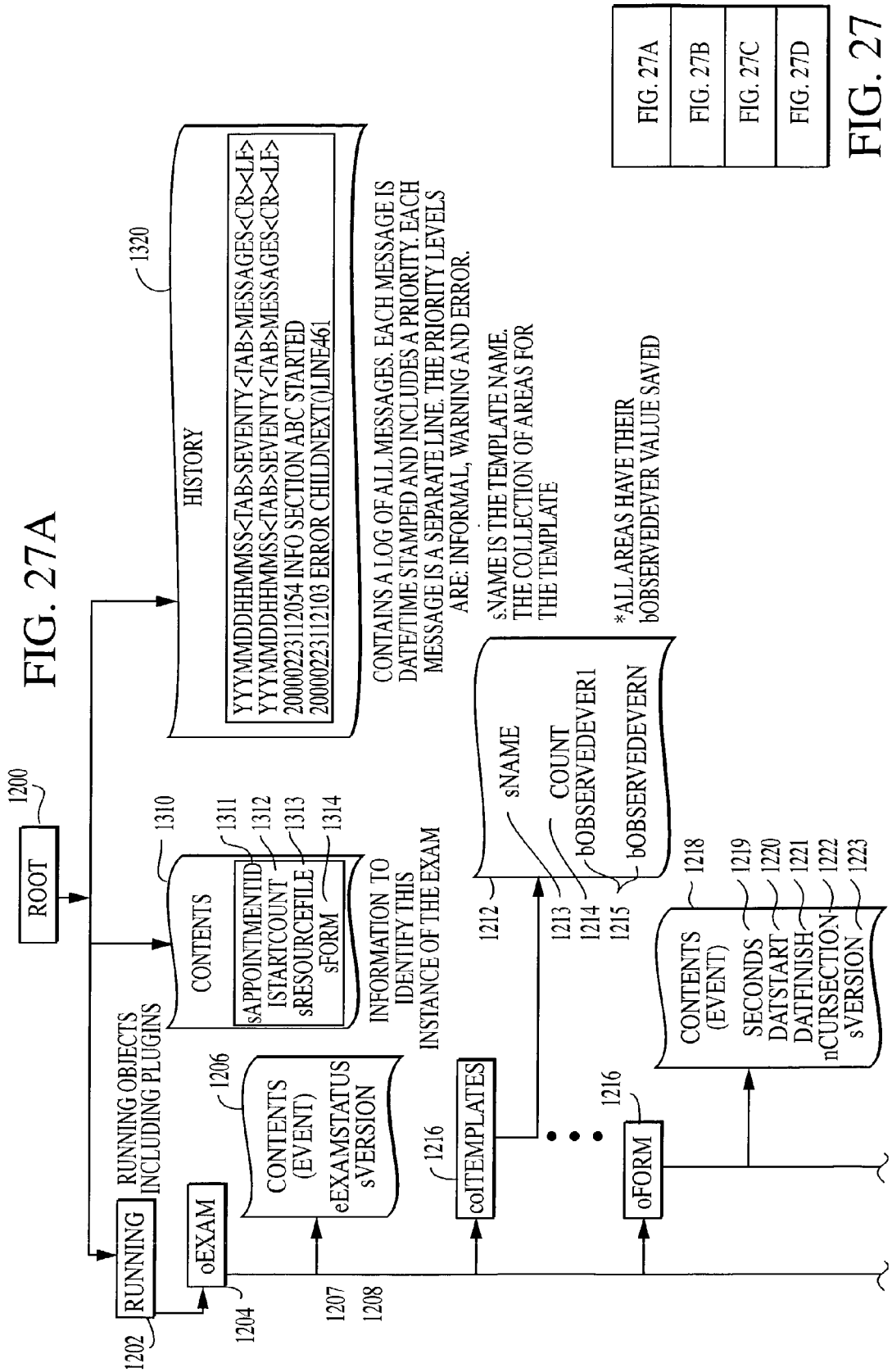

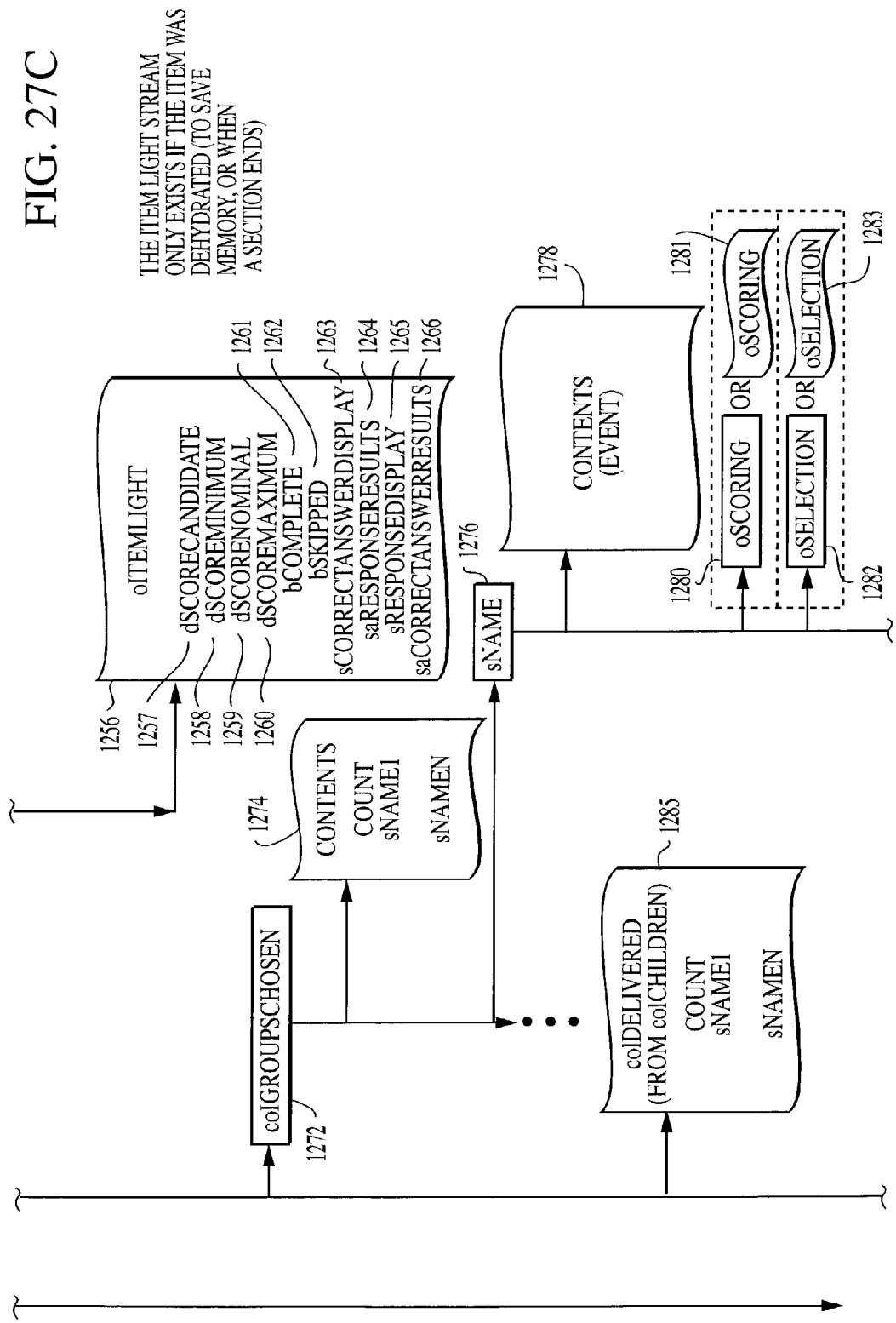

DELIVERY METHOD

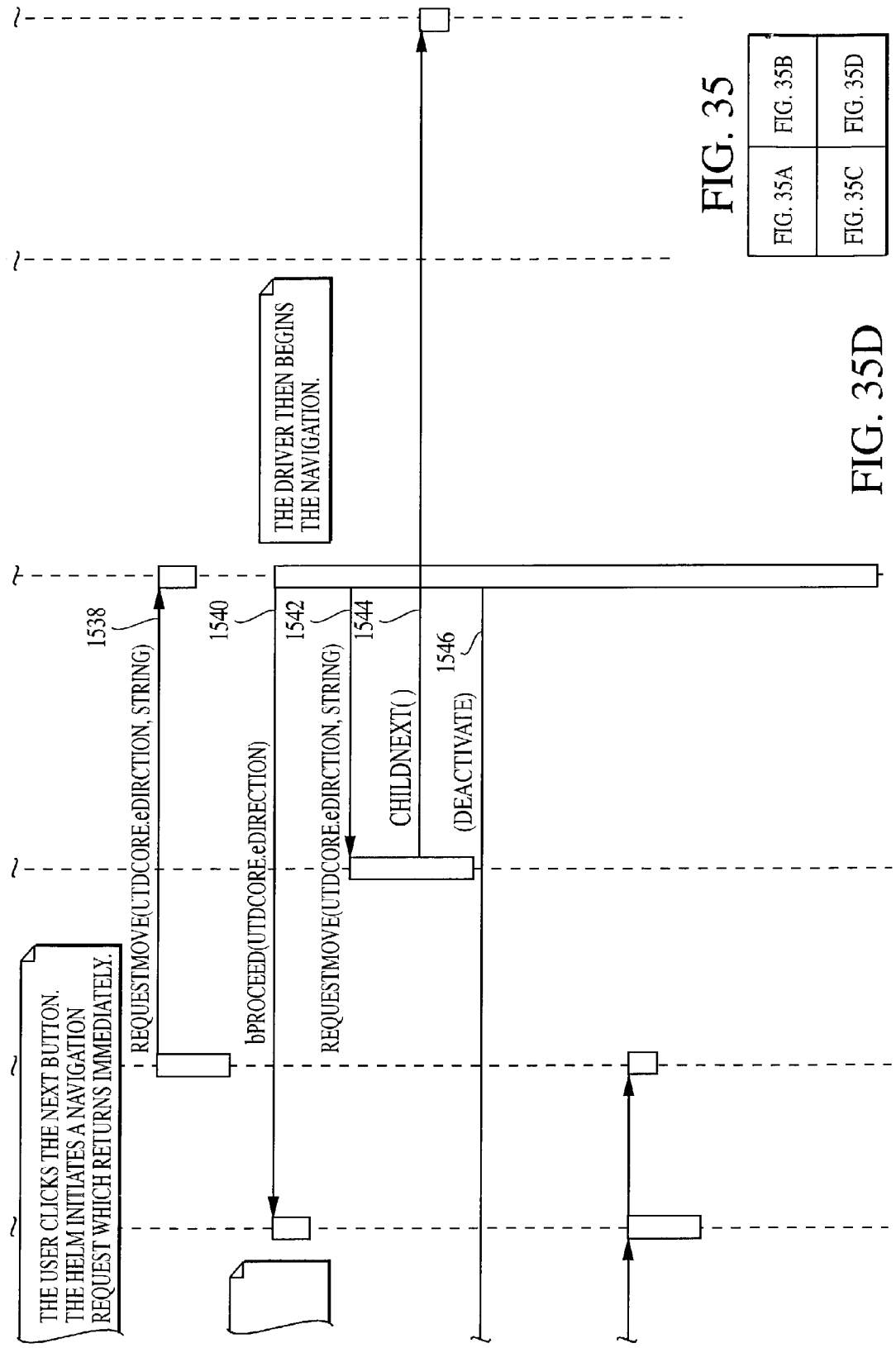

HOW DO YOU FEEL TODAY?

A. HAPPY

B. SAD

C. A BIT KYLISH

PROTOTYPE SPREADSHEET ITEM PLUG-IN

EXAM ITEM 5 OF 6    NASD DEMONSTRATION EXAMINATION    JOHN KENNEDY    TIME REMAINING: 27:06

FILL IN THE SPREADSHEET

ANALYZE THE WORKSHEET BELOW AND ADD/REVISE AS NECESSARY

| | A | B | C | D | E | F | G | H |
|---|---|---|---|---|---|---|---|---|
| 24 | SENIOR SUBORDINATED DEBENTURES | $260,140 | | | | | | |
| 25 | SUBORDINATED NOTES | $85,000 | | | | | | |
| 26 | DEFERRED TAXES PAYABLE | $8,437 | | | | | | |
| 27 | OTHER LONG-TERM OBLIGATIONS | $18,229 | | | | | | |
| 28 | DEFERRED GAIN ON SALE OF ASSETS | $10,269 | | | | | | |
| 29 | STOCKHOLDERS' EQUITY | =SUM(B17:B28) | | | | | | |
| 30 | PREFERRED STOCK, $1 PER VALUE, 10,000,000 SHARES AUTHORIZED: NONE ISSUED | | | | | | | |
| 31 | COMMON STOCK AT PAR ($0.01 PAR VALUE, AUTHORIZED 50,000,000 SHARES: ISSUED | $216 | | | | | | |
| 32 | CAPITAL IN EXCESS OF PAR VALUE | $107,292 | | | | | | |
| 33 | CUMULATIVE FOREIGN CURRENCY TRANSLATION ADJUSTMENT | $2,545 | | | | | | |
| 34 | RETAINED EARNINGS | $111,565 | | | | | | |
| 35 | TOTAL STOCKHOLDERS' EQUITY | $221,618 | | | | | | |

REAL & ACTIVE EXCEL SPREADSHEET

FULLY EMBEDDED & CONTROLLED BY THE TEST DRIVER

⬅ PREVIOUS    ! FLAG    👓 REVIEW    NEXT ➡

FIG. 47

METHOD AND SYSTEM FOR COMPUTER BASED TESTING USING CUSTOMIZABLE TEMPLATES

CROSS REFERENCE TO RELATED APPLICATIONS

This application is related to and claims the priority of U.S. Provisional Application Ser. No. 60/331,228, filed Nov. 13, 2001 and incorporated herein by reference, and is further related to: U.S. patent application entitled "EXTENSIBLE EXAM LANGUAGE (XXL) PROTOCOL FOR COMPUTER BASED TESTING" and having inventors Clarke Daniel Bowers, Tronster Maxwell Hartley, Kyle Michael Kvech, and William Howard Garrison U.S. patent application Ser. No. 10/292,911, filed Nov. 13, 2002; U.S. patent application entitled "METHOD AND SYSTEM FOR COMPUTER BASED TESTING USING PLUGINS TO EXPAND FUNCTIONALITY OF A TEST DRIVER" and having inventor Clarke Daniel Bowers U.S. patent application Ser. No. 10/292,913, filed Nov. 13, 2002; U.S. Pat. No. 6,966,048, filed Nov. 13, 2002, entitled "METHOD AND SYSTEM FOR COMPUTER BASED TESTING USING A NON-DETERMINISTIC EXAM EXTENSIBLE LANGUAGE (XXL) PROTOCOL" and having inventor Clarke Daniel Bowers; and U.S. Pat. No. 6,948,153, filed Nov. 13. 2002, entitled "METHOD AND SYSTEM FOR COMPUTER BASED TESTING USING AN AMALGAMATED RESOURCE FILE" and having inventor Clarke Daniel Bowers all of which are being filed concurrently herewith and all of which are incorporated by reference in their entirety herein.

BACKGROUND OF THE INVENTION

1. Field of the Invention

The present invention generally relates to the field of computer-based testing, and in particular, the present invention relates to customizing a visual presentation of a computer-based test using templates that define a presentation format of the computer-based test and plugins that contain data content of the computer-based test.

2. Background of the Related Art

For many years, standardized testing has been a common method of assessing examinees as regards educational placement, skill evaluation, etc. Due to the prevalence and mass distribution of standardized tests, computer-based testing has emerged as a superior method for providing standardized tests, guaranteeing accurate scoring, and ensuring prompt return of test results to examinees.

Tests are developed based on the requirements and particulars of test developers. Typically, test developers employ psychometricians or statisticians and psychologists to determine the specific requirements specific to human assessment. These experts often have their own, unique ideas regarding how a test should be presented and regarding the necessary contents of that test, including the visual format of the test as well as the data content of the test. Therefore, a particular computer-based test has to be customized to fulfill the client's requirements.

FIG. 1 illustrates a prior art process for computerized test customization, denoted generally by reference numeral 10. First, a client details the desired test requirements and specifications, step 12. The computerized test publisher then creates the tools that allow the test publisher to author the items, presentations, etc., required to fulfill the requirements, step 14. The test publisher then writes an item viewer, which allows the test publisher to preview what is being authored, step 16.

An item presenter is then written to present the new item, for example, to the test driver, step 18. Presenting the new item to the test driver requires a modification of the test driver's executable code. The test driver must be modified so that it is aware of the new item and can communicate with the new item presenter, step 20. The test packager must then also be modified, step 22. The test packager, which may also be a compiler, takes what the test publisher has created and writes the result as new object codes for the new syntax. Subsequently, the scoring engine must also be modified to be able to score the new item type, step 24. Finally, the results processor must be modified to be able to accept the new results from the new item, step 26. This process requires no less than seven software creations or modifications to existing software.

Previous test drivers had a fixed look and feel to the visual presentation of tests. For example, if a particular test driver was programmed to present navigation buttons on the bottom of the test screen or to place the title bar at the top of the screen, every test delivered by that test driver would have the identical visual presentation. However, as stated previously, a client might wish to modify or customize the visual presentation of a test. A client might desire customization for psychometric reasons; for example, the client knows that examinees function better with exams presented in a particular way. Or, a client might want a particular visual presentation for a test for marketing reasons. In previous computer-based tested systems, the test driver would have to undergo massive reprogramming, as described above, in order to accommodate a particular client's wishes.

U.S. Pat. No. 5,827,070 (Kershaw et al.) and U.S. Pat. No. 5,565,316 (Kershaw et al.) are incorporated herein by reference. The '070 and '316 patents, which have similar specifications, disclose a computer-based testing system comprising a test development system and a test delivery system. The test development system comprises a test document creation system for specifying the test contents, an item preparation system for computerizing each of the items in the test, a test preparation system for preparing a computerized test, and a test packaging system for combining all of the items and test components into a computerized test package. The computerized test package is then delivered to authorized examinees on a workstation by the test delivery system.

FIGS. 2A and 2B illustrate the screen format during a delivery unit and the testing tools utilized in the control area, respectively, as disclosed in the '070 and '316 patents. The screen format during a delivery unit is preferably divided into three main sections; a title line 30, an item presentation area 32, and a primary control area 34 as illustrated in FIG. 2A. The title line 30 is preferably presented as one solid gray bar at the top of the screen. It should be understood that numerous other color combinations are possible. The title line 30 is capable of displaying various information comprising the test or taking the test. For instance, the title line 30 may include the time remaining in the test or test section. Preferably, time is displayed automatically although an examinee may optionally turn it off. In a preferred embodiment, remaining time is displayed left justified on the title line 30 in HH:MM format until the last few minutes of the test. At that point, the display format changes to MM:SS and flashes for three seconds so that the examinee is alerted that the time remaining for taking the test is nearly over. Other information in the title line 30 may include the name of the computerized test and program-specified text pertinent to what is being presented (e.g., section name). Information to help orient the examinee is also preferably displayed in title line 30. For instance, when an item or tutorial screen is displayed in the presentation area 32, the notation "xx of yy" or "xx" appears in title line 30. The "xx" refers to the item number within the test or section, or the screen within the tutorial. The "yy" indicates the total number of items in the test or section, or screens within the tutorial. Additional orientation information to be provided to the examinee in the title line 30 may include the descriptive word such as "HELP" "REVIEW" and "DIRECTION" to indicate a currently displayed screen.

The presentation area 32 of the screen is used to display items screen such as the text and graphics and non-item screens such as direction screens, message screens, HELP screens and REVIEW screens. Direction screens are used to display directions for the test, section, and others. Message screens display information and examinee options at transition points during the test session to control the flow of the test. Transition points indicate where a new section or new item is to be displayed or when the test delivery application moves from an item screen to a non-item screen. HELP screens and REVIEW screens respectively enable an examinee to interact with the HELP and REVIEW facilities.

The primary control area 34 preferably provides testing tools for giving the examinee a degree of control over the testing session. In a preferred embodiment, there are ten testing tools (also referred to as "primary controls"). Each tool has its own icon. Icons are pictorial representation of a function available to a user, which can be activated by selecting that icon. Referring to FIG. 2B, the NEXT icon 54, the PREV icon 52, the REVIEW icon 42 and HELP icon 50 can be used by the examinee to move from one screen to another screen. When the NEXT icon 54 is selected, the examinee can move on to the next screen. Selecting the PREV icon 52 enables the examinee to move back to the previous screen. The HELP icon 50 can be selected by the examinee to invoke the HELP facility. When HELP is invoked, the examinee moves to a HELP screen to retrieve previously presented direction and information about topics covered in the tutorials. The examinee is returned to the screen from which HELP was invoked when the Help screen is exited. The MARK icon 44 enables the examinee to mark an item for review. In a preferred embodiment, both answered and unanswered items can be marked. A marked item is indicated on an item screen by displaying a checkmark in the MARK icon 44. The checkmark may also appear next to the marked item in the Review screen when the REVIEW facility is invoked after an item has been marked. The examinee can unmark an item by clicking on the MARK icon 44 a second time. However, preferably the examinee need not unmark items in order to leave a section. The REVIEW icon 42, when selected, presents the review screen to the examinee listing the items in the section in the order they were presented to the examinee, along with any group or set paraphrase associated with item and an indication of whether the item has been marked by the examinee from the item screen. The examinee then has the ability to go directly to any item in a test section by clicking, as described above. Preferably, the examinee can invoke the REVIEW facility from any item screen, and the REVIEW screen will display the status of all the items in the section regardless of whether all of the items had been presented. In a further preferred embodiment, the examinee may skip some items by advancing to a subsequent item. The ERASE icon 46 enables the examinee to reset all selected choices for the current item to their original state. The TIME icon 40 allows the examinee to turn on and off the remaining time display in the title line 30. The EXIT icon 38 allows the examinee to leave the current section of the test. The QUIT icon 36 allows the examinee to quit the test. The CALC icon 48 allows the examinee to use on-screen calculator.

A testing tool is said to exist if it appears on every screen. The existence of each of the depicted icons; PREV, CALC, QUIT, EXIT, TIME, REVIEW, MARK and ERASE is specified by each test script or the section configuration file. The NEXT and HELP tools preferably exist in all tests. Testing tools that do not exist should not appear on the screen, and in a preferred embodiment, the location of the remaining tools is adjusted to close any gaps left by non-existent tools. Test scripts can define the existence of tools to limit the ways in which examinees can navigate through the test. For example, a program can define a forward-progression-only test by eliminating the PREV and REVIEW tools. A testing tool is said to be available if it exists and can be used. Preferably, a testing tool is displayed in black if available and in gray when it is not. For instance, in preferred embodiments, the NEXT icon 54, the PREV icon 52, ERASE icon 46, MARK icon 44, and the CALC icon 48 are available only from item screens. However, the HELP icon 50 is available from all screens. The REVIEW icon 42 is available from item screens and group or set directions screens while the TIME icon 40 may or may not be available from directions screens depending upon whether the section configuration file indicates timing is to start before or after the presentation of directions.

U.S. Pat. No. 5,513,994 (Kershaw et al.), which is incorporated herein by reference, discloses a centralized administrative system and method of administering standardized test to a plurality of examinees. The administrative system is implemented on a central administration workstation and at least one test workstation located in different rooms at a test center. The administrative system software, which provides substantially administrative functions, is executed from the central administration workstation. The administrative system software, which provides function carried out in connection with a test session, is executed from the testing workstations.

None of the Kershaw et al. patents appear to make any mention of how modifications may be made to the computer-based testing system to incorporate a particular client's test specification regarding the visual presentation of the test. The '070 and '316 patents only disclose a screen format that is preferably divided into three main sections: a title line, an item presentation area, and a primary control area, where the control area contains a specific set of non-customizable tools. The patents make no mention of being able to customize, for example, the title line or the primary control area, to allow different versions of these sections to be presented to an examinee during a single test.

What is required is a system that allows the test publisher or publisher to have full control over the visual presentation of the content, navigation controls, titles, and other ancillary display information that are delivered to an examinee during a test.

SUMMARY OF THE INVENTION

It is one feature and advantage of the present invention to enable expansion of a test driver in a computer-based test delivery system without necessitating changes to an executable code of the test driver and without recompiling or re-linking the test driver.

It is another optional feature and advantage of the present invention to facilitate expansion of the test driver using an expansion module.

It is another optional feature and advantage of the present invention to provide test presentation information in an eXam eXtensible test definition language.

It is another optional feature and advantage of the present invention to present a visual format of the test to an examinee using templates that determine the layout of the display device.

It is another optional feature and advantage of the present invention to combine the templates with visible plugins to create presentations to deliver to the examinee during the test.

It is another optional feature and advantage of the present invention to use HTML rendering capabilities and scripts to create the visual format of the test.

It is another optional feature and advantage of the present invention to host Microsoft web browser control to further enable the visual format of the test.

It is another optional feature and advantage of the present invention to use monikers to persist data from an exam resource file to further enable the visual format of the test.

It is another optional feature and advantage of the present invention to expose test driver object models to a scripting environment to further enable the visual format of the test.

These and other features and advantages of the present invention are achieved in a system for computer-based testing for delivering a test to an examinee. The test has a presentation format and data content. The system includes a test driver that delivers the test to an examinee using a display device and controls progression of the test. The system also includes a template module that stores presentation format information comprising the presentation format of the test, the presentation format information being accessible to the test driver. The system further includes a data module that stores data content information comprising the data content of the at least one test, the data content information being accessible to the test driver, the presentation format information combining with the data content information to create the presentation format and the data content of the at least one test.

In another embodiment of the present invention, a system for computer-based testing includes a test driver that delivers the test to an examinee using a display device and controls progression of the test. The system also includes a template module that stores presentation format information comprising the presentation format of the test, the presentation format information being accessible to the test driver. The system further includes a data module that stores data content information comprising the data content of the test, the data content information being accessible to the test driver. The data content information combines with the presentation format information to create the presentation format and data content of the at least one test. The system also includes a resource file that stores the progression of the test, the resource file providing the presentation format information to the template module and providing the data content information to the data module. The system further includes an instance file that stores examination state information comprising responses provided by the examinee to items presented to the examinee during the at least one test.

In another alternative embodiment of the present invention, a system includes a test driver that delivers the at least one test to an examinee using a display device and controls progression of the at least one test. The system also includes a template module that stores presentation format information comprising the presentation format of the at least one test. The presentation format information divides the display device into a predetermined number of areas in a predetermined arrangement and is accessible to the test driver. The system further includes a first data module that stores first information comprising non-interactive display material of the at least one test, the first information being accessible to the test driver and a second data module that stores second information comprising test navigation controls of the at least one test, the second information being accessible to the test driver. The system also includes a third data module that stores third information comprising items of the at least one test, the third information being accessible to the test driver. The first information, the second information, and the third information combine with the presentation format information to create the presentation format and data content of the at least one test such that the non-interactive display material, the test navigation controls, and/or the items comprise separate ones of the predetermined number of areas.

In another alternative embodiment of the present invention, a system includes a test driver that delivers the at least one test to an examinee using a display device and controls progression of the test. The system also includes a template module that stores presentation format information comprising the presentation format of the test, the presentation format information accessible to the test driver. The system further includes a data module that stores data content information comprising the data content of the test, the data content information accessible to the test driver. The system also includes a presentation module that stores presentation information determining what is seen by the examinee on the display device during delivery of the at least one test. The presentation information is defined by combining the presentation format information and the data content information is provided to the test driver such that the test driver provides the presentation information to the examinee using the display device.

In another embodiment of the present invention, a method of computer-based testing is provided for delivering a test to an examinee. The test has a presentation format and data content and is controlled by a test driver, which delivers the test to the examinee using a display device and controls progression of the test. The method includes retrieving presentation format information comprising the presentation format of the at least one test from a template module, the presentation format information dividing the display device into a predetermined number of areas in a predetermined arrangement. The method also includes retrieving data content information comprising the data content of the at least one test from a data module and combining the presentation format information and the data content information to create the presentation format and data content of the at least one test.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIGS. 9A and 9B are schematics illustrating the classes and interfaces that comprise the test driver;

FIGS. 11A and 11B are schematics illustrating the classes and interfaces that comprise the structure storage and associated operations;

FIGS. 27A, 27B, 27C, and 27D are block diagrams of an exam instance file according to the present invention;

FIGS. 35A, 35B, 35C, and 35D are flow diagrams of a process for delivering plugins to an examinee during a computer-based test;

FIG. 41 illustrates how a test definition language is rendered to create a display according to the present invention;

FIG. 45 is an example of a presentation of a multiple choice item using HTML with frames and hyperlinks created according to the present invention;

FIG. 47 is an example of a presentation of an item using an embedded Excel spreadsheet created according to the present invention.

DESCRIPTION OF THE PREFERRED EMBODIMENTS

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The present invention discloses a system and method of computer-based testing using a test driver that is, for example, object-oriented and is architected to dynamically add functionality through, for example, the use of an expansion module, and preferably through the use of plugins. The test driver preferably references component object model servers using standard interfaces, and uses, for example, class names (that can be an Active Document) defined in a custom test definition language entitled eXtensible eXam Language ("XXL") based on eXtensible Markup Language ("XML") format to interact with existing applications while offering the flexibility of allowing development of new plugins. These new plugins can be customized to a client's needs without changing the core test driver. The specific format and protocol of XXL is also described in the co-pending application filed on the same date, entitled "EXTENSIBLE EXAM LANGUAGE (XXL) PROTOCOL FOR COMPUTER BASED TESTING," incorporated herein by reference.

The plugins advantageously enable the test driver to support, for example, new item types, navigation algorithms, information displays, scoring algorithms, timing algorithms, test unit selection algorithms, results persistence reporting, printed score reporting, and/or helm types without change to the test driver's executable. Plugins also allow expansion of the test driver's functionality without requiring the test driver to be recompiled or re-linked, and without requiring the test publisher to learn to program. Since plugins are written independently of the test driver, plugins can be written long after the test driver is built.

The client and the software developer can design and test the plugins and distribute the plugins to each test site. By using this method, large-scale regression testing of other examinations will not usually be necessary unless changes are made to the plugins that may be used by many examinations.

I. Overview of Computer-Based Test Delivery System

Figure 1:
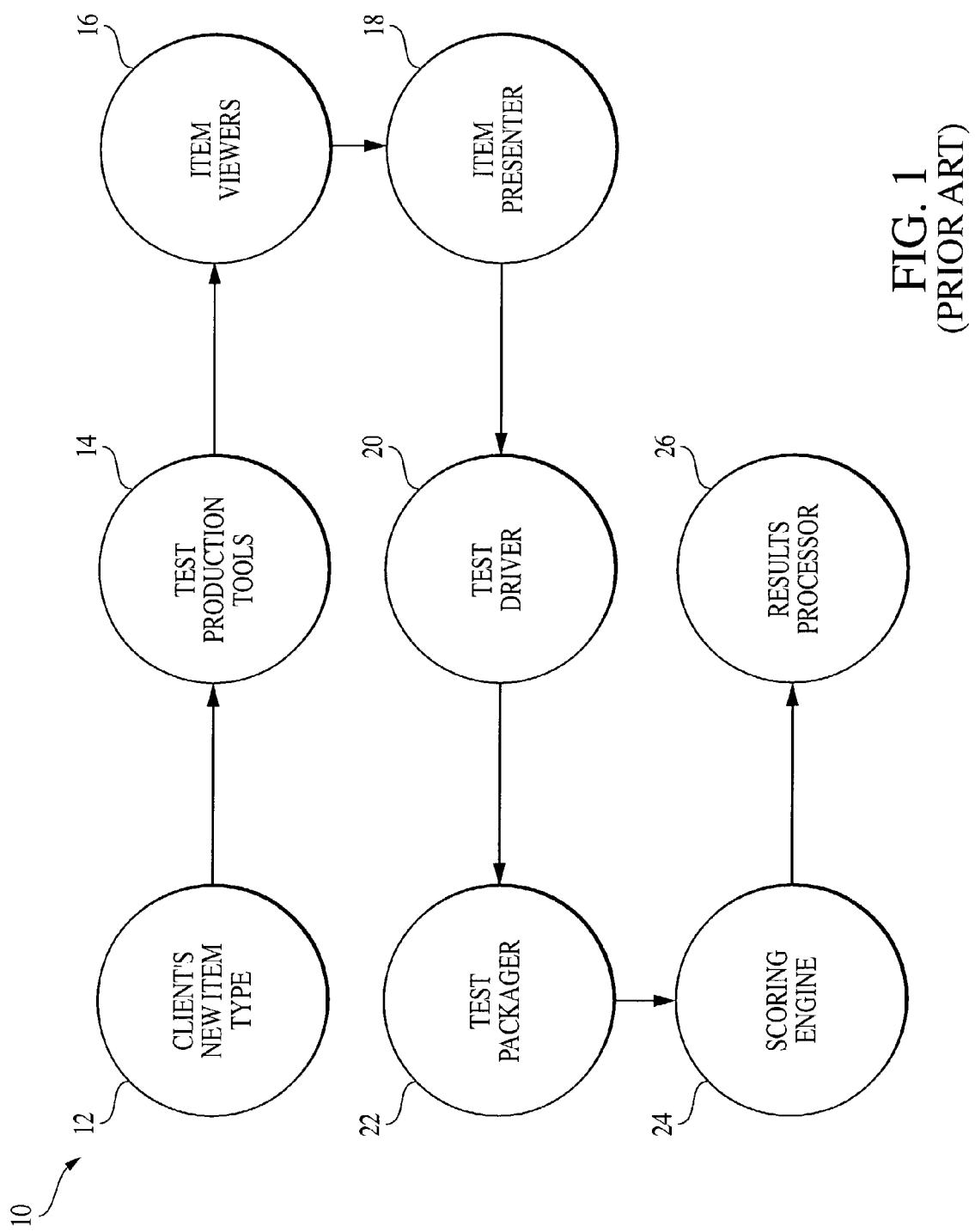
FIG. 1 is a flow diagram of a prior art method of computerized test customization.
Figure 2A:
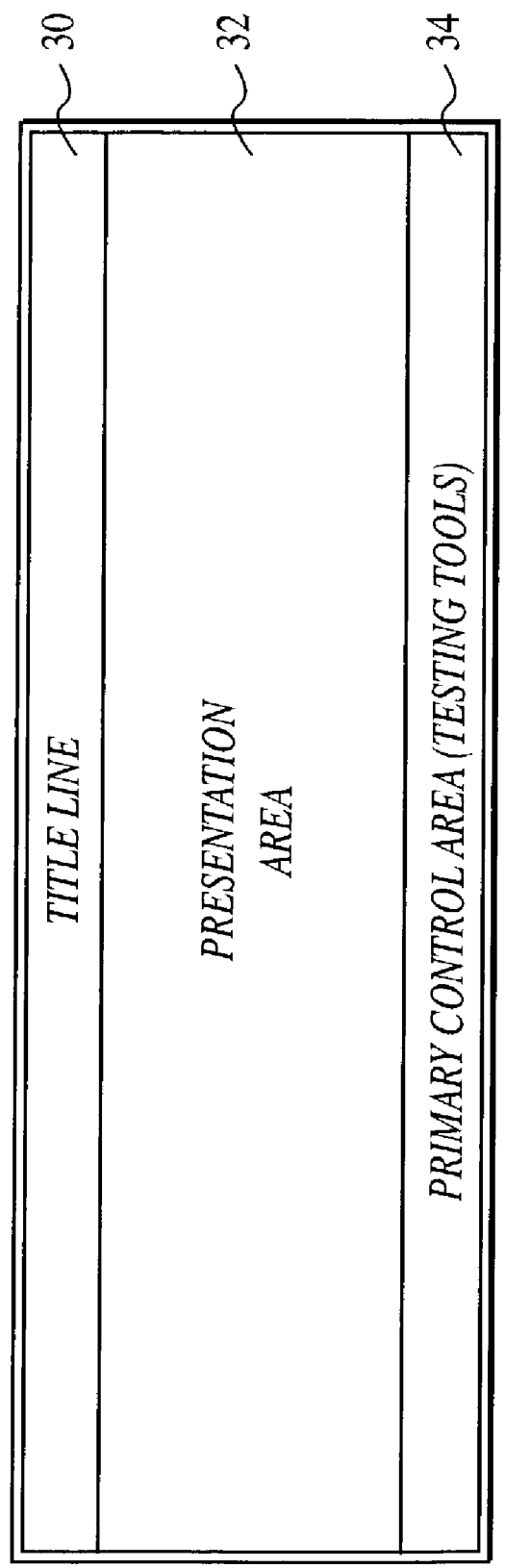
FIG. 2A is an illustration of a prior art display of a computer-based test.
Figure 2B:
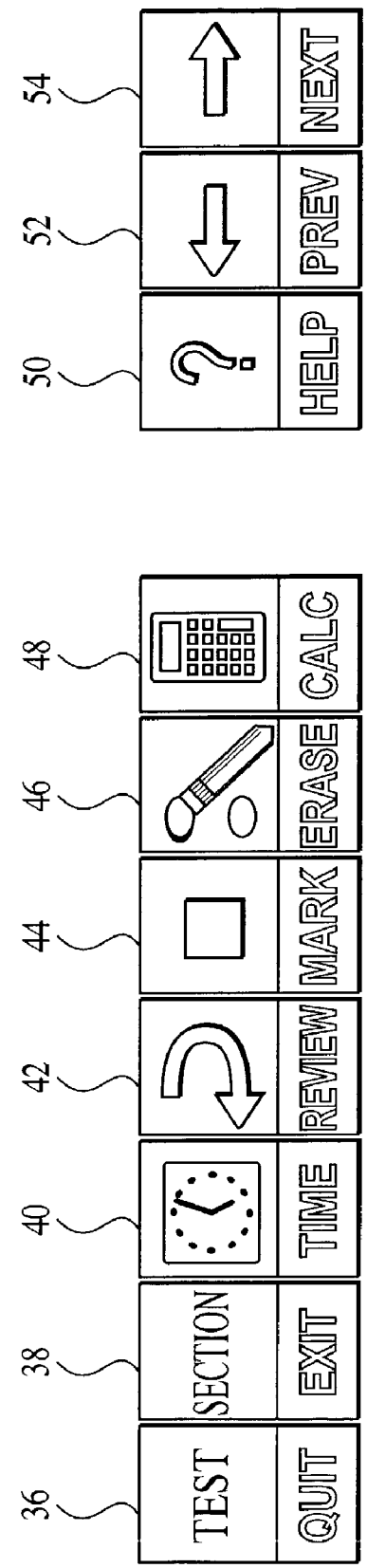
FIG. 2B is an illustration of a prior art display of test navigation controls.
Figure 3:
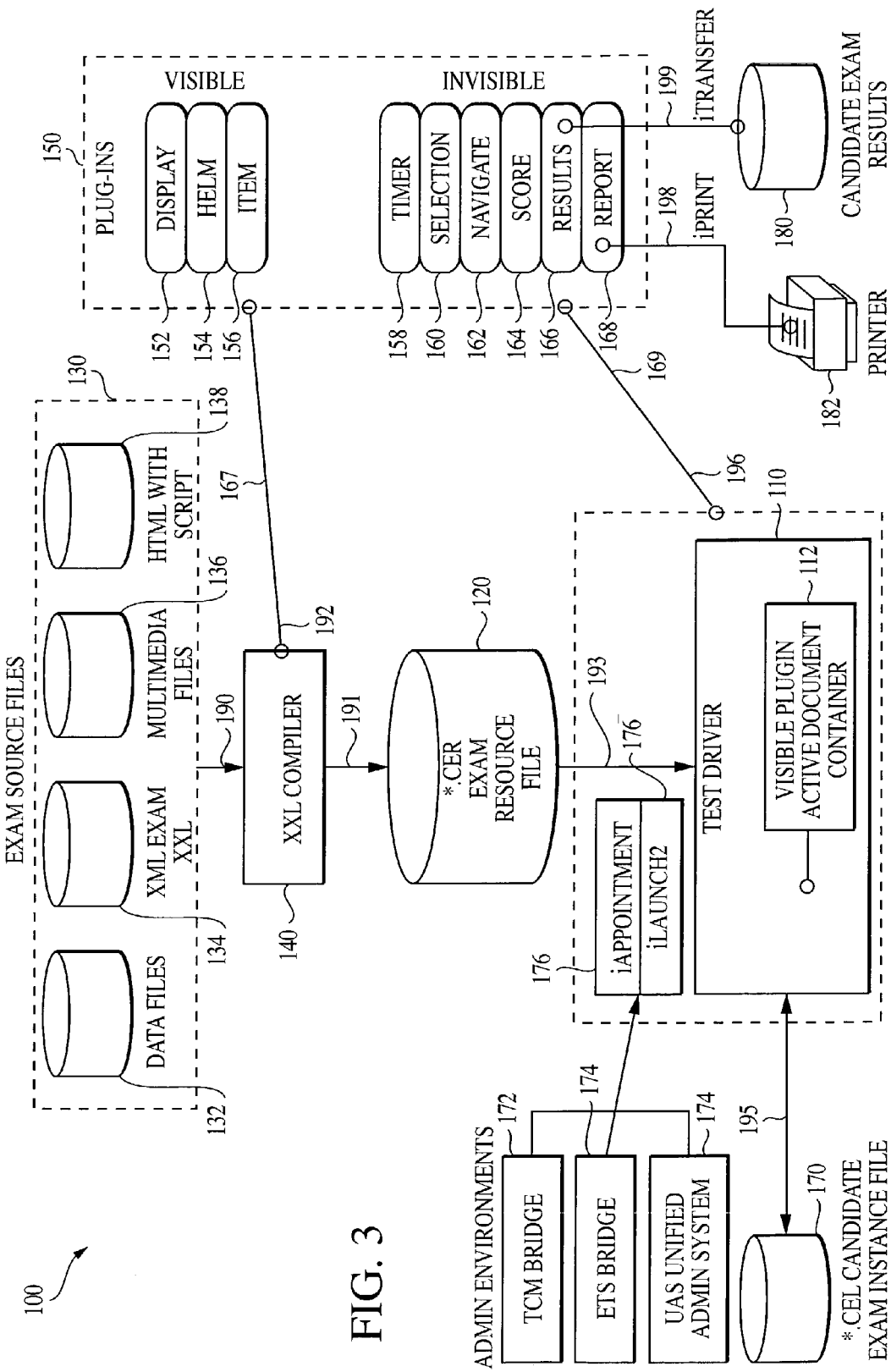
FIG. 3 is a schematic diagram of a computer-based testing system according to the present invention.

FIG. 3 shows an overview of the software architecture for the computer-based test delivery system of the present invention, denoted generally by reference numeral 100. Test driver 110 is responsible for controlling all aspects of the computer-based test. Test driver 110 identifies examinees scheduled to take the computer-based test and identifies and creates the appropriate test. Test driver 110 then presents all of the test components to examinees using a display device (not shown), such as a computer monitor, and enables examinees to enter responses to test questions through the use of an input device (not shown), such as a keyboard, a mouse, etc. Test driver 110 also monitors the security of the test. For example, test driver 110 can prevent access to the Internet and can validate examinees, although, these functions are preferably performed by the test center administration system. Test driver 110 also monitors the timing of the test, providing relevant warnings to examinee regarding the elapsed time of the test and the time remaining for a particular section of the test or for the entire test. Test driver 110 is also responsible for scoring the test, once the test is completed or while the test is in progress, and for reporting the results of the test by physical printout using printer 182 or in a file format using candidate exam results file 180. If the test is interrupted while in progress, for example, due to a power failure, test driver 110 restarts the test, preferably at the point at which the test was interrupted, as will be described subsequently in more detail. Finally, if the test is left incomplete, test driver 110 cleans up the incomplete test. An incomplete test will have an exam instance file in the examinee's directory but will not have created a results file. A results file is created even though generally the candidate will fail. The number of items delivered to the examinee is recorded in the results file. Test driver 110 picks up where the event was interrupted and invisibly deliveries the rest of the units of the test.

A test specification is authored by a test publisher according to the specifications of the client and stored in exam source files 130. Exam source files 130 include data files 132, XXL files 134, multimedia files 136, and hypertext markup language ("HTML") files 138. XXL files 134 include the test specification, which contains the client's requirements for the test, a bank of test items or questions, templates that determine the physical appearance of the test, plugins, and any additional data necessary to implement the test. Additional data is also stored in data files 132. For example an adaptive selection plugin may need a, b & c theta values. These values are stored in a binary file created by a statistical package.

HTML files 130 include, for example, any visual components of the test, such as the appearance of test items or questions, the appearance of presentations on the display device, the appearance of any client specified customizations, and/or the appearance of score reports. HTML files 130 preferably also include script, for example, VBscript and Jscript, or Java script. HTML files 130 are preferably authored using Microsoft's FrontPage 2000. FrontPage 2000 is preferably also used to manage the source files in a hierarchy that is chosen by the test publisher. Multimedia files 136 include, for example, any images (.jpg, .gif, etc.) and/or sound files (.mp3, .wav, .au, etc.) that are used during the test.

XXL compiler 140 retrieves XXL files 134 from exam source files 130 using interface 190 and compiles the XXL test content stored in XXL files 134. XXL compiler 140 stores the compiled test files in exam resource file 120. In another embodiment, exam source files 130 do not contain XXL files 134 and contains, for example, only multi-media files. In this embodiment, XXL compiler 140 is merely a test packager that writes the data directly to exam resource file 120 without modification or validation. The data appears in a stream under the "data" branch of exam resource file 120. The name of the stream is specified by the test author.

In a preferred embodiment, XXL files 134 also include XXL language that defines plugins 150, in which case, plugins 150 assist XXL compiler 140 in compiling XXL files 134. Test driver 110 preferably supports, for example, nine different types of plugins 150, including, for example: display plugin 152; helm plugin 154; item plugin 156; timer plugin 158; selection plugin 160; navigation plugin 162; scoring plugin 164; results plugin 166; and report plugin 168. Plugins 150, which are also included in XXL files 134, are the first XML files compiled into exam resource file 120.

Figure 4:
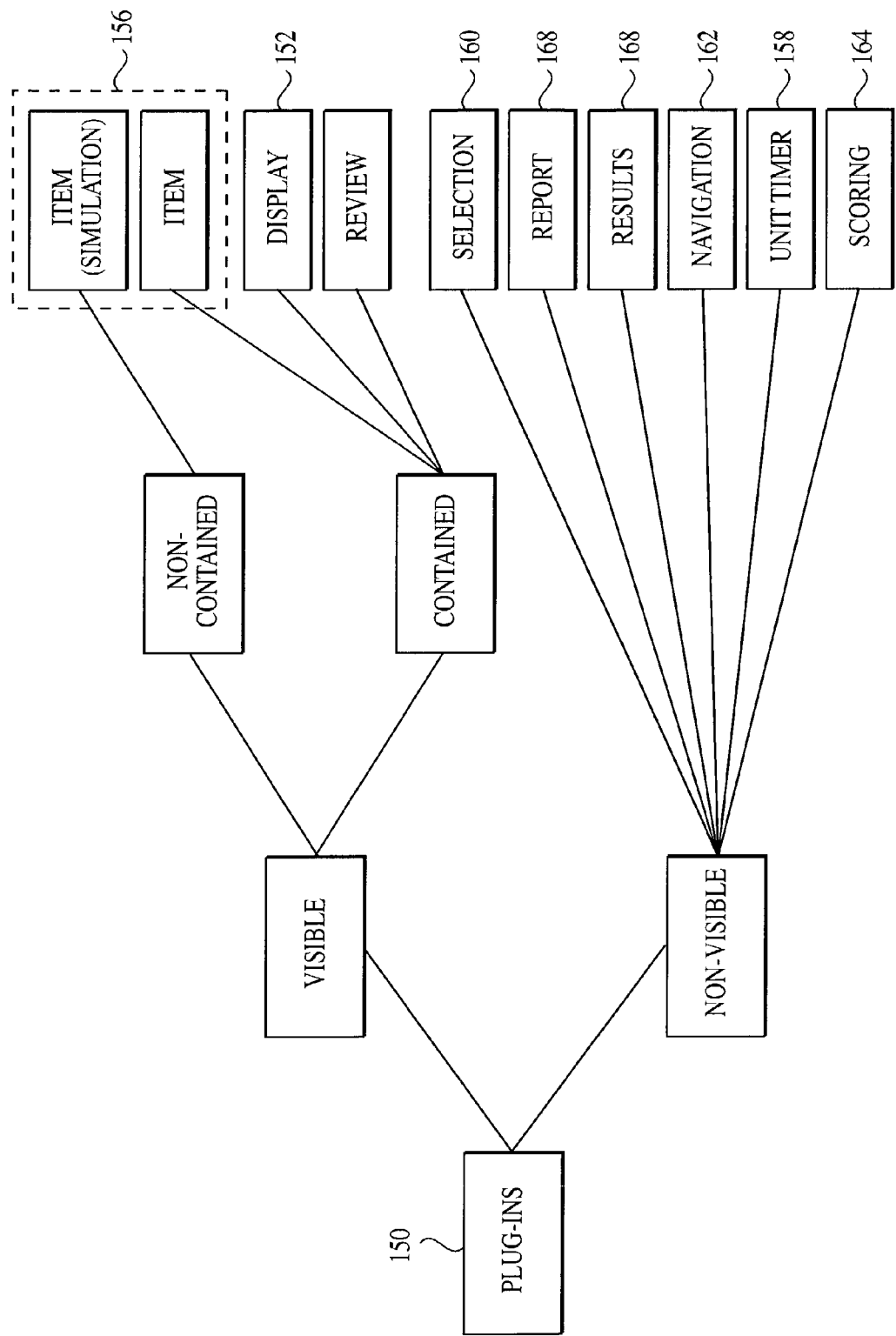
FIG. 4 is a block diagram illustrating different types of plugins that are used with the computer-based testing system according to the current invention.

Plugins 150 allow a test designer to customize the behavior of test driver 110 and are divided into two types, for example: visible plugins and invisible plugins, as shown in FIG. 4. The visible plugins, which include display plugin 152, helm plugin 154, and item plugin 156, enable the test driver to control what is presented visually to an examinee on the display device. The invisible plugins, which include timer plugin 158, selection plugin 160, navigation plugin 162, scoring plugin 164, results plugin 166, and report plugin 168, enable the test driver to control more functional aspects of the test. Plugins 150 are used to validate data stored in exam source files 130 that is to be used by one of plugins 150 during delivery of the test to the examinee, as is described below in greater detail. Plugins 150 are, preferably, component object model ("COM") objects, as described below. Plugins 150, may also utilize Java implementation. Plugins 150 are preferably written using Microsoft Visual C++ or Visual Basic 6.0 or any fully COM enabled language. Plugins 150 may be in or out-of-process, and, therefore, can exist as executable (".EXE") files or as dynamic link library (".DLL") files.

An application or component that uses objects provided by another component is called a client. Components are characterized by their location relative to clients. An out-of process component is an .exe file that runs in its own process, with its own thread of execution. Communication between a client and an out-of-process component is therefore called cross-process or out-of-process communication.

An in-process component, such as a .dll or .ocx file, runs in the same process as the client. It provides the fastest way of accessing objects, because property and method calls don't have to be marshaled across process boundaries. However, an in-process component must use the client's thread of execution.

Exam resource file 120 receives the compiled test content from XXL compiler 140 and plugins 150, if applicable, and stores the compiled test content in an object-linking and embedding ("OLE") structured storage format, called POLESS, which is described in greater detail below. Other storage formats may optionally be used. OLE allows different objects to write information into the same file, for example, embedding an Excel spreadsheet inside a Word document. OLE supports two types of structures, embedding and linking. In OLE embedding, the Word document of the example is a container application and the Excel spreadsheet is an embedded object. The container application contains a copy of the embedded object and changes made to the embedded object affect only the container application. In OLE linking, the Word document of the example is the container application and the Excel spreadsheet is a linked object. The container application contains a pointer to the linked object and any changes made to the linked object change the original linked object. Any other applications that link to the linked object are also updated. POLESS supports structured storage such that only one change made to an object stored in exam resource file 120 is globally effective. Test driver 110 comprises Active Document container application 112 for the visible plugins, display plugin 152, helm plugin 154, and item plugin 156, which function as embedded objects, preferably COM objects.

Figure 5:
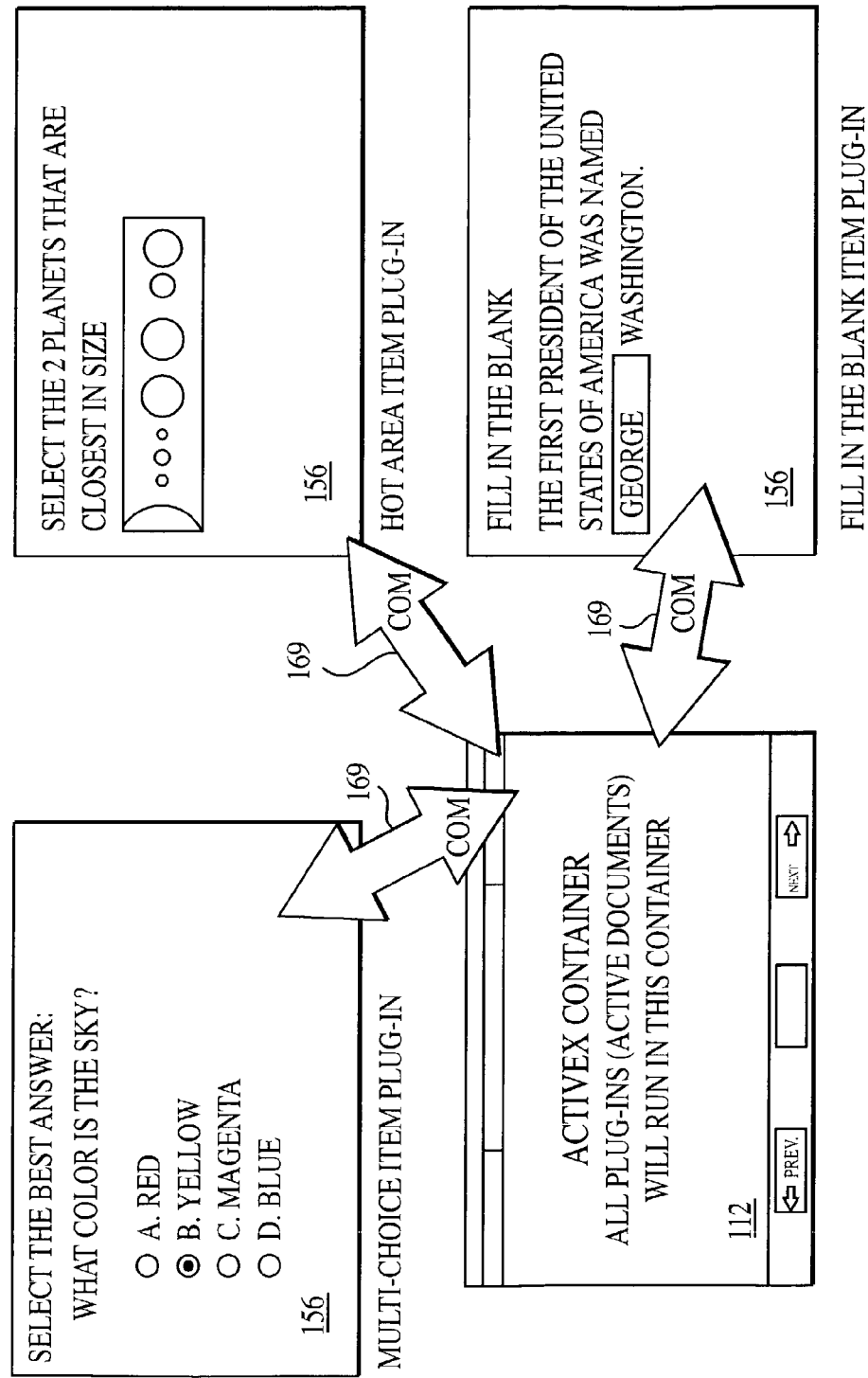
FIG. 5 is an illustration of Active Documents as utilized in the present invention.

FIG. 5 shows an example of Active Document container application 112 being used with several item plugins 156. Each item plugin 156, in this case representing a multiple choice ("multi-choice") item, a hot area item, and a fill in the blank item, are linked to Active Document container application 112 through the IItem and IPlugin COM interfaces 169.

Both XXL compiler 140 and plugins 150 are involved in storing the compiled test content into exam resource file 120, if any of plugins 150 are being used. Exam resource file 120 comprises, for example, a hierarchical storage structure, as will be described in further detail below. Other storage structures may optionally be used. XXL compiler 140 determines to which storage location a specific segment of the compiled test content is to be stored. However, if any of plugins 150 are used to validate the portion of any of the data from exam source files 130, then the plugins 150 store the data directly to the exam resource file, based upon directions from XXL compiler 140. XXL compiler uses IPersistResource interface 192, co-located with I-Plugin interface 167 in FIG. 3, to control the persistence of the data to exam resource file 120. XXL compiler 140 and plugins 150 write the data to exam resource file 120 using POLESS interfaces 191.

Figure 6:
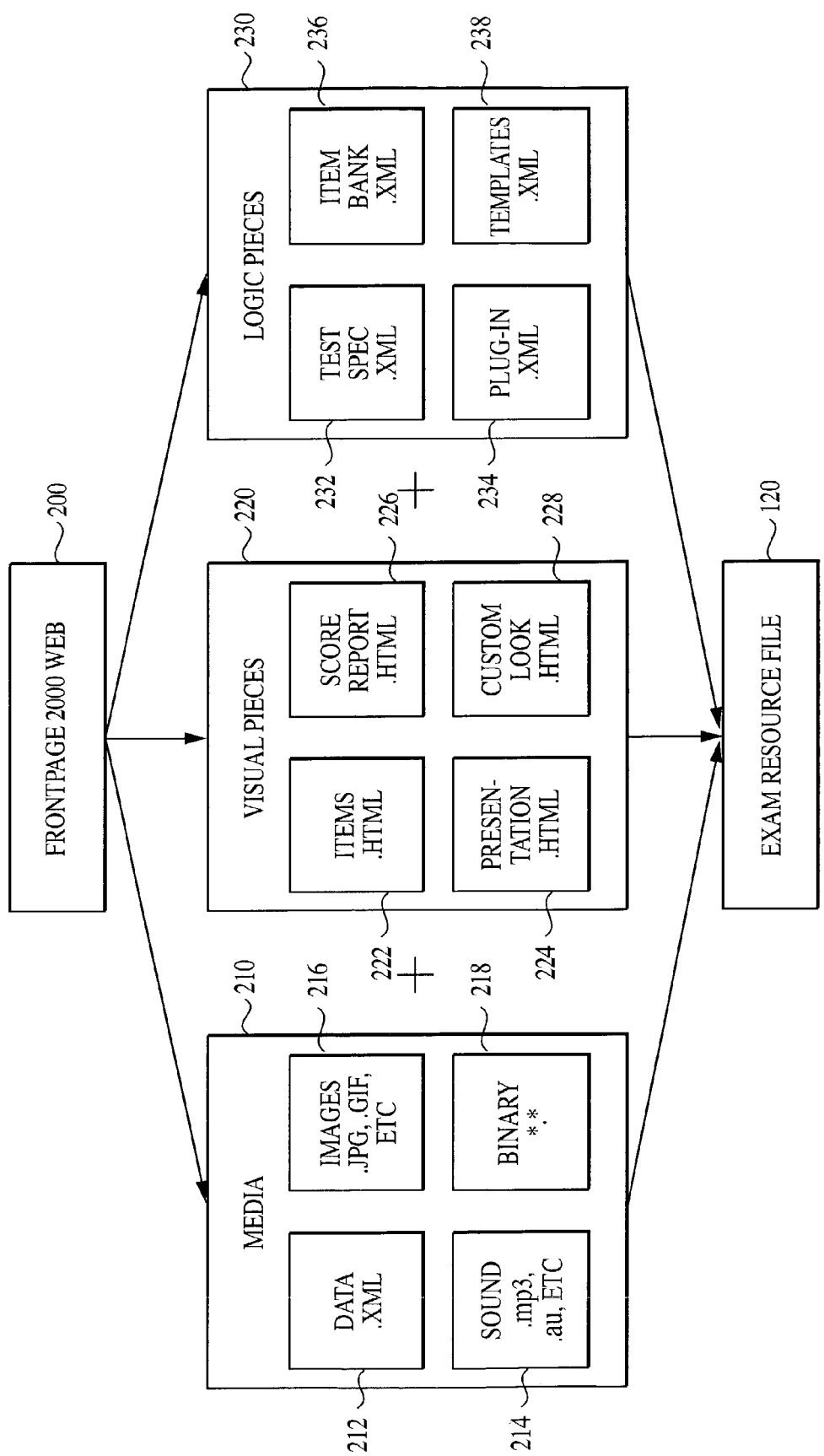
FIG. 6 illustrates various components that comprise an exam source file.

FIG. 6 illustrates the contents of exam source file 130, which are compiled into exam resource file 120 by XXL compiler 140 and plugins 150. FrontPage 2000 Web 200 is used, for example, to author the test. Exam source files 130 contain media files 210, visual files 220, and logic files 230. Media files 210 are multimedia files used to enhance the presentation of the test, including, for example, XML data files 212, sound files 214, image files 216, and binary files 218. XML data files 212 include the XXL extensions from the plugins 150 that use XML. The test specification, presentation, scoring and other information is specified in the XML files. Sound files 214 include any sounds that are to be used during the test, such as .mp3 files, .au files, etc. Image files 216 include any images to be used during the test, such as .jpg files, .gif files, etc. Binary files 218 include any data needed by a plugin 150 that is not in XXL format. Visual files 220 are HTML files that specify the visual presentation of the test as presented to the examine on the display device, including items files 222, presentation files 224, score report files 226, and custom look files 228. Items files 222 include HTML files that are used to specify the visual component of test questions, e.g., stems and distractors. Items files 222 are capable also of referencing external exhibits. An exhibit could be a chart, diagram or photograph. Formats of exhibits include, for example: .jpg, .png, etc. Presentation files 224 define what is seen by the examinee on the display device at a particular instant during the test. Score report files 226 is typically an HTML file with embedded script that includes, for example candidate demographics, appointment information, and candidate performance. The performance might include pass/fail, achievement in different content areas, etc. Custom look files 228 are typically HTML files with embedded script to layout, for example, the title bar and information contained therein. Logic files 230 are XML files that specify the functional aspects of the test, including test specification files 232, plugin files 234, item bank files 236, and template files 238. Test specification files 232 specify the content and progression of the test as provided by the client. Plugin files 234 define plugins 150 and contain any data necessary to implement plugins 150. Item bank files 236 include the data content and properties of the items, or test questions, that are to be presented to the examinee during the test. Properties of an item include the correct answer for the item, the weight given to the item, etc. Template files 238 define visual layouts that are used with the display screen during the test.

Referring again to FIG. 3, once a test has begun, test driver 110 accesses exam resource file 120 for the instructions and files needed to implement the test, using POLESS interfaces 193. Test driver 110 also accesses plugins 150 for additional data that expands the functionality of test driver 110 in the areas of items, navigation algorithms, information displays, scoring algorithms, timing algorithms, test unit selection algorithms, results persistence reporting, printed score reporting, and/or helm types. Test driver 110 communicates with plugins 150 using various COM interfaces 169. COM interfaces facilitate OLE linking. As stated previously, test driver 110 is an Active Document container application and plugins 150 are embedded objects. The COM interfaces function as communications paths between the container application and the linked objects.

There are, for example, ten COM interfaces utilized in computer-based test delivery system 100. IPlugin interface 167, which is also a COM interface, is supported by all of plugins 150. COM interfaces 169, therefore, includes the IPlugin interface. The IPlugin interface contains generic operations such as loading and unloading required of all plugins 150. In addition to the global IPlugin interface, each plugin 150 also uses, for example, a second, individual COM interface 169 to communicate with test driver 110. Alternative structures of the IPlugin interface may also be used. Table 1 shows the relationship between each plugin 150 and the COM interface 169 used with that particular plugin 150.

TABLE 1

COM INTERFACE FOR PLUGINS

| PLUGIN | COM INTERFACE | DESCRIPTION |
| --- | --- | --- |
| All Plugins 150 | IPlugin | Passes data between the test driver and all plugins regarding generic operations, e.g., loading and unloading. |
| Display 152 | IDisplay | Passes data between the test driver and the visible plugins that handle title bars, displays, non-answered items, and summaries. |
| Helm 154 | IHelm | Passes data between the test driver and the visible plugins that display navigation controls or reviews. Communicates with a navigation plugin to perform the actual navigation. Also functions as a user interface connection to the test driver. |
| Item 156 | IItem | Passes data between the test driver and the visible plugins that govern test items or simulations. |
| Timer 158 | IUnitTimer | Passes data between the test drivers and the invisible plugins used to perform timing across examination sections. |
| Selection 160 | ISelection | Passes data between the test drivers and the invisible plugins used to select forms, sections, groups, or items for delivery to the examinee. |
| Navigation 160 | INavigate | Passes data between the test drivers and the invisible plugins used to control section navigation and define rules for traversing through the test. |
| Scoring 164 | IScore | Passes data between the test drivers and the invisible plugins used to control scoring of delivered testing units. |
| Results 166 | IResults | Passes data between the test drivers and the invisible plugins that control writing of examinee results, for example, to candidate exam results file 180. |
| Report 168 | IReport | Passes data between the test drivers and the invisible plugins that control printing of score reports and other material, for example, printed reference material and post exam instructions to printer 182. |

Exam instance file 170 is used to restart a test if the test has been interrupted, for example, because of a power failure. During delivery of the test, exam instance file 170 receives examination state information from test driver 110 and plugins 150 regarding the state of all running objects being used to deliver the test. The examination state information includes the presentation that was being delivered on the display device before the interruption, the responses the examinee had entered in that presentation, etc. When the test is restarted, the exam instance file 170 loads the state information back to test driver 110 and plugins 150, allowing the test to return to operation at the point where the test had been interrupted. Preferably, the running state of all objects is saved to exam instance file 170 rather than of only some of the objects. Saving the state of only some of the objects to exam instance file 170 causes the potential problem of only a portion of the test information being restored after a test interruption. Exam instance file 170 may also store additional information relating to the test, including, for example: the timing utilized and time remaining on units of the exam, the current unit of delivery, candidate score, etc. Test driver 110 and plugins 150 communicate with exam instance file 170 using POLESS interfaces 195. Test driver 110 controls communications between test driver 110 and plugins 150 using IPersistInstance interface 196, which is collocated with COM interfaces 169 in FIG. 3.

Several administrative environments perform the administrative functions of computer-based test delivery system 100, for example: Test Center Manager ("TCM") Bridge 172; Educational Testing Service ("ETS") Bridge 174; and Unified Administration System ("UAS") 174. Administrative functions include, for example: checking-in an examinee, starting the test, aborting the test, pausing the test, resuming the test, and transmitting results.

There are preferably two ways to run Test driver 110. The first is through a series of command line options and the second is using COM interfaces describing appointment information. The command line option exists for backwards compatibility in a standard ETS environment and a TCM environment. Table 2 shows a list of command line options test driver 110 supports. There are, for example, four programs which launch the test through the COM interface, for example: 1) LaunchTest.exe (for test production and client review); 2) UAS; 3) UTD2ETS.dll (an internal compatibility module for use with the ETS administration environment); and 4) UTD2TCM (for the Test Center Manger environment). Other number of environments and/or programs may optionally be used.

| Switch(es) | Option(s) | Purpose |
| --- | --- | --- |
| /? /help | n/a | Displays command line switches in dialog box. |
| /UnregServer | n/a | Unregisters the test driver core COM server. |
| /Regserver | n/a | Registers the test driver core COM server. |
| /T | form name | Name of the form or form group to run in the exam. |
| /F | resource file | The exam resource file to use. |
| /S | n/a | Suppress any printing. |
| /W | n/a | Run in close-of-day mode. |
| /TI | n/a | Set tracing level to information. (Very large instance file). |
| /TW | n/a | Set tracing level to warning. (Large instance file.) |
| /TE | n/a | Set tracing level to error. (Average sized instance file.) |
| /K | resource dir, SKSID, candidate director | Used to point to directories. A space separates each of the three options. |

The administration environments use several interfaces to communicate with test driver 110. IAppointment interface 176 is part of UAS 174 and allows access by test driver 110 to examinee information for the examinee taking the test, such as demographics. The examinee information is included in candidate exam results file 180, which is created by the test driver. ILaunch2 interface 177 functions as the primary control interface for UAS 174 and allows UAS 174 to control various components such as test driver 110, screen resolution change, accommodations for disabled candidates, examinee check-in, etc., in a test center, which is the physical location where the examinee is taking the test. ITransfer interface 199 transfers candidate exam results file 180 and other files back to UAS 174. IPrint interface 198 sends information regarding any reports to printer 182.

II. XXL Compiler Interfaces and Classes

Figures 7, 7A:
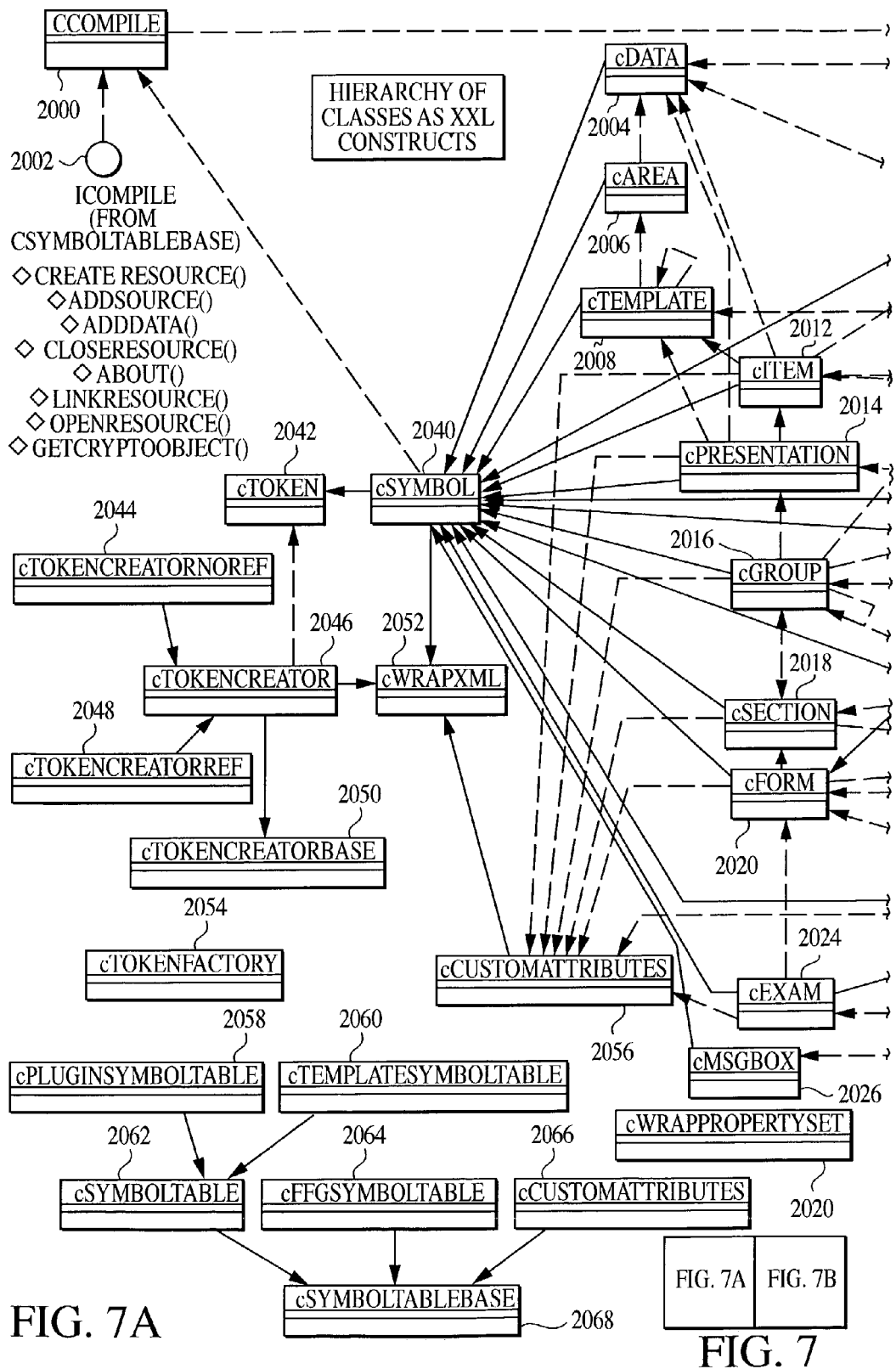
FIGS. 7A and 7B are schematics illustrating the components, classes, and interfaces that comprise a test definition language compiler according to the present invention.
Figure 7B:
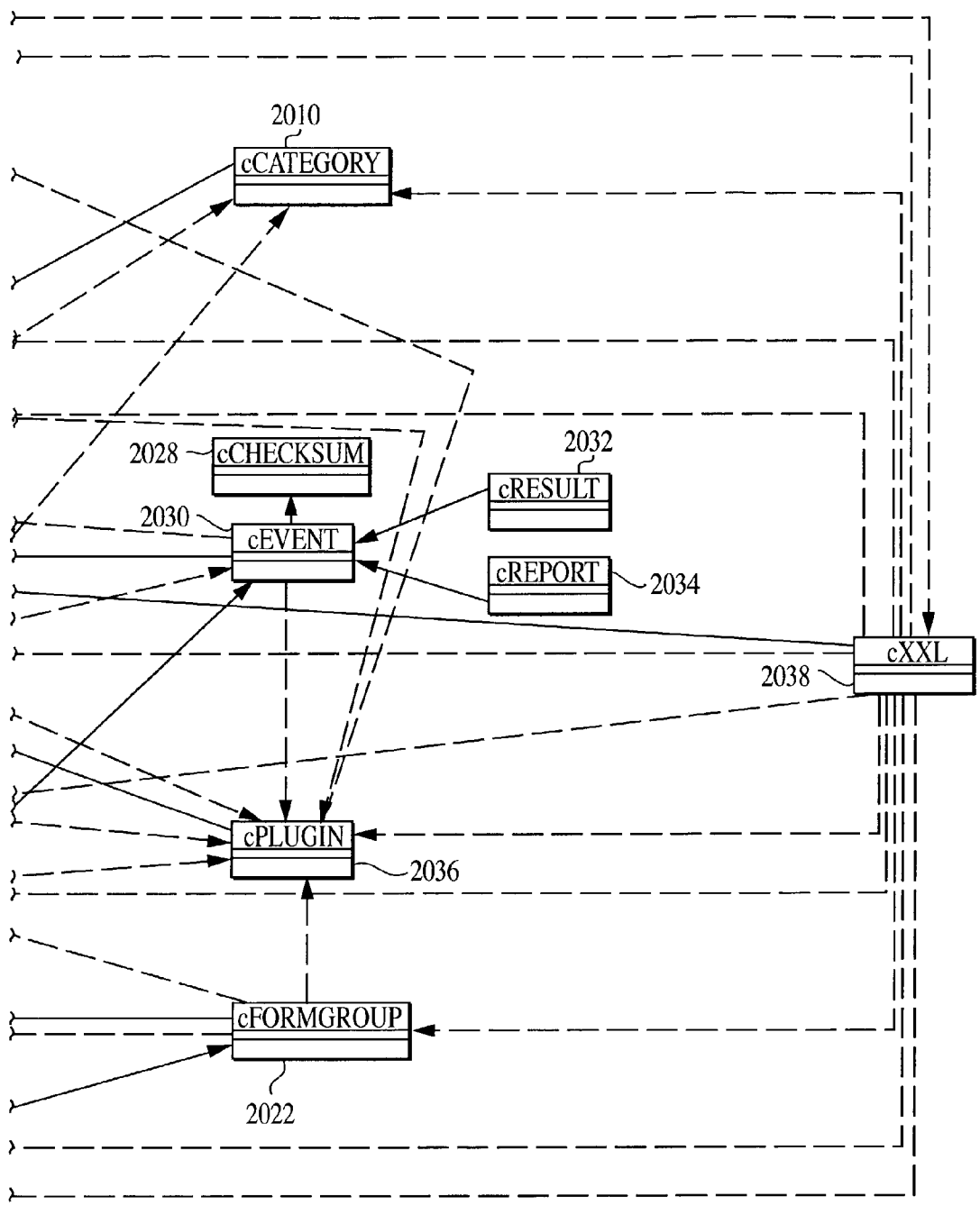

FIGS. 7A and 7B illustrate the main diagram for XXL compiler 140. XXL compiler 140 comprises the following classes, for example: ccompile 2000; cData 2004; cArea 2006; cTemplate 2008; cCategory 2010; citem 2012; cPresentation 2014; cGroup 2016; cSection 2018; cForm 2020; cFromGroup 2022; cExam 2024; cMsgBox 2026; cChecksum 2028; cEvent 2030; cResutl 2032; cReport 2024; cPlugin 2036; and cXXL 2038.

The main interface to XXL compiler 140 is ICompile interface 2002. ICompile interface 2002 is implemented by CCompiler class 2000. All control and initiation of compilation of exam source files 130 into exam resource file 120 occurs by way of this single public interface. The core, non-plugin related elements of the XXL test definition language, as stored in XXL files 134, are compiled by classes in XXL compiler 140. For example, cSection class 2018, compiles the section element, and cGroup class 2016 compiles the group element.

ICompile interface 2002 supports the following operations, for example: createResource( ); addSource( ); add Data( ); closeResource( ); about( ); linkResource( ); openResource( ) and getCryptoObject( ). CreateResource( ) creates a resource file, for example, an XXL based resource file such as exam resource file 120. AddSource( ) compiles an XXL file into the resource file. AddData( ) adds a file directly to a data branch of the resource file. CloseResource( ) closes the resource file. LinkResource( ) links a resource in the resource file and is performed after all compiling of the source files are completed. GetCryptoObject( ) returns an ICrypto object containing the current encryption setting of POLESS, as described below.

The classes of XXL compiler 1040, e.g., cForm 2020 and citem 2012, handle individual XXL core language elements. All of these classes compile the specific XXL source element into exam resource file 120. All of these class language elements are also symbols used in later references. Therefore, the classes all derive from cSymbol class 2040. cSymbol class 2040 allows the classes of XXL compiler 140 to reside in a symbol table.

For example, the XXL element plugin 150 appears as follows in XXL files 134:

```
<plugin name="helmNextPrevious"
progid="UTDP.cNextPrevious"   />
```

This XXL call causes an instance of cPlugin class 2036 to be created, compiles the source, and writes the compiled result to exam resource file 120. The name and ID of Plugin 150 is also added to the symbol table for later reference.

XXL compiler 140 also contains the following token classes, for example: cToken 2042; cTokenCreatorNoRef 2044; cTokenCreator 2046; CtokenCreatorRef 2048; cTokenCreatorBase 2050; and cTokenFactory 2054. These token classes are involved in the identification of tokens. Tokens turn into symbols after identification. Symbols are any class derived from cSymbol, e.g., cTemplate, cSection, etc.

XXL compiler 140 also contains the following symbol table classes, for example: cPluginSymbolTable 2058; cTemplateSymbolTable 2060; cSymbolTable 2062; cFFGSymbolTable 2064; cSGPSymbolTable 2066; and cSymbolTableBase 2068. These classes are varieties of symbol tables. There are different symbol tables for different groups of symbols. A group of symbols define a name space for the symbol. Common symbol table functions are located in the base symbol table classes and templates.

All content and specification destined for a plugin 150 appears in the data element in XXL. For example, below is an item definition in XXL:

```
<item name="wantABreak1" skipAllowed="false">
    <data>
        <multiChoice
            correctAnswer="A"
            maxResponses="1"
            minResponses="1"
            autoPrompt="false"
            URI="itembank/info_item.htm#wantABreak"/>
    </data>
</item>
```

The item element is handled by a citem class 2012 object. The data element in the XXL definition is handled by a cData class 2004 object. Item plugin 156 Plugin 150 will receive the source to compile from the cData class 2004 object, in this example, a multiChoice element.

cWrapXML class 2052, a wrapper class for XML DOM nodes, supports error handling. cCustomAttributes class 2056 compiles the custom attributes XXL element. cWrapPropertySet class 2070 is a wrapper class for a POLESS property storage.

III. Test Driver Interfaces and Classes

A. Interfaces

Figure 8:
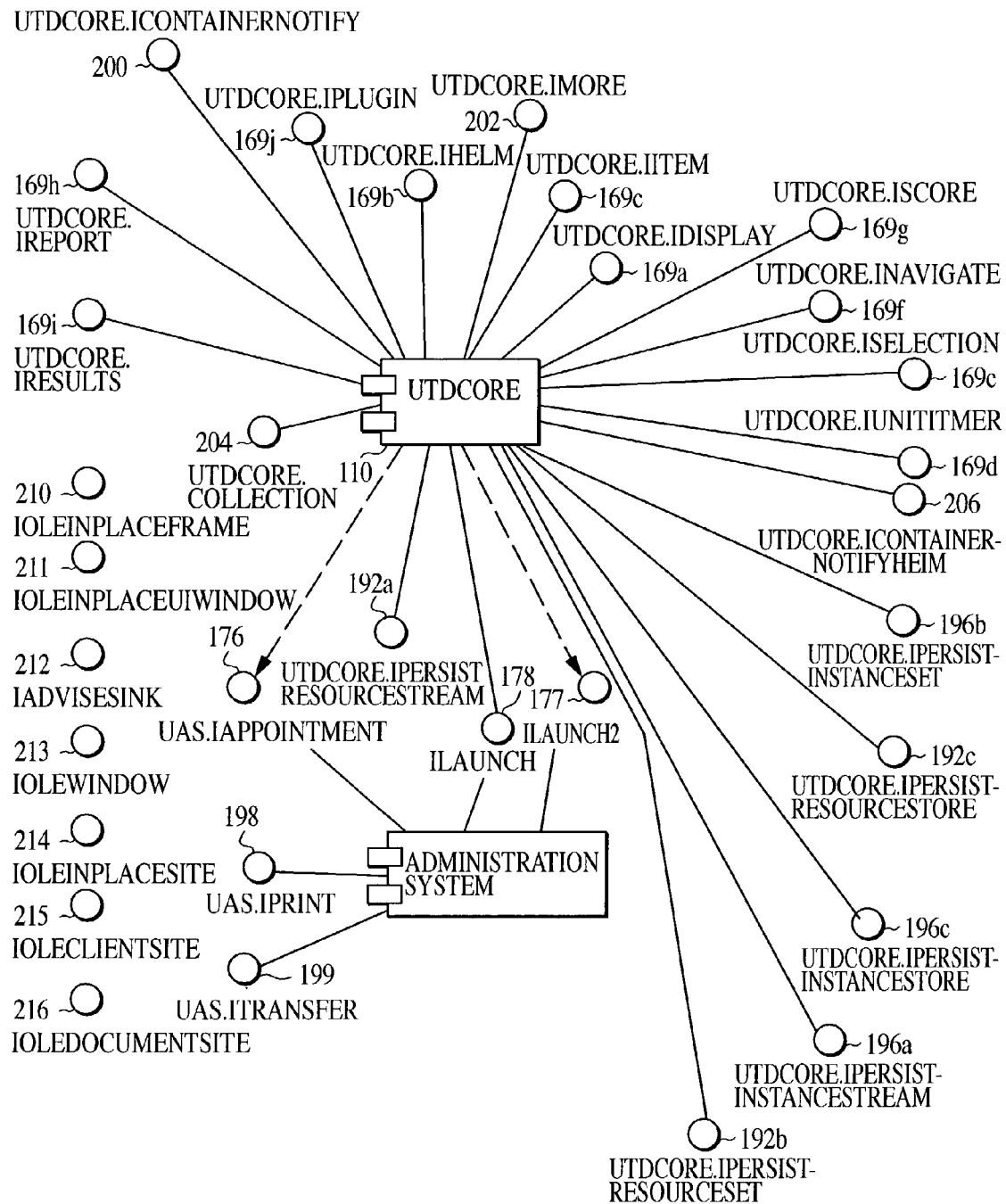
FIG. 8 is a schematic illustrating the components that comprise a test driver and a test administration system according to the present invention.

FIG. 8 shows test driver 110, UAS 174, and the interfaces used by and between the test driver 110 and UAS 174 to deliver the test. UAS 174 defines ILaunch2 interface 177, which is used by UAS 174 to initiate test events. ILaunch2 interface 177 is an extension of ILaunch interface 178, which, in other embodiments of the present invention, is also used by UAS 174 to initiate test events. UAS 174 also defines and implements additional interfaces, for example: IAppointment interface 176; IPrint interface 198; and ITransfer interface 199. IAppointment interface 176 transfers examinee candidate information and appointment details from UAS 174 to test driver 110, as is illustrated by the dashed arrow connecting IAppointment interface 176 to test driver 110. IPrint interface 198 allows UAS 174 to send print requests to printer 198 regarding reports, for example, score reports. ITransfer interface 199 allows UAS 174 to request the transfer of information from candidate exam results file 180 back to UAS 174.

Test driver 110 defines various interfaces to allow test driver 110 to communicate with different parts of computer-based test delivery system 100. Test driver 110 includes, for example, ten COM interfaces 169 to communicate and transfer data with plugins 150. (See Table 1 above) The COM interfaces 169 are denoted in FIG. 8 as follows, for example: IDisplay interface 169a; IHelm interface 169b; IItem interface 169c; IUnitTimer interface 169d; ISelection interface 169e; INavigate interface 169f; IScore interface 169g; IResults interface 169h; IReport interface 169i; and IPlugin interface 169j.

Test driver 110 and plugins 150 communicate and transfer data with exam resource file 120 using, for example, three IPersistResource interfaces 192: IPersistResourceStream interface 192a; IPersistResourceSet interface 192b; and IPersistResourceStore interface 192. IPersistResource interfaces 192 are used by plugins 150 during compilation of exam source files 130 and are used by both test driver 110 and plugins 150 during delivery of the test. During compilation of exam source files 130, XXL compiler 140 directs plugins 150 in which storage location of exam resource file 120 to store any information that plugins 150 have validated. Plugins 150 can then retrieve the stored information from exam resource file 150 during delivery of the test. Other number of interfaces and different combinations of functionality may alternatively be used.

Information is saved from plugins 150, or from XXL compiler, 140 in general, to exam resource file 120, for example, as either a stream of data, as a set of data, or as a storage structure, depending on which of the three IPersistResource interfaces 192 is implemented to save the information from plugins 150, to exam resource file 120. IPersistResourceStream interface 192a saves the information, for example, as a stream of data. A stream of data is simply a stream of bytes stored as a linear sequence. IPersistResourceSet interface 192b saves the information, for example, as a set of data. A set of data is preferably a name-value property pair. For example, the name of a particular property for an item is distractors and the value is the number of distractors required for that item. IPersistResourceSet interface 192 allows the name-value property pair to be saved together in exam resource file 120. IPersistResourceStore interface 192c saves the information, for example, in a directory format with storage areas. The directory format allows other streams of data to be saved within the storage area and for sub-storages to be saved under the storage area.

IPersistInstance interface 196, likewise, comprises, for example, three, different interfaces, for example: IPersistInstanceStream interface 196a; IPersistInstanceSet interface 196b; and IPersistInstanceStore interface 196c. Examination state information is saved to exam instance file 170, for example, as either a stream of data, as a set of data, or as a storage element, depending on which of the three IPersistResource interfaces 192 is implemented.

Two of the interfaces, IContainerNotify interface 200 and IContainerNotifyHelm interface 206, function as callback interfaces from plugins 150 to test driver 110. IContainerNotify interface 200 allows a visible plugin to inform test driver 110, for example, that the plugin is displayed and ready for examinee interaction. IContainerNotifyHelm interface 206 allows helm plugin 154 to request navigation from test driver 110 after receiving an input from the examinee to move to another section of the test. IMore interface 202 is used to convey whether the examinee has seen all content in a presentation. For example, a "more" button appears in place of the next button when the content exceeds the window length. when the examinee scrolls to the bottom, the "more" button disappers and is replaced with the "next" button. Collection interface 204 is used by test driver 110 to hold any group entities, for example, categories and sections of the test.

The remaining interfaces are, for example, Microsoft defined Active Document interfaces, used to implement OLE linking functions of test driver 110 and the visible plugins, display plugin 152, helm plugin 154, and item plugin 156. IOleInPlaceFrame interface 210 controls the container's top-level frame window, which involves allowing the container to insert its menu group into the composite menu, install the composite menu into the appropriate window frame, and remove the container's menu elements from the composite menu. IOleInPlaceFrame interface 210 sets and displays status text relevant to the end-place object. IOleInPlaceFrame interface 210 also enables or disables the frames modeless dialogue boxes, and translates accelerator key strokes intended for the container's frame. IOleInPlaceUI window interface 211 is implemented by container applications and used by object applications to negotiate boarder space on the document or frame window. The container provides a RECT structure in which the object can place toolbars and other similar controls, determine if tools can in fact be installed around the objects' window frame, allocates space for the boarder, and establishes a communication channel between the object and each frame and document window. IAdviseSync interface 212 enables containers and other objects to receive notifications of data changes, view changes, and compound-document changes occurring in objects of interest. Container applications, for example, require such notifications to keep cached presentations of their linked and embedded objects up-to-date.

Calls to IAdviseSync interface 212 methods are a synchronous, so the call is sent and then the next instruction is executed without waiting for the calls return. IOleWindow interface 213 provides methods that allow an application to obtain the handle to the various windows that participate in-place activation, and also to enter and exit context-sensitive help mode. IOleInPlaceSite interface 214 manages interaction between the container and the objects in-place client site. The client site is the display site for embedded objects, and provides position and conceptual information about the object. IOleClientSite interface 215 is the primary means by which an embedded object obtains information about the location and extent of its display site, its moniker, its user interface, and other resources provided by its container. Test driver 110 called IOleClientSite interface 215 to request services from the container. A container must provide one instance of IOleClientSite interface 215 for every compound-document it contains. IOleDocumentSite interface 216 enables a document that has been implemented as a document object to bypass the normal activation sequence for in-place-active objects and to directly instruct its client site to activate it as a document object. A client site with this ability is called a "document site".

B. Core Classes

Figure 9B:
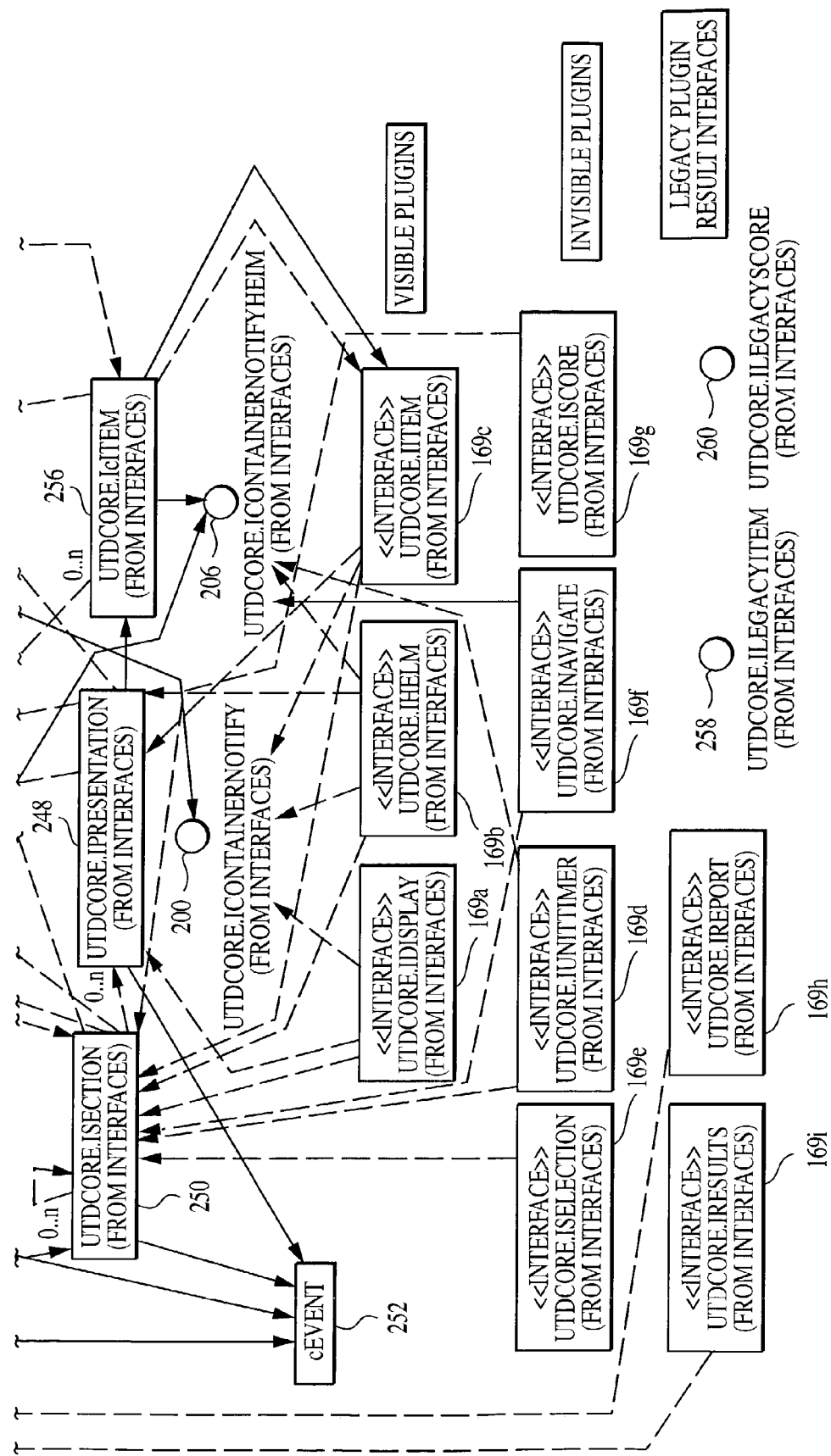

FIGS. 9A and 9B illustrate the main classes of test driver 110 and the interfaces between test driver 110 and plugins 150. Also shown are the classes that interface to UAS 174. ITransfer interface 199, IPrint interface 198, ILaunch2 interface 177, and IAppointment interface 176 represent the connections from test driver 110 to UAS 174, as described previously. Some of the lines depicted in FIG. 9 are solid and some are dashed. The solid lines, for example, between IcResults interface 240 and cEvent class 252, represent inheritance. The dashed lines, for example, between IExam interface 222 and IPlugin interface 169j, represent instantiation.

Inheritance, or generalization, relates to a generalized relationship between classes that shows that the subclass shares the structure or behavior defined in one or more superclasses. A generalized relationship is a solid line with an arrowhead pointing to the superclass. Instantiation, or dependency, represents a relationship between two classes, or between a class and an interface, to show that the client class depends on the supplier class/interface to provide certain services. The arrowhead points to the supplier class/interface. Some services from a supplier class to a client class include, for example: the client class access a value (constant or variable) defined in the supplier class/interface; methods of the line class invoke methods of the supplier class/interface; and methods of the client class have signatures whose return class or arguments are instances of the supplier class/interface. For instantiation, the cardinality of the relationship is illustrated in FIG. 9 if the relationship represents containment. Cardinality specifies how many instances of one class may be associated with a single instance of another class. Cardinality can be shown for relationships to indicate the number of links allowed between one instance of a class and the instances of another class.

Test driver 110 also has several interfaces and implementing classes. Test driver 110 interfaces include, for example: IExam interface 222; IMsgBox interface 224; ICategory interface 232; IForm interface 238; IcResults interface 240; IcReport interface 242; IScript interface 246; ISection interface 250; IPresentation interface 248; and/or IcItem interface 256. The classes that implement the main interfaces include, for example: cScreenMinimum class 226; cFormGroup class 228; cPlugin class 230; cArea class 234; cTemplate class 236; cActivePlugin class 250; and cEvent class 252. The interfaces that are prefaced by "Ic" have names that already exist for plugins 150 to enact, for example, item plugin 156 implements IItem interface 169c. IcItem interface 256, however, is the interface implemented by test driver 110 class citem (not shown). Of course, any number of interfaces may be used, depending on the necessary functionality.

The core class cExam (not shown) implements ILaunch2 interface 177 so that UAS 174 can control test driver 110. The appointment object, which implements IAppointment interface 176, is the main object UAS 174 supplies to test driver 110. The appointment object is available to plugins 150 by way of IPlugin interface 169j. Furthermore, all plugins 150 get access to the test (Iexam) using the IPlugin interface 169, also.

The cExam class selects and delivers the form, using cFormGroup class 228 and IForm interface 238. The form delivers results using IcResults interface 240, reports using IcReport interface 242, and sections contained with in the test using ISection interface 250. Classes that are in the test delivery chain preferably derive from cEvent class 252.

The cResults class (not shown) delivers a results plugin 166 that implements IResult interface 169i. The cReport class (not shown) delivers a report plugin 168 that implements IReport interface 169h. The cSection, cGroup, and cForm classes (not shown) use several invisible plugins 150 to control the delivery of the test. These plugins 150 are timer plugins 158, which implement IUnitTimer interface 169d, selection plugins 160, which implement ISelection interface 169e, scoring plugins 164, which implement IScore interface 169g, and navigation plugins 162, which implement INavigate interface 169f. The cPresentation class (not shown) supplies data to its template for the display of the presentation. The three visible plugins 150 are created and controlled through cTemplate class 236 and child objects cArea class 234. Item plugins 156 have an extension class in the citem class (not shown) that wraps the item plugin 156 and provides generic extended services that all item plugins 156 implements. The citem class in test driver 110 is a wrapper class. The citem class provides two base services, for example: generic item functionality and access to item plugin 156, which is the wrapping function. Item generic functionality includes, for example: having an item name, having an item title, determining if the item is scored or un-scored, determining whether the item has been presented to the examinee, etc. These services are generic to all items and are provided by test driver 110. Item plugins 156 perform the actual scoring of the item, which is unique to each item type. Item plugins 156 present the content of the item and allow the examinee to interact with the item. These services are unique to each item type.

In addition to the interfaces described previously, test driver 110 implements IRegistry interface 220, which allows VB code to access the Windows registry. Test driver 110 also implements ILegacyItem interface 258 and ILegacyScore interface 260, which are defined by test driver 110 and are implements by certain item plugins 156 and scoring plugins 164. ILegacyItem interface 258 and ILegacyScore interface 260 allow old item types that existed in previous test drivers to report results like the previous test drivers. For some tests, test driver 110 must report results for old item types, which had very specific ways of reporting results. ILegacyItem interface 258 and ILegacyScore interface 260 allow the new item plugins 156 that represent old item types to report this legacy format of information to result plugins 166 trying to imitate previous test drivers.

A complete description of test driver 110 classes and interfaces is included in Appendix (Tab 19 & 20).

IV. POLESS

All persistent storages, exam resource file 120 and exam instance file 170, preferably utilize POLESS. POLESS allows data to be embedded, linked, or references as external files from the persistent storage to test driver 110 and Active Document container application 112 (FIG. 3). POLESS supports a hierarchical tree structure with node or branch level additions, replacements, and deletions. POLESS also supports optional data encryption at the node level. The type of encryption employed depends on the destination of the information in the persistent storage. For example, different encryption keys may optionally be used for data being routed to test centers, data being routed to administrative data centers, and data being routed for client use (e.g., client review). Microsoft Crypto-API is preferably used to perform encryption of data in the persistent storage. Finally, POLESS also supports optional compression at the node level, preferably using Lempal-Zev compression.

POLESS is an extension of OLE structured storage compound document implementation. A compound document is a single document that contains a combination of data structures such as text, graphics, spreadsheets, sound and video clips. The document may embed the additional data types or reference external files by pointers of some kind. There are several benefits to structured storage. Structured storage provides file and data persistence by treating a single file as a structured collection of objects known as storage elements and streams. Another benefit is incremental access. If test driver 110 or plugins 150 need access to an object within a compound file, only that particular object need be loaded and saved, rather than the entire file. Additionally, structure storage supports transaction processing. Test driver 110 or plugins 150 can read or write to compound files in transacted mode, where changes made can subsequently be committed or reverted.

A. POLESS Components

Figure 10:
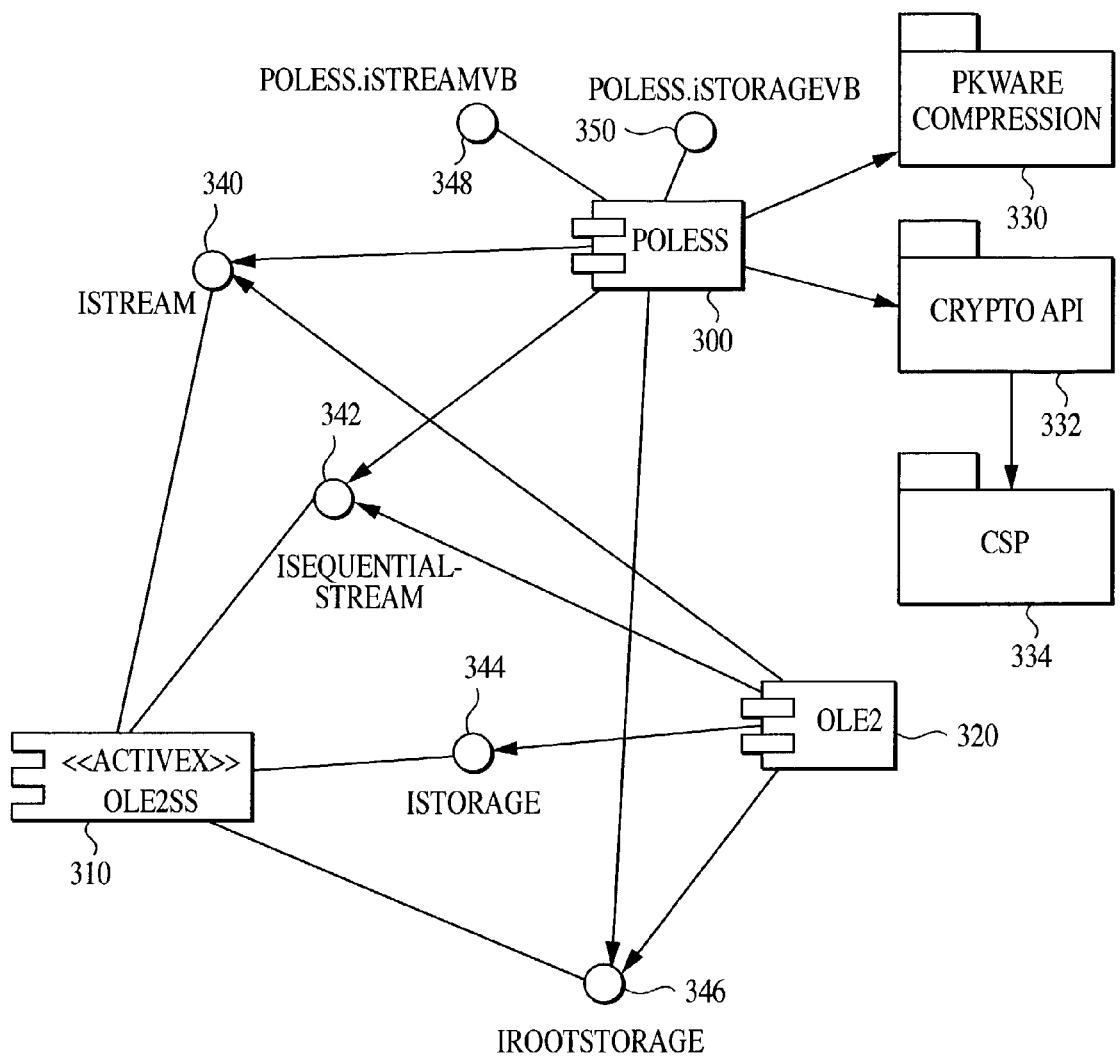
FIG. 10 illustrating the interfaces that comprise a structured storage according to the present invention.

FIG. 10 shows the major components that support POLESS and the interfaces that connect the components. POLESS 300 may be either exam resource file 120 or exam instance file 170. POLESS 300 utilizes PKware library component 330 for storage compression and decompression. POLESS 300 uses Crypto API component 332, a Microsoft application, for storage encryption and decryption. Crypto API component 332 relies on a crypto service provided ("CSP") 334 to perform the actual encryption algorithms. Access to the services of these components is facilitated by standard API interfaces exposed by these components.

OLE2SS component 310 contains all the interface definition that makeup structure storage. These interfaces can be realized by any structured storage implementation, such as compound document implementation OLE2 320 and POLESS 300. The interfaces include, for example: IStream interface 340; ISequentialStream interface 342; IStorage interface 344; and IRootstorage interface 346. POLESS 300 additionally implements IStreamVB interface 348 and IStorageVB interface 350.

IStreamVB interface 348 supports several functions, for example: ReadVB( ); WriteVB( ); Clear( ); Reset( ); get_sName( ); get_oStream( ); and CopyTo( ). ReadVB( ) reads a specified number of bytes to a data array. WriteVB( ) writes the byte data to the stream. Clear( ) clears the stream of all data. Reset( ) sets position to the beginning of the stream. get_sName( ) is a read-only function that returns the name of the stream. get_oStream( ) is a read-only function that returns the IStream interface 348. CopyTo( ) copies a source stream to a destination stream.

IStorageVB interface 350 supports several functions, for example: Clear( ); CommittVB( ); RevertVB( ); sElementName( ); bStorage( ); oElement( ); CreateStream( ); OpenStream( ); CreateStorage( ); OpenStorage( ); get_sName( ); get_oStorage( ); get_nCount( ); GetCompression( ); GetEncryption( ); GetCRC( ); CreateStreamLinked( ); CreatePropertyStg( ); OpenPropertyStg( ); SetClass( ); RegisterAlias( ); Destroy( ); and get_ElementType( ). Clear( ) clears the storage of all elements. CommittVB( ) causes transacted mode changes to be reflected in the parent. RevertVB( ) discards changes made since the last commit. sElementName( ) returns the name of the element. bStorage( ) returns TRUE if the element is a sub-storage. oElement( ) returs IStreamVB interface 348 or IStorage interface VB 350 for the element. CreateStream( ) creates and opens a stream and returns IStreamVB interface 348. OpenStream( ) opens a stream and returns IStreamVB interface 348. CreateStorage( ) creates and opens a nested storage and returns IStreamVB interface 348. OpenStorage( ) opens an existing storage and returns IStreamVB interface 348. get_sName( ) is a read-only function that returns the name of the storage. get_oStorage( ) is a read-only function that returns IStorage interface 350. get_nCount( ) is a read-only function that returns a count of the elements. GetCompression( ) returns the status of file compression. GetEncryption( ) returns the status of file encryption. GetCRC( ) returns the status of file CRC checking. CreateStreamLinked( ) creates and opens a linked stream and returns IStreamVB interface 348. CreatePropertyStg( ) creates and opens a property storage and returns IpropertyStorageVB interface 414. OpenPropertyStg( ) opens a property storage and returns IpropertyStorageVB interface 414. SetClass( ) sets the CLSID for the storage. RegisterAlias( ) registers a pluggable protocol. Destroy( ) destroys the specified elements. get_ElementType( ) is a read-only function that returns the type of the element.

B. POLESS Classes

Figure 11B:
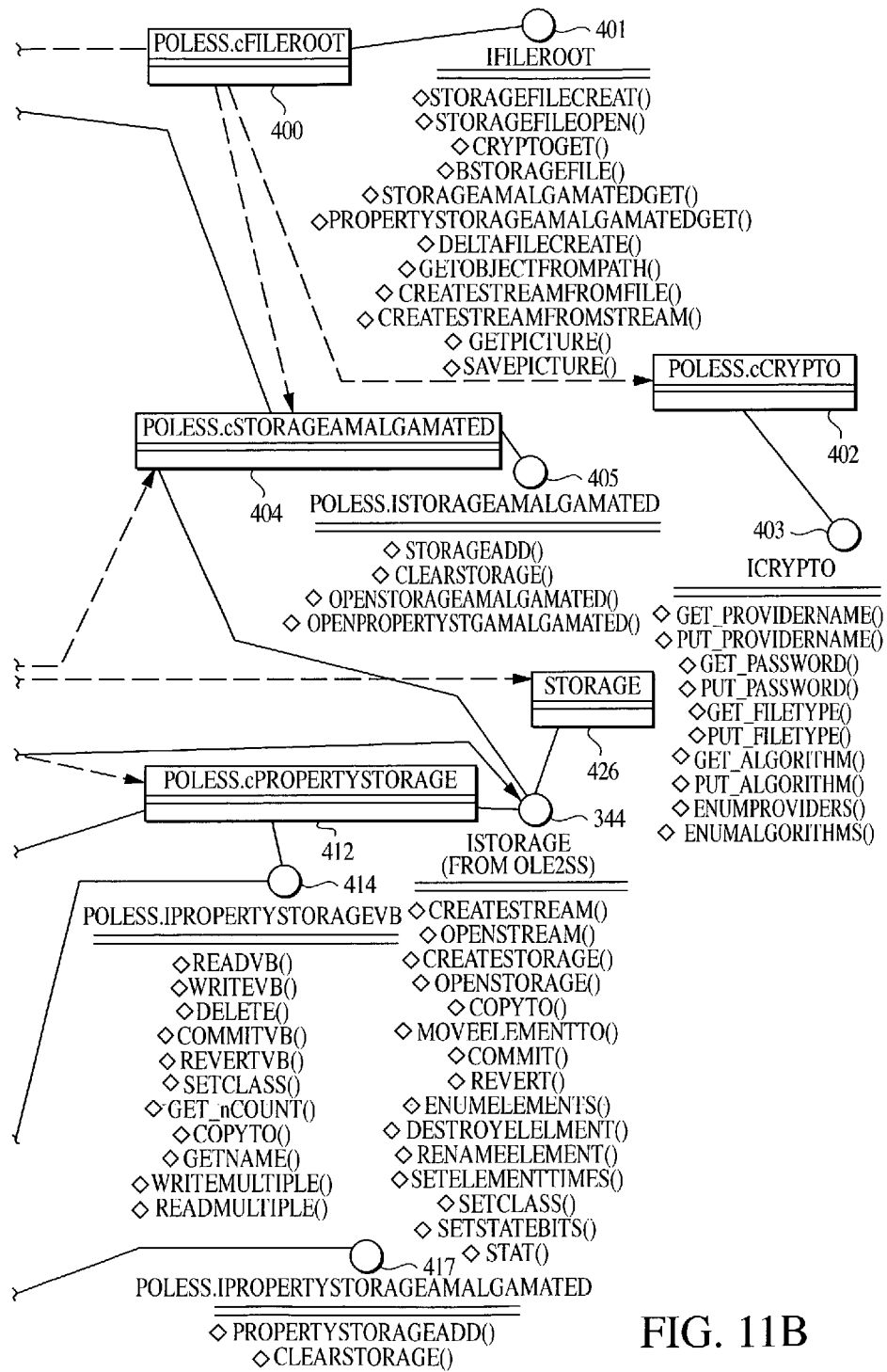

FIGS. 11A and 11B illustrate the main class of POLESS 300, the interfaces used to implement the classes, and the flow of the creation of streams 424 and storages 426. cFileRoot class 400 is the first object instantiated and is used to create a new or open an existing a POLESS file. cStorageRoot class 406 is returned, which is a slightly overloaded version of cStorage class 410. From cStorageRoot class 406 creates or opens cStream class 408 and cStorage class 410, from which any streams or storages and sub-storages of those can be created or opened, respectively. For instance, cStorage class 410 creates cPropertyStorage class 412, which creates storage for property sets. The classes implement interfaces that perform operations and/or define attributes that further define the function or properties of the class. A complete description of POLESS 300 classes and interfaces is included in Appendix (Tab 21).

1) cFileRoot Class cFileRoot class 400 is the root POLESS class and controls the creation and opening of all POLESS files. cFileRoot class 400 is generally instantiated first before any other POLESS objects can be created, although other sequences are possible. cFileRoot class 400 implements IFileRoot interface 401, which is collocated in FIG. 10 with cFileRoot class 400. IFileRoot interface 401 is used to open one file at a time and is not released until all other storage object 426, stream object 424, and property storage interfaces are released and the file is ready to be closed. cFileRoot class 400 and IRoot interface support the following operations, for example: StorageFileCreate( ); StorageFileOpen( ); CryptoGet( ); bStorageFile( ); StorageAmalgamatedGet( ); DeltaFileCreate( ); DeltaFileApply( ); GetObjectFromPath( ); CreateStreamFromBSTR( ); MemoryStreamFromStream( ); GetPicture( ); and SavePicture( ).

StorageFileCreate( ) creates a new storage file, returns the root storage to interface, marks the new structured storage file as a POLESS file by storing the class ID ("CLSID") of this class in a stream in the root storage. StorageFileOpen( ) opens an existing storage file and returns the root storage interface. CryptoGet( ) gets a default configured crypto class and should be set and used on the open or create of the storage file. bStorageFile( ) returns true if the file provided is an OLLE structured storage file and not a POLESS storage file. StorageAmalgamatedGet( ) gets an empty small cStorageAmalgamated class 404. DeltaFileCreate( ) creates a POLESS difference file by comparing the original POLESS file to the updated POLESS file. DeltaFileApply( ) applies a POLESS delta file and applies the original POLESS file to the delta file to create an updated POLESS file. GetObjectFromPath( ) uses monikers to retrieve the object named by the path and returns a pointer to the object retrieved. CreateStreamFromFile( ) creates a structured storage stream and populates it with the contents of the file. CreateStreamFromBSTR( ) creates a structures storage stream and fills it with the specified string. MemoryStreamFromStream( ) is used to copy a stream to a newly created memory stream object. GetPicture( ) loads a picture from stream object 424. SavePicture( ) saves the picture into the stream 426.

2) cCrypto Class cCrypto class 402 controls the configuration of the encryption/decryption of POLESS 300. cCrypto class 402 has the following attributes, for example: sProviderName; eProviderType; sContainerName; and sPassword. SProviderName represents the name of CSP 334 being used to perform the encryption/decryption services. eProviderType is the type of CSP 334. The field of cryptography is large and growing. There are many different standard data formats and protocols. These are generally organized into groups or families, each of which has its own set of data formats and way of doing things. Even if two families used the same algorithm, for example, the RC2 block cipher, they would often use different padding schemes, different key links, and different default modes. Crypto API is designed so that a CSP provider type represents a particular family. sContainerName is the key name and must be provided by cCrypto class 402. sPassword is an optional password on the public/private key pair and can only be entered by a human operator. The password can be used for review disks and their resource files.

cCrypto class 402 implements ICrypto interface 401 and they support the following properties and method, for example: ProviderName; Password; FileType; Algorithm; EnumProviders( ); and EnumAlgorithms( ). Get_ProviderName( ) returns the name of the Crypto provider. Put_ProviderName( ) sets the name of the Crypto provider. Get_Password( ) and Put_Password( ) are only used for sponsor resource files. Get_FileType( ) gets the file type and put_FileType( ) sets the file type. Get_Algorithm( ) gets the encryption algorithm and put_Algorithm( ) sets the encryption algorithm. EnumProviders( ) returns an enumerator for the list of installed providers. EnumAlgorithms( ) enumerate a list of algorithms for the current provider.

3) cStorageAmalgamated Class cStorageAmalgamated class 404 is an implementation of IStorage interface 344. cStorageAmalgamated class 404 holds references to an ordered collection of IStorage objects. When a stream is opened, cStorageAmagalmated class 404 searches the collection of storage objects in order to find the first storage object that has the requested stream and returns this stream. cStorageAmalgamated class 404 handles compound storage resolution and delegates all other work to cStorage class 410. cStorageAmalgamated class 404 is, for example, read-only. cStorageAmalgamated class 404 will not allow stream or storages to be created but is primarily for reading exam resource file 120. cStorageAmalgamated class 404 implements IStorageAmalgamated interface 405. cStorageAmalgamated class 404 and IStorageAmalgamated interface 405 support the following operations, for example: StorageAdd( ); Clearstorage( ); OpenStorageAmalgamated( ); and OpenPropertyStgAmalgamated( ). StorageAdd( ) adds a new storage to the collection of storages. Clearstorage( ) clears all the storage objects from the collection. OpenStorageAmalgamated( ) opens a sub-storage of the current amalgamated storages in an amalgamated fashion. OpenPropertyStgAmalgamated( ) opens a property storage of the current amalgamated storages in an amalgamated fashion. Amalgamation is described in greater detail, in the co-pending application filed on the same date, entitled "EXTENSIBLE EXAM LANGUAGE (XXL) PROTOCOL FOR COMPUTER BASED TESTING," incorporated herein by reference.

4) cStorageRoot Class cStorageRoot class 406 is the POLESS implementation of IStorage interface 344 and IRootstorage interface 346. cStorageRoot class 406 handles any storage object 426 that is POLESS specific and then delegates work to the cStorage class 410. IRootstorage interface 346 supports the SwitchToFile( ) operation, which copies the current file associated with the storage object to a new file, which is then used for the storage object and any uncommitted changes. cStorageRoot class 406 also implements IPersistFile interface 418, which provides methods that permit an object to be loaded from or saved to a disk file, rather than a storage object or stream. Because the information needed to open a file varies greatly from one application to another, the implementation of IPersistFile::Load on the object preferably also open its disk file. IPersistFile interface 418 inherits its definition from IPersist, so all implementations must also include the GetClassID( ) method of IPersist interface 418.

5) cStream Class cStream class 408 is the POLESS implementation of IStream interface 340. cStream class 408 handles any storage object 426 that is POLESS specific and then delegates work to compound document implementation OLE2 320. The specific work includes compression/decompression and encryption/decryption of stream object 424.

IStream interface 340 supports the following operations, for example: Seek( ); SetSize( ); CopyTo( ); Committ( ); Revert( ); LockRegion( ); UnlockRegion( ); Stat( ); and Clone( ). Seek( ) changes the seek pointer to a new location relative to the beginning of stream object 424, the end of stream object 424, or the current seek pointer. SetSize( ) changes the size of stream object 424. CopyTo( ) Copies a specified number of bytes from the current seek pointer in stream object 424 to the current seek pointer in another stream object 424. Commit( ) ensures that any changes made to a stream object 424 open in transacted mode are reflected in the parent storage object. Revert( ) discards all changes that have been made to a transacted stream since the last call to IStream::Commit. LockRegion( ) restricts access to a specified range of bytes in stream object 424. Supporting this functionality is optional since some file systems do not provide this operation. UnlockRegion( ) removes the access restriction on a range of bytes previously restricted with IStream::LockRegion. Stat( ) retrieves the STATSTG structure for the stream object 424. Clone( ) creates a new stream object that references the same bytes as the original stream but provides a separate seek pointer to those bytes.

IStreamVB interface 348 is an automation friendly version of IStream interface 340. IStreamVB interface 348 supports the following operations, for example: Read( ); Write( ); Clear( ); Reset( ); get_sName( ); get_oStream; and Copy To( ). Read( ) reads data from stream object 424. Write( ) writes data, including the entire byte array, to stream object 424. Clear( ) clears stream object 424 of all data. Reset( ) resets the position in stream object 424 to the beginning of stream object 424. Get_sName( ) returns the name of the stream. Get_oStream( ) returns the IDispatch interface. CopyTo( ) copies the contents of a source stream to a destination stream.

6) cStorage Class cStorage class 410 is the POLESS implementation of IStorage interface 344 and IcStorage interface 411. cStorage class 410 handles any storage object 426 that is POLESS specific and then delegates work to compound document implementation OLE2 320.

IStorage interface 344 supports the following operations, for example: CreateStream( ); OpenStream( ); CreateStorage( ); OpenStorage( ); CopyTo( ); MoveElementTo( ); Commit( ); Revert( ); EnumElements( ); DestroyElement( ); RenameElement( ); SetElementTimes( ); SetClass( ); SetStateBits( ); and Stat( ). CreateStream( ) creates and opens a stream object 424 with the specified name contained in a storage object. OpenStream( ) opens an existing stream object 424 within a storage object using specified access permissions. CreateStorage( ) creates and opens a new stream object 424 within a storage object. OpenStorage( ) opens an existing storage object 426 with the specified name according to the specified access mode. CopyTo( ) copies the entire contents of an open storage object 426 into another storage object. The layout of the destination storage object may differ from the layout of the source storage object. MoveElementTo( ) copies or moves a sub-storage or stream object 424 from one storage object 426 to another storage object.

Commit( ) reflects changes for a transacted storage object 426 to the parent level. Revert( ) discards all changes that have been made to the storage object 426 since the last IStorage::Commit operation. EnumElements( ) returns an enumerator object that can be used to enumerate storage objects 426 and stream objects 424 contained within a storage object. DestroyElement( ) removes the specified storage object 426 or stream object 424 from a storage object. RenameElement( ) renames the specified storage object 426 or stream object 424 in a storage object. SetElementTimes( ) sets the modification, access, and creation times of the indicated storage element, if supported by the underlying file system. SetClass( ) assigns the specified CLSID to a storage object. SetStateBits( ) stores state information in a storage object, for example up to 32 bits. Stat( ) returns the STATSTG structure for an open storage object.

IStorageVB interface 350 is an automation friendly version of IStorage interface 344. IStorageVB interface 350 supports the following operations, for example: Clear( ); Commit( ); Revert( ); sElementName( ); bstorage( ); bElement( ); CreateStream( ); OpenStream( ); Createstorage( ); Openstorage( ); get_sName( ); getoStorage( ); get_nCount( ); GetCompression( ); GetEncryption( ); GetCRC( ); CreateStreamLinked( ); CreatePropertyStg( ); OpenProperty Stg( ); SetClass( ); RegisterAlias( ); Destroy( ); and get_ElementType( ). Clear ( ) clears the storage of all elements, e.g. sub-storages and streams. Commit( ) ensures that any changes made to a storage object opened in transacted mode are reflected in the parent storage. For non-root storage objects in direct mode, this method has no effect. For a root storage, it reflects the changes in the actual device, for example, a file on disk. For a root storage object open in direct mode, the commit( ) method is always called prior to releasing the object. Commit( ) flushes all memory buffers to the disk for a root storage in direct mode and will return an error code upon failure. Although releasing the object also flushes memory buffers to disk, it has no capacity to return any error codes upon failure. Therefore, calling releasing without first calling commit( ) causes indeterminate results. Revert( ) discards all changes that have been made to the storage object since the last Commit( ) operation.

sElement( ) returns the name of the element. bstorage( ) returns true if the element is a sub-storage. bElement( ) returns either iStreamVB interface 412 or iStreamVB interface 414 or IStorageVB interface 412 for the selected element. CreateStream( ) creates and opens a stream object with the specified name contained in the storage object. Nothing is returned if the stream cannot be created. OpenStream( ) opens an existing stream object within this storage object in the specified access mode. Nothing is returned if the stream cannot be opened. Createstorage( ) creates and opens a new storage object nested within the storage object. Nothing is returned if the storage cannot be created. Openstorage( ) opens an existing storage object with a specified name in the specified access mode. Nothing is returned if the storage cannot be opened. Get_sName( ) returns the name of the storage. Get_oStorage( ) returns the IDispatch interface, which exposes objects, methods and properties to programming tools and other applications that support Automation. COM components implement the IDispatch interface to enable access by Automation clients, such as Visual Basic.

Get_nCount( ) returns the count of elements in the storage. GetCompression( ) determines if streams may be compressed in the file and if enabled streams may optionally be compressed when created. GetCRC( ) indicates whether a cyclic-redundancy-check ("CRC"), or a digital signature, check is to be performed on the file. CreateStreamLinked( ) creates a link to a stream in another POLESS file. CreatePropertyStg( ) creates a property storage. OpenPropertyStg( ) opens a property storage. SetClass( ) assigns the specified CLSID to a storage object. RegisterAlias( ) registers an alias to a storage in the POLESS file for access by the pluggable protocol. Destroy( ) destroys the specified element. Get_Element Type( ) is a read-only command that returns the type of the element.

7) cPropertyStorage Class cPropertyStorage class 412 implements IPropertyStorage interface 413, which supports the following operations, for example: ReadMultiple( ); WriteMultiple( ); DeleteMultiple( ); ReadPropertyNames( ); WritePropertyNames( ); DeletePropertyNames( ); SetClass( ); Commit( ); Revert( ); Enum( ); Stat( ); and SetTimes( ). ReadMultiple( ) reads property values in a property set. WriteMultiple( ) writes property values in a property set. DeleteMultiple( ) deletes property values in a property set. ReadPropertyNames( ) gets corresponding strung names fro given property identifiers. WritePropertyNames( ) creates or changes string names corresponding to given property identifiers. DeletePropertyNames( ) deletes string names for given property identifiers. SetClass( ) assigns a CLSID to a property set. Commit( ) flushes or commits changes to a property storage object, as is done with the command IStorage::Commit, described previously. Revert( ) discards all changes made since the last commit call when a property storage is opened in transacted mode. Enum( ) creates and gets a pointer to an enumerator for properties within a property set. Stat( ) receives statistics about a property set. SetTimes( ) sets modification, creation, and access times for a property set.

IPropertyStorageVB interface 414 is an automation friendly version of IPropertyStorage interface 413 that manages the persistent properties of a single property set. IPropertyStrorageVB interface 414 supports the following operations, for example: ReadVB( ); WriteVB( ); Delete( ); CommitVB( ); RevertVB( ); SetClass( ); get_ncount( ); CopyTo( ); GetName( ); WriteMultiple( ); and Read Multiple( ). ReadVB( ) reads the value of a specified property from the property set. WriteVB( ) writes a value for a specified property to the property set. If the property does not exist the property/value pair will be created. If the property already exists, the value will be updated if opened in eAccess_Write mode. Delete( ) removes a property from the property set. CommitVB( ) flushes or commits changes to a property storage object, as is done with the command IStorage::Commit, described previously. RevertVB( ) discards all changes made since the last commit call when a property storage is opened in transacted mode. SetClass( ) assigns the specified CLSID to a property storage object. Get_nCount( ) returns the count of properties in the property set. CopyTo( ) copies the contents of the source property set to a destination property set. GetName( ) returns the name of the specified property. WriteMultiple( ) writes property values in a property set. ReadMultiple( ) reads property values in a property set.

8) cPropertyStorageAmalgamated Class cPropertyStorageAmalgamated class 416 implements IPropertyStorageAmalgamated interface 417, which supports the following operations, for example: PropertyStorageAdd( ) and ClearStorage( ). PropertyStorageAdd( ) adds a property set to the collection of property sets. ClearStorage( ) clears the collection of property sets.

C. POLESS Exam Resource File

FIGS. 14 and 15-26 illustrate the POLESS layout of exam resource file 120 according to the present invention. Exam resource file 120 stores the various pieces of compiled information from exam source files 130, as shown in FIG. 6. Exam resource file 120 contains all of the content required to deliver the test. However, where the test is media-intense, exam resource file 120 will contain the core elements for the test with "links" to the external content. XXL compiler 140 and plugins 150 store the compiled information to exam instance file 120 using one of IPersistResourceStream interface 192a, IPersistResourceSet interface 192b, or IPersistResourceStore interface 192 to store the compiled information as a stream of data, a set of data, or a storage element, respectively. In a preferred embodiment, the layout of exam resource file 120 is in a hierarchical POLESS format that directly implements the format of the XXL test definition language. The test developer uses the XXL test definition language to create the logic files 230 and data files 212 (FIG. 6) of exam source file 130. By having a storage structure that follows the format of the XXL test definition language, the incremental access aspect of POLESS is easily implemented. XXL compiler 140 determines the storage location in exam resource file 120 that stores a particular piece of compiled information, even information stored into exam resource file 120 by one of plugins 150.

Figure 12:
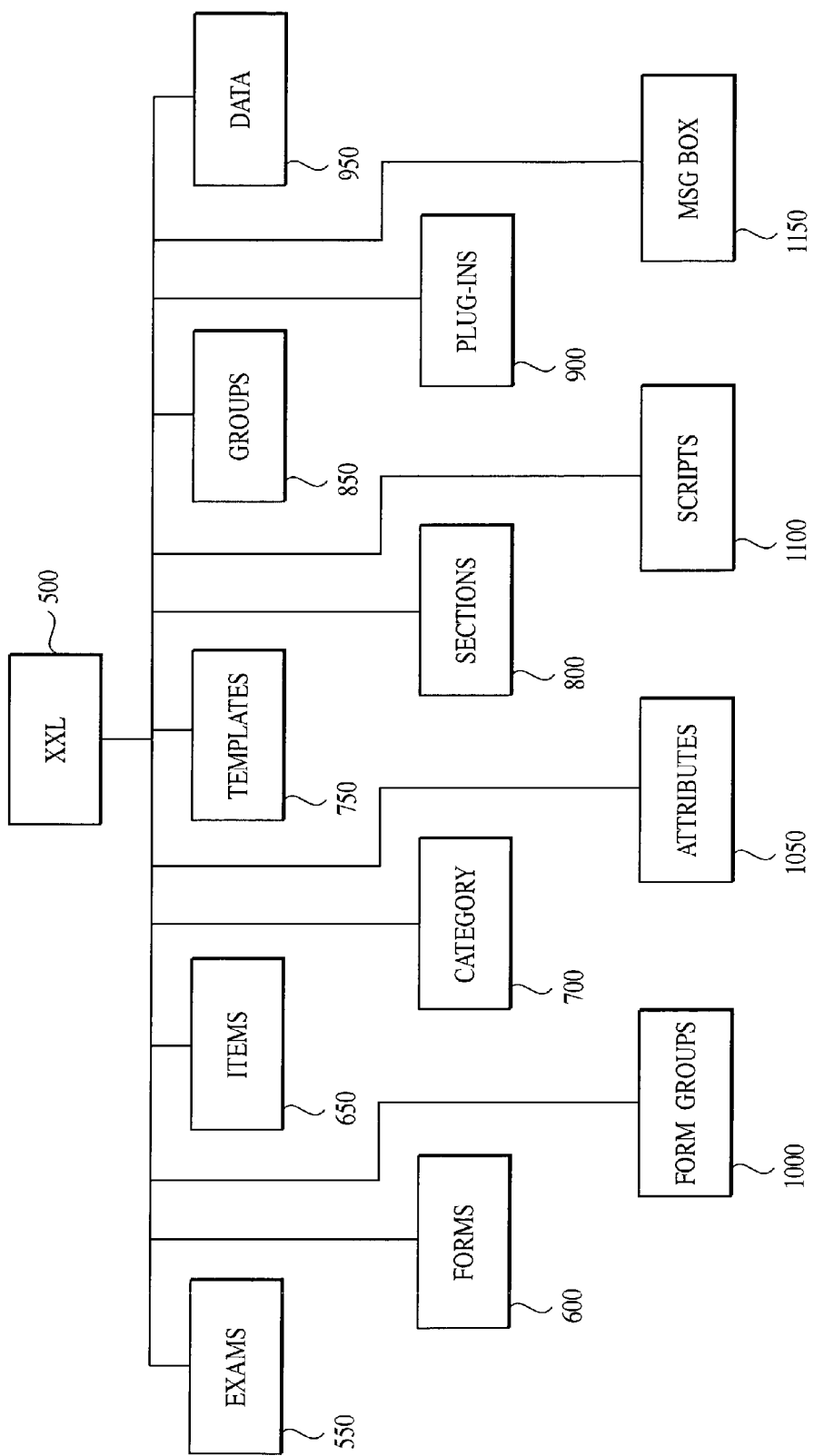
FIG. 12 is a block diagram of main storage branches of an exam resource file according to the present invention.

FIG. 12 illustrates the main storage branches of exam resource file 120, which corresponds to the top-level elements of the XXL test definition language, denoted by reference numeral 500. The main storage branches of exam resource file 120 are, for example: exams branch 550; forms branch 600; items branch 650; category branch 700; templates branch 750; sections branch 800; groups branch 850; plugins branch 900; data branch 950; formGroups branch 1000; attributes branch 1050; scripts branch 1100; and message box ("Msgbox") branch 1150. Other storage branches may alternatively be used.

Figure 13:
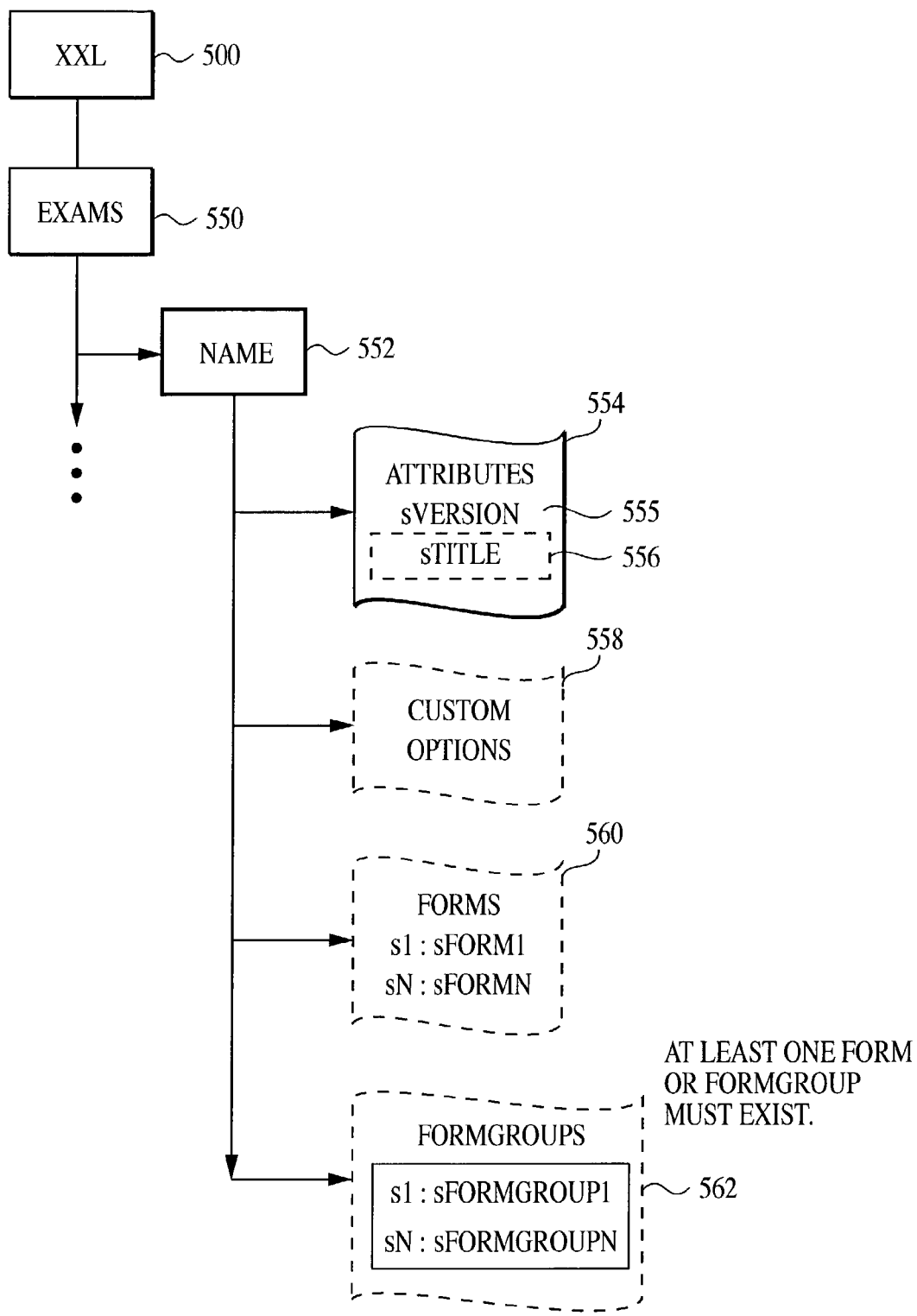
FIG. 13 is a block diagram illustrating an exams branch of the exam resource file.

Exam branch 550, as seen in FIG. 13, stores, for example, the primary attributes, properties, and data that govern the test. Exam branch 550 can store information for various tests, as is denoted by the three, vertical ellipses. A specific test is identified by the data stored in name attribute storage 552. Again, the various tests may each be identified, for example, by a different name, as denoted by the solid border around name attribute storage 552 or other identification scheme. Attributes storage 554 stores, for example, version information 555, and title information 556 of the test as a stream of data. Title information 556 is optional, as is denoted by the broken border. Any optional, customized information regarding the test is stored in custom properties 558 as a property storage. Information relating to the forms of the test are optionally stored in forms property storage 560. A form is a fixed or substantially fixed order of testing events. Many different forms can be stored in forms storage 560, giving flexibility to test driver 110 in controlling progression of the test. FormGroups storage 562 optionally stores information relating to a collection of exam forms as a stream of data. Preferably, a single form from the formGroup is chosen to deliver to an examinee. The selection of the form from the group is performed by a selection plugin 160. Exam branch 550 preferably contains at least one forms storage 560 either independently or within formGroups storage 562. Other information relating to the test may be stored under exam branch 550. Other storage formats may optionally be used.

Figure 14A:
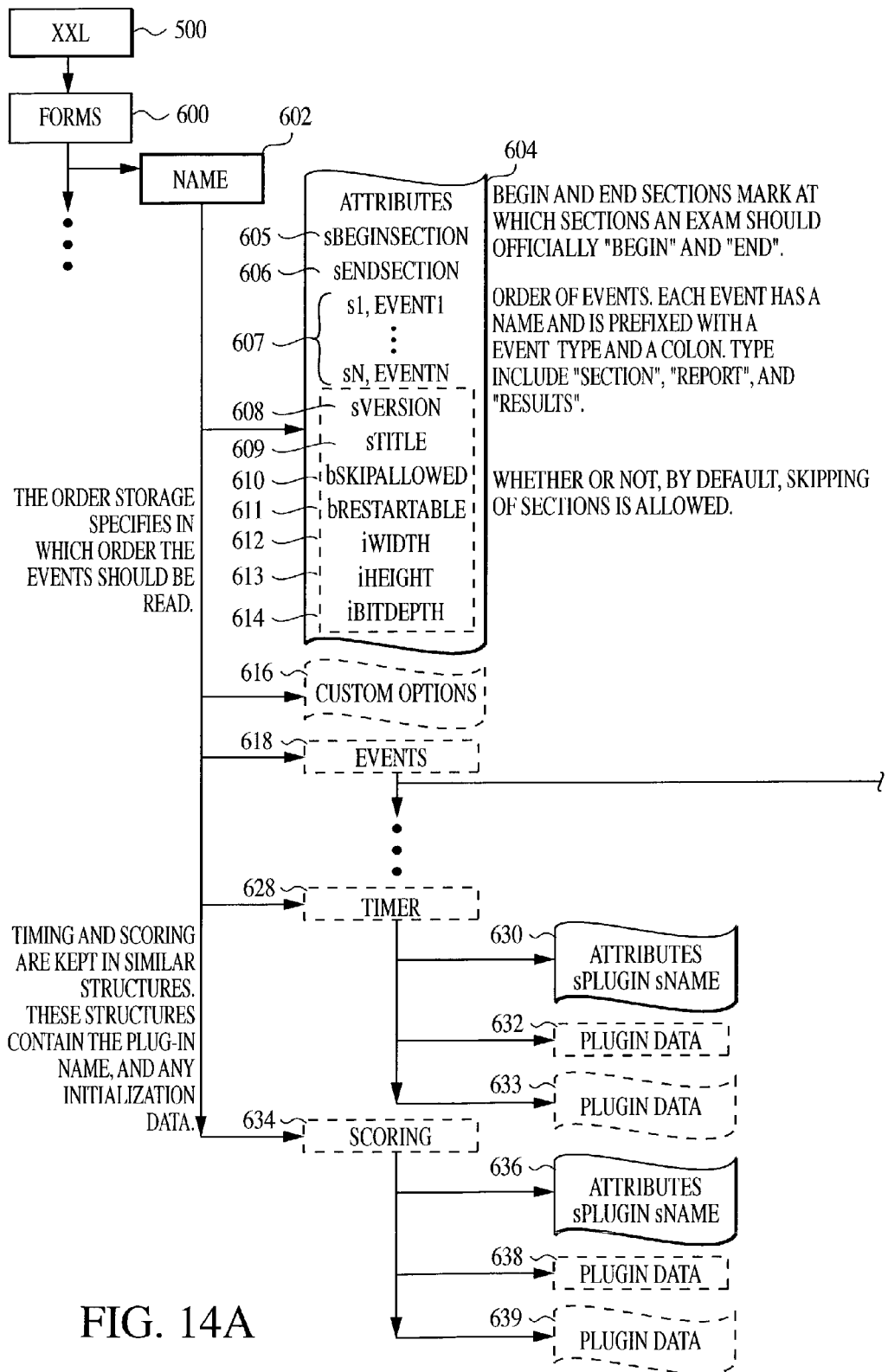
FIGS. 14A and 14B is a block diagram illustrating a forms branch of the exam resource file.
Figure 14:
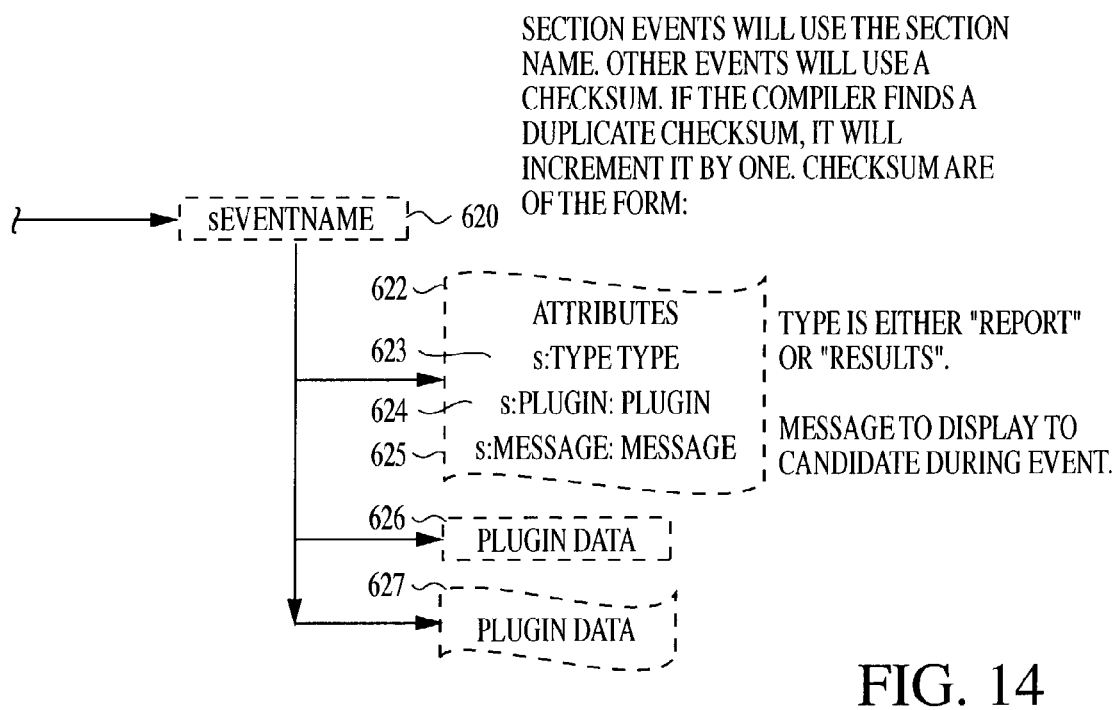
Figure 14B:
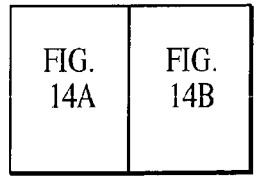

Forms branch 600, as seen in FIGS. 14A and 14B, stores, for example, the primary attributes, properties, and data that govern the progress of the test. Forms branch 600 can store information for various forms, as is denoted by the three, vertical ellipses. As described previously, a form is a fixed or substantially fixed order of testing events. A single form is identified by the data stored in name attribute storage 602. Other identification formats may optionally be used. Again, the various forms may each be identified by a different name, as denoted by the solid border around name attribute storage 602. Attribute storage 604 stores, for example, begin section information 605, end section information 606, event information 607, and optionally stores version information 608, title information 609, skip allowed information 610, restartable information 611, with information 612, height information 613, and bit depth information 614. All information stored in attribute storage 604 is stored as a stream of data or other data storage format. Begin section information 605 and end section information 606 indicates, for example, respectively which section of the test begins and ends the test.

Event information 607 indicates, for example, the order of events of the test for that form. Each event has a name and is prefixed with an event type and a colon. Other formats are optional. The event type includes "section", "report", and "results". Version information 608 and title information 609 indicate the version and title of the form, respectively. Skip allowed information 610 indicates, for example, whether or not by default skipping of sections is allowed. Restartable information 611 indicates, for example, whether the form can be restarted. Any optional, customized information regarding the form is stored in custom storage 616 as a property set or other data storage format. Timer storage 628 stores, for example, information relating to how the form is to be timed as a storage element. Attributes storage 630 stores, for example, the names of Timer Plugin 158 to be used with the form. Plugin data storage 632 and plugin data storage 633 store any data necessary for timer plugin 158 as a storage element and a stream of data, respectively. Plugin data storage 632 and plug in data storage 633 are optional. Scoring storage 634 stores, for example, information relating to the scoring of the form. Attributes storage 636 stores, for example, the name of scoring plugin 164 to be used with the form. Plugin data 638 and plugin data 639 optionally store any data needed for scoring Plugin 164 as a storage element and a stream of data respectively.

Figure 15:
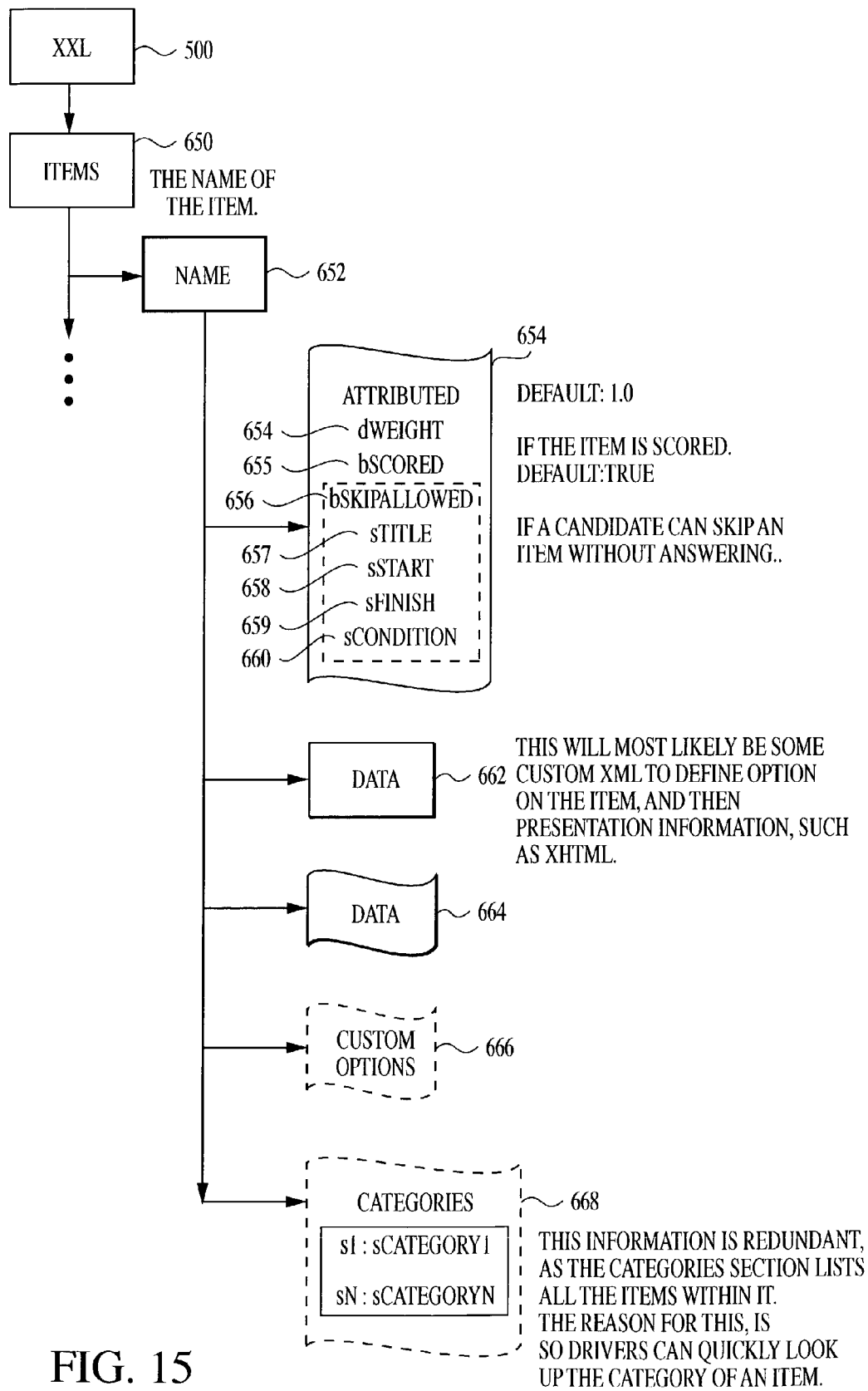
FIG. 15 is a block diagram illustrating an items branch of the exam resource file.

Items Branch 650, as seen in FIG. 15, stores, for example, the primary attributes, properties, and data that govern the items, or test questions, to be delivered to the examinee during the test. Items branch 650 can store information for various items, as is denoted by the three, vertical ellipses. A single item is identified by the data stored in name attributes storage 652. Again, the various items may each be identified by a different name, as denoted by the solid border around name attributes storage 652. Attributes storage 654 stores, for example, weight information 654, scored information 655, and optionally stores skip allowed information 656, title information 657, start information 658, finish information 659, and condition information 660. Weight information 654 indicates, for example, a value used for judging and scoring the item.

In one embodiment, by default an item is given a weight of one in accordance with one embodiment, but other values may be utilized. Scored information 655 indicates, for example, whether or not the item is scored as opposed to whether the item is being used as an example. The default of scored information 655 is true. Skip allowed information 656 indicates, for example, whether the examinee can skip the item without answering. Start information 658 indicates, for example, script execution at the beginning of the item and finish information 659 indicates, for example, script execution at the end of the item. Condition information 660 indicates, for example, whether or not there is a condition on the item being delivered to the examinee. The information stored in attributes storage 654 is stored as a stream of data or other data storage format. Data storage 662 and data stream 664 store any information regarding the properties of the item. For example, data storage 662 or data stream 664 can store the correct answer of a multiple choice item. Data storage 662 and data stream 664 stored the information as a storage element and a stream of data respectively. Any optional, customized information regarding the item is stored in customs storage 666 as a stream of data or other data storage format. Category storage 668 stores, for example, information relating to each category to which the item belongs. The information stored in category storage 668 preferably and optionally is redundant, as category branch 700 stores, for example, all the items within the specific categories. The reason for the optional redundancy is so that test driver 110 can quickly look up the category of any item.

Figure 16:
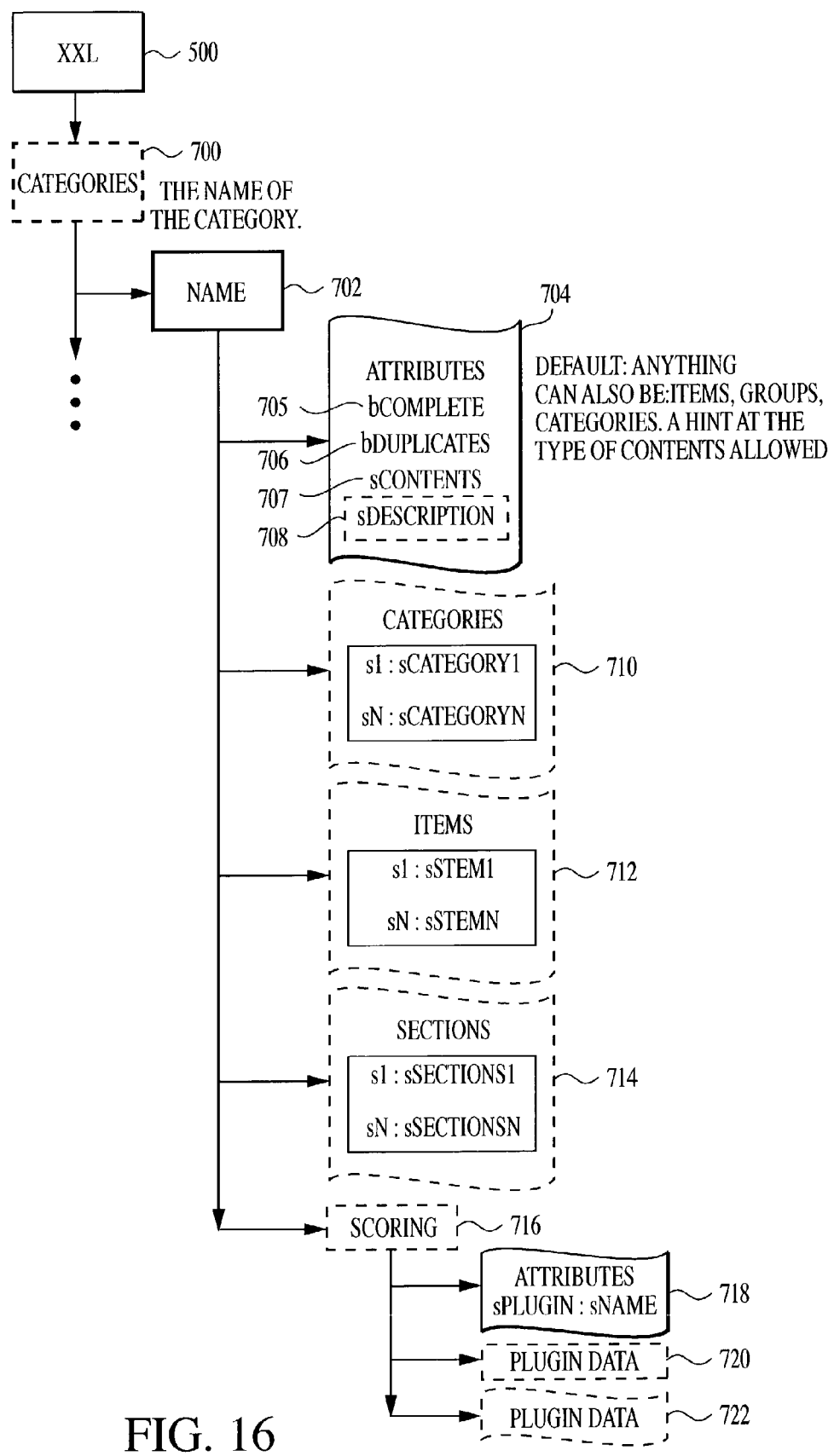
FIG. 16 is a block diagram illustrating a categories branch of the exam resource file.

Category branch 700, as seen in FIG. 16, stores, for example, the primary attributes, properties, and data that govern the test categories. A test category provides a grouping mechanism, which is independent of delivery of the test, allowing for exotic reporting and scoring if necessary. Category branch 700 is optional as denoted by the broken border. Category branch 700 can store information for various categories, as is denoted by the three, vertical ellipses. A single category is identified by the data stored in name attributes storage 702. Again, the various categories may each be identified by a different name, as denoted by the solid border around name attributes storage 702. Attributes storage 704 stores, for example, complete information 705, duplicates information 706, contents information 707, and optionally stores description information 708. Complete information 705 indicates, for example, whether or not every item in the category must appear within the category or within its subcategories. Duplicates information 706 indicates, for example, whether the item can appear more than once within the category or within the subcategories. Contents information 707 determines what can exist within a category. Description information 708 is used within the category to contain a description of the category's contents. Category storage 710 stores, for example, information relating to any subcategories under the category identified in name attribute storage 702. Items storage 712 indicates, for example, any items that exist within the category. Sections storage 714 contains information indicating what any sections that exist within the category. Scoring storage 716 contains information relating to the scoring of the items within the category. Attributes storage 718 stores, for example, the name of the scoring plugin to be used with the item. Data storage 720 and data stream 722 contain the information needed to initialize scoring plugin 164. Data storage 720 and data stream 722 store the information as a storage element and a stream of data respectively.

Figure 17:
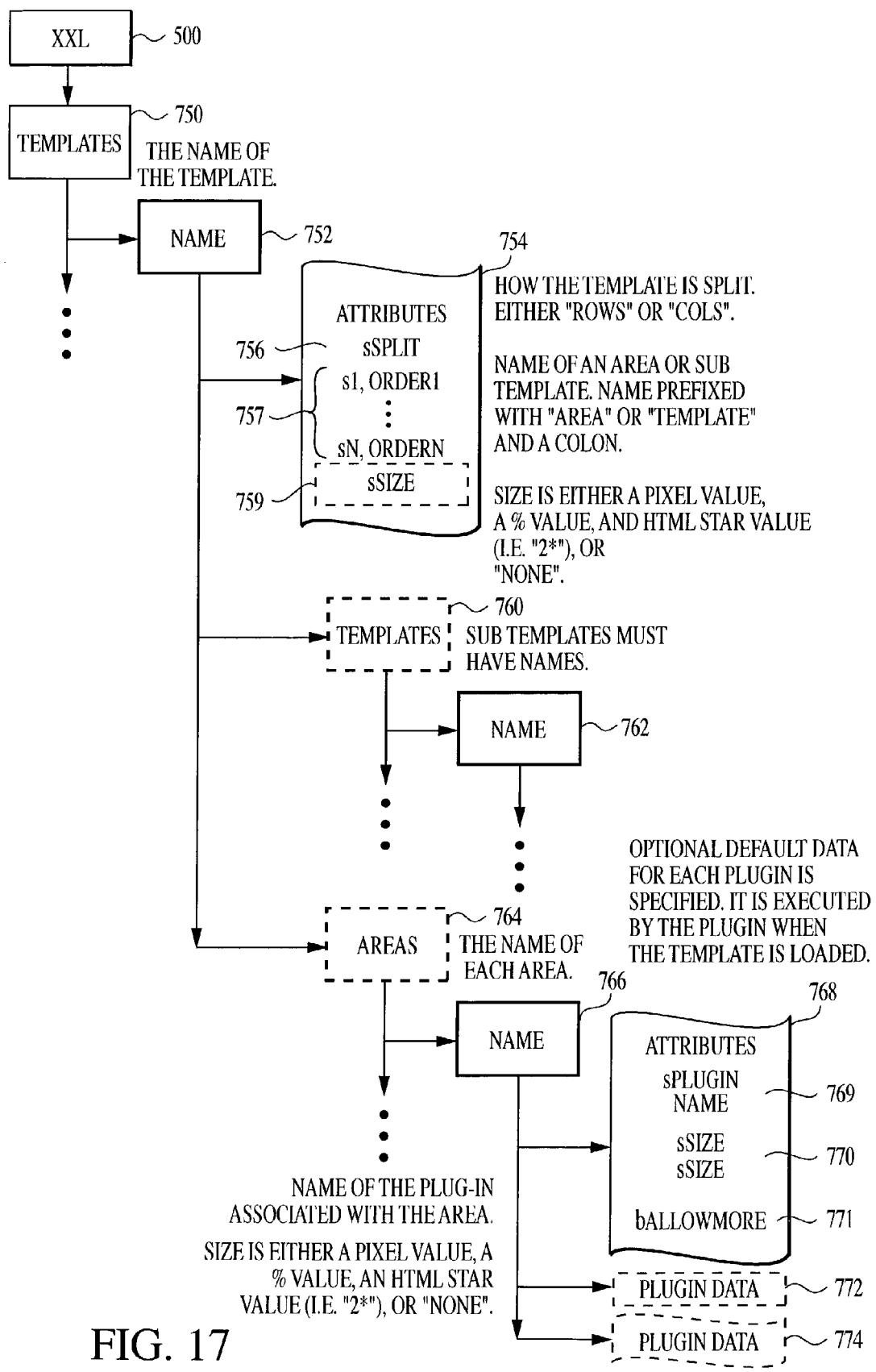
FIG. 17 is a block diagram illustrating a templates branch of the exam resource file.

Templates branch 750, as seen in FIG. 17, stores, for example, the primary attributes, properties, and data that govern the templates used in the test. Template branch 750 can store information for various main templates, as is denoted by the three, vertical ellipses. A single main template is identified by the data stored in name attributes storage 752. Again, the various templates may each be identified by a different name, as denoted by the solid border around name attributes storage 752. Attributes storage 754 stores, for example, split information 756, order information 757, and optionally stores size information 759. Split information 656 defines how a specific area within the template is to be split or separated, for example, either by rows or columns. Size information 759 indicates, for example, possible values for describing the size of the template, for example, pixels, percentages, or html syntax. Template storage 760 stores, for example, information relating to any sub-templates to be used under the templates specified by the information in name attributes storage 752. Sub-templates are identified by the information in name attributes storage 762. Many sub-templates 760 can exist as denoted by the three vertical ellipses.

Areas storage 764 indicates, for example, information relating to the areas used within the template denoted by the information in name attributes storage 752. Many areas may exist within a template as denoted by the three vertical ellipses. Each area is identified by the information stored in name attribute storage 766. Attribute storage 768 stores, for example, visible plugin name information 760, size information 770, and allow more information 771. Plugin name information 760 indicates, for example, the name of the visible plugin to be used with the area. Size information 770 indicates, for example, the size of the area, as for example a pixel value, a percentage value, or HTML syntax. Plugin data 772 and plugin data 774 store information relating to the visible plugin to be used in the area. The data stored in either plugin data storage 772 or plugin data stream 774 is executed by the visible plugin when the template is loaded. Plugin data storage 772 and plugin data stream 774 stores, for example, the information as either a storage element or a stream of data, respectively. Other information may optionally be stored.

Figure 18:
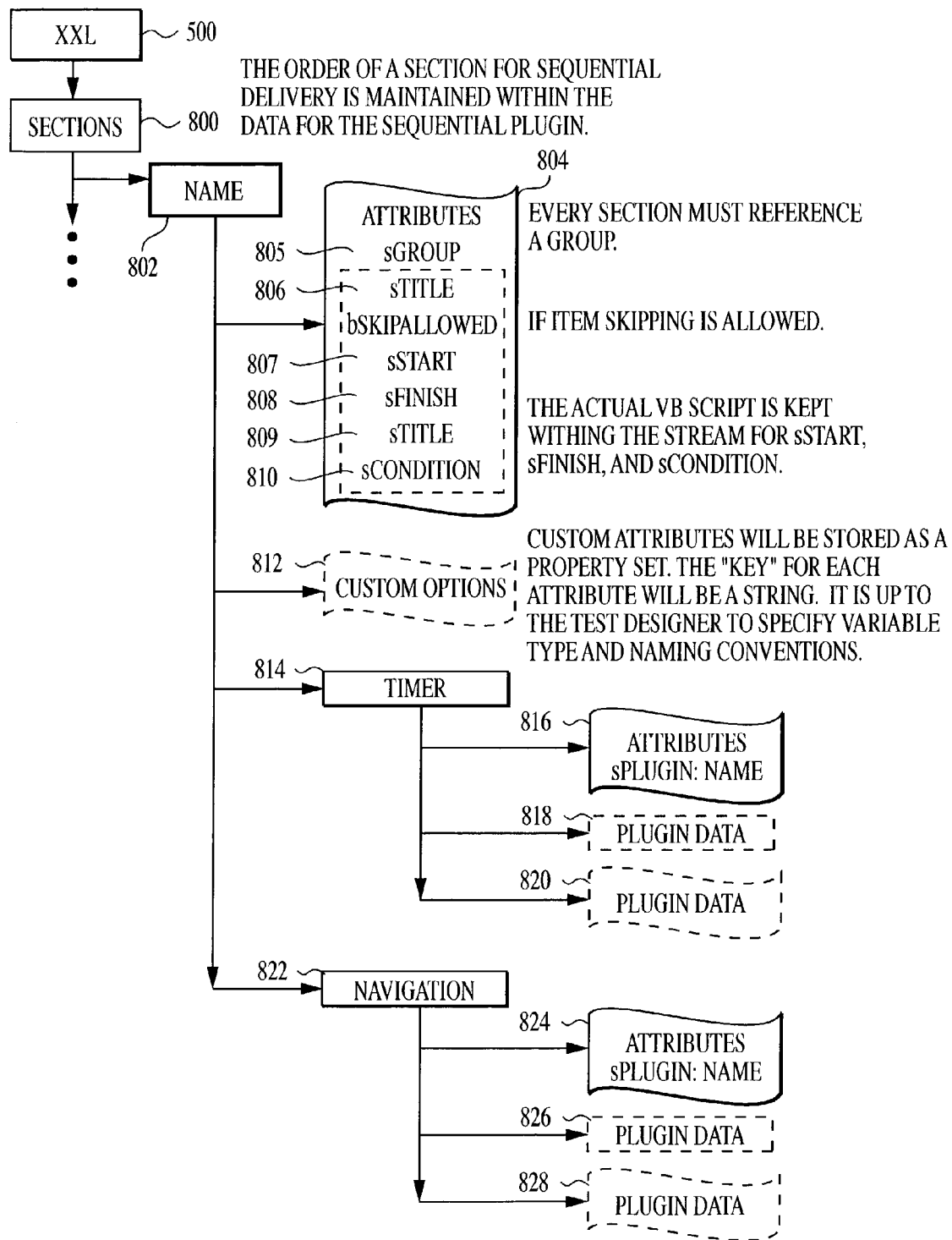
FIG. 18 is a block diagram illustrating a sections branch of the exam resource file.

Section branch 800, as seen in FIG. 18, stores, for example, the primary attributes, properties, and data that govern test sections. Test sections dictate the navigation and timing of groups of items as well as displays within the test. Sections branch 800 can store information for various sections, as is denoted by the three, vertical ellipses. A single section is identified by the data stored in name attribute storage 802. Again, the various sections may each be identified by a different name, as noted by the solid border around name attributes storage 802. Attributes storage 804 stores, for example, group information 805 and optionally stores title information 806, skip allowed information 807, start information 808, finish information 809, and condition information 810. Group information 805 indicates, for example, to which group of the test the section belongs. Skip allowed information 807 indicates, for example, whether or not the items within the section may be skipped. Start information 808 indicates, for example, script execution at the beginning of the section and finish information 809 indicates, for example, script execution at the end of the section. Condition information 810 indicates, for example, any conditions that exist regarding the section. Any optional, customized information regarding this section is stored in custom property storage 812 as a stream of data or other data storage format. Custom attributes will be stored as a property set. The "key" for each attribute will be a string.

Figure 19:
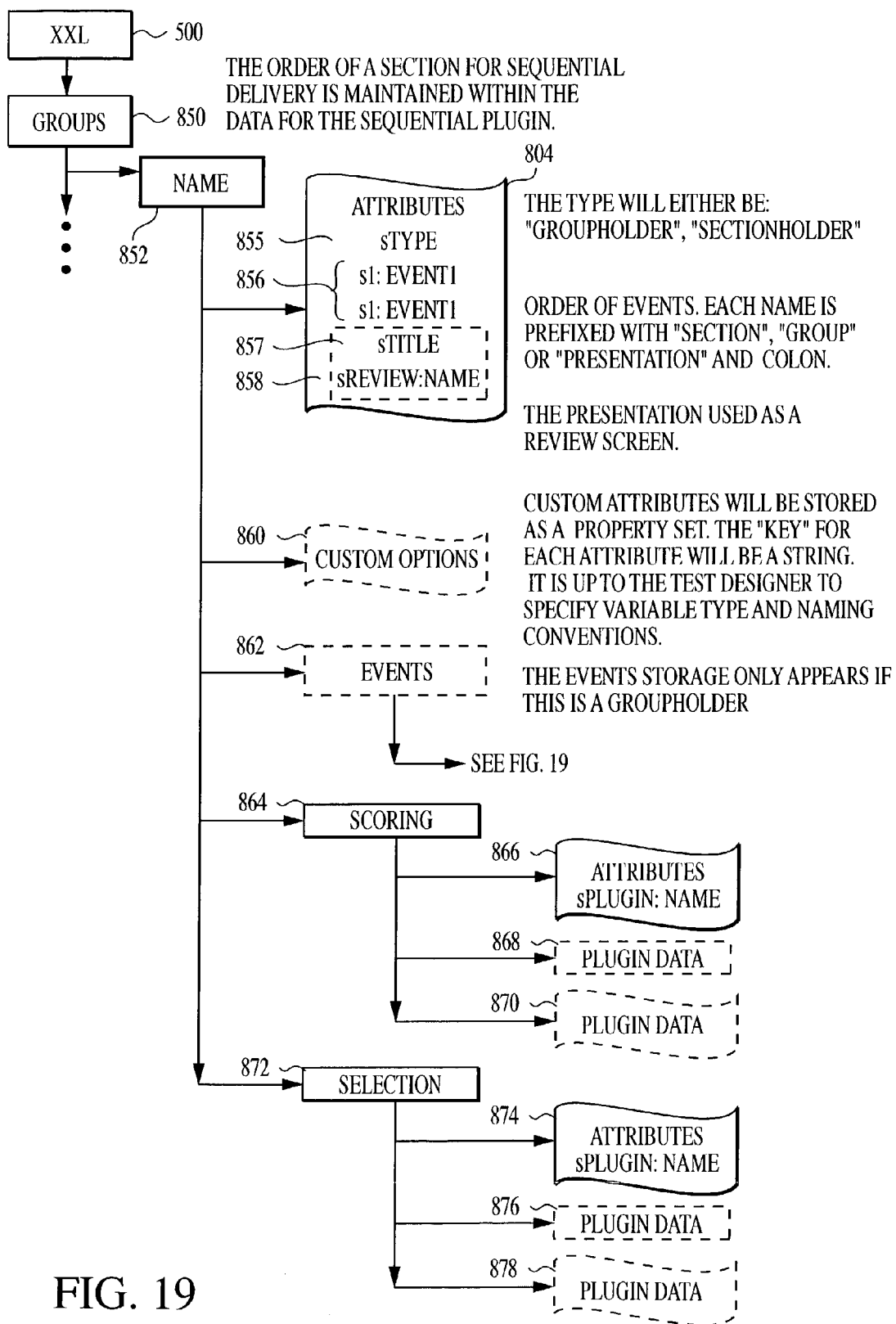
FIG. 19 is a block diagram illustrating a groups branch of the exam resource file.

Timer storage 814 stores, for example, information regarding the timing of the section. Attribute storage 816 stores, for example, information identifying timer plugin 158, which is to be used with a section. Plugin data storage 818 and plugin data storage 820 stores, for example, data needed for timer plugin 158. Plugin data storage 818 and plugin data storage 820 stores, for example, information as a storage element and a string of data or other acceptable format respectively. Navigation storage 822 stores, for example, information relating to the delivery of presentations and groups within the section. Attributes storage 824 stores, for example, information indicating which navigation plugin 162 is to be used with this section. Plugin data storage 826 and plugin data stream 828 store information needed for the navigation plugin 162. Plugin data storage 826 and plugin data stream 828 store the information as a storage element and a stream of data respectively. Groups branch 850, as seen in FIG. 19, stores, for example, the primary attributes, properties, and data that govern the groups within the test. A group determines the order of events within the test. Groups branch 850 can store information for various groups, as is denoted by the three, vertical ellipses. A single group is identified by the data store in name attributes storage 852. The various groups may each be identified by a different name, as noted by the solid border around name attributes storage 852. Attributes storage 854 stores, for example, type information 855, event information 856, title information 857, and reviewed name information 858. Type information 855 indicates, for example, whether the group is either a "group holder" (group of presentations), or a "section holder" (group of sub-sections). These are mutually exclusive.

Event information 856 indicates, for example, the order of events within the test. Review name information 858 indicates, for example, whether or not a presentation within the group is to be used as a review screen. Any optional, customized information regarding the group is stored in custom storage 860 as a stream of data or other data storage format. Events storage 862 stores, for example, event information as is described in further detail in FIG. 20. Scoring storage 864 stores, for example, information relating to the scoring of items within the group. Attributes storage 866 stores, for example, information indicating which scoring plugin 164 is to be used with the group. Selection storage 872 stores, for example, information relating to the selection of items within the group. Attributes storage 874 indicates, for example, which selection plugin 160 is to be used with the group.

Figure 20A:
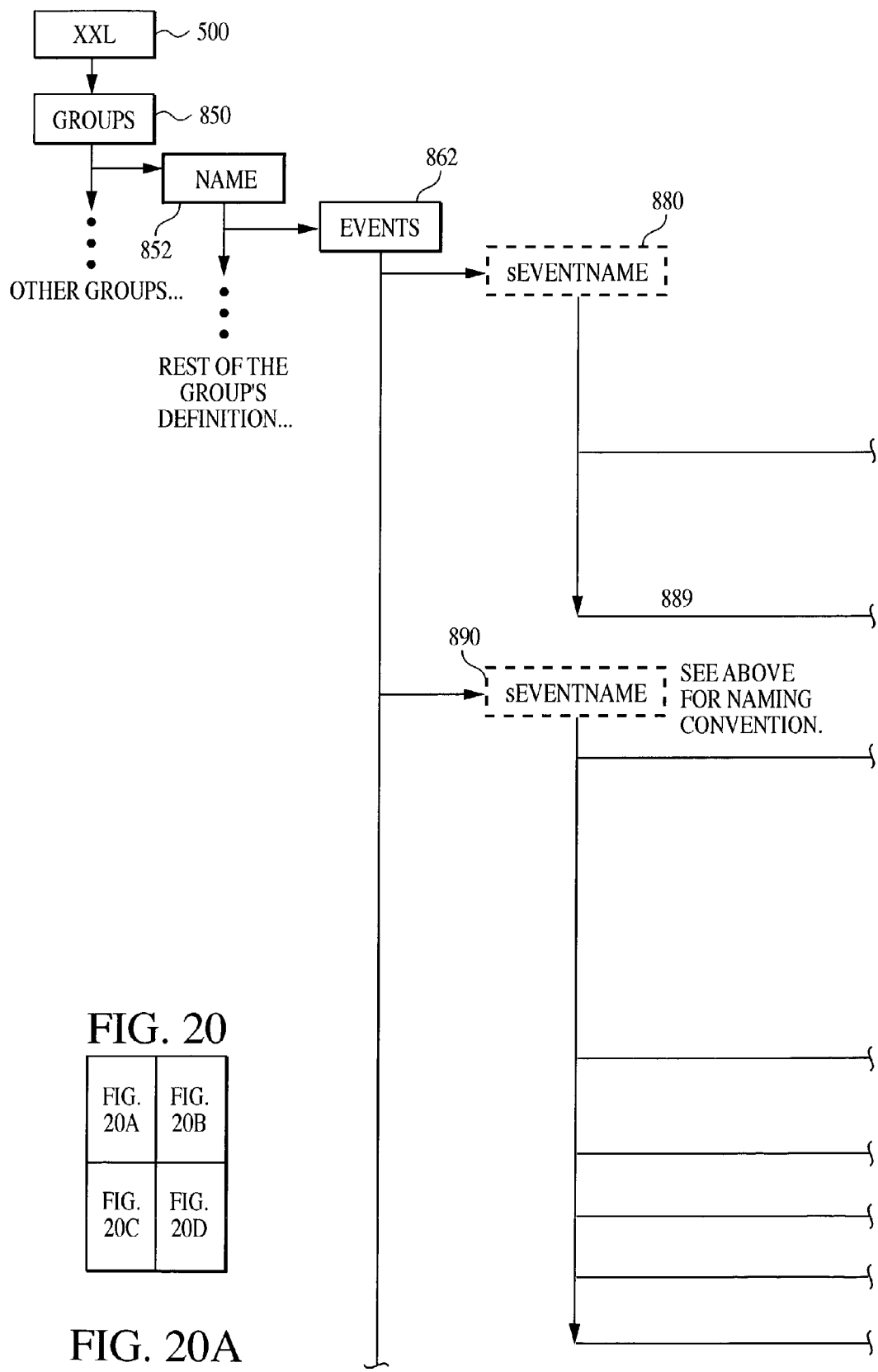
FIGS. 20A, 20B, 20C, and 20D are block diagrams illustrating an events sub-branch of the groups branch of the exam resource file.
Figure 20B:
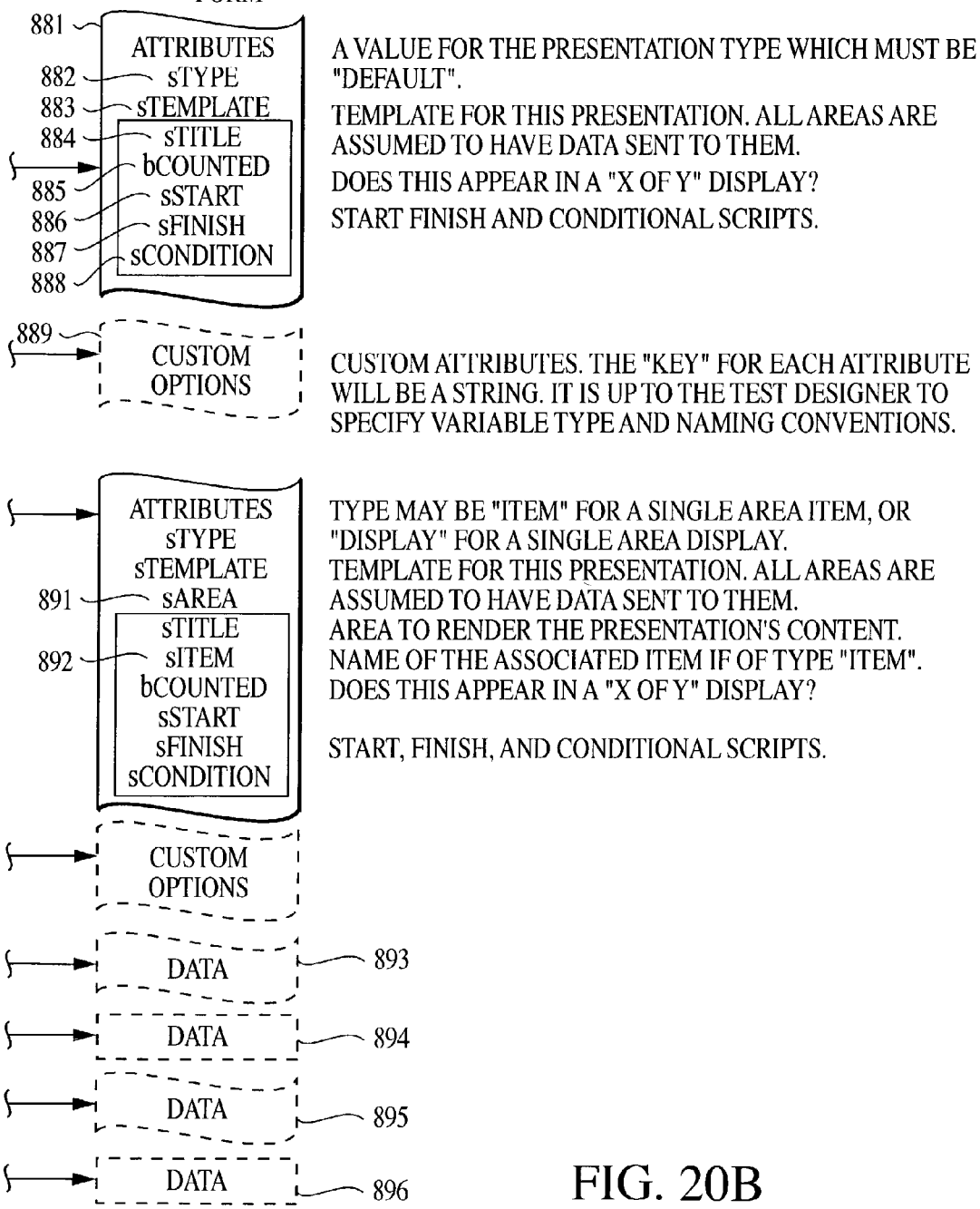
Figure 20C:
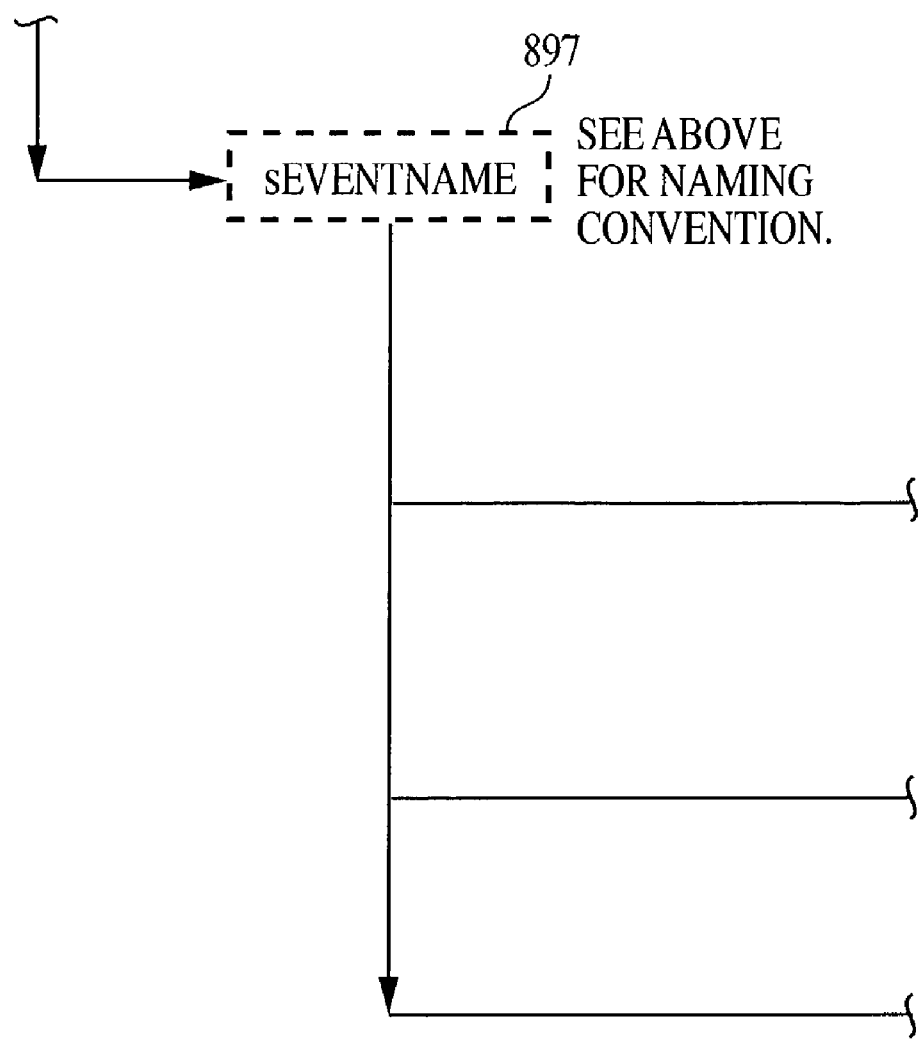
Figure 20D:
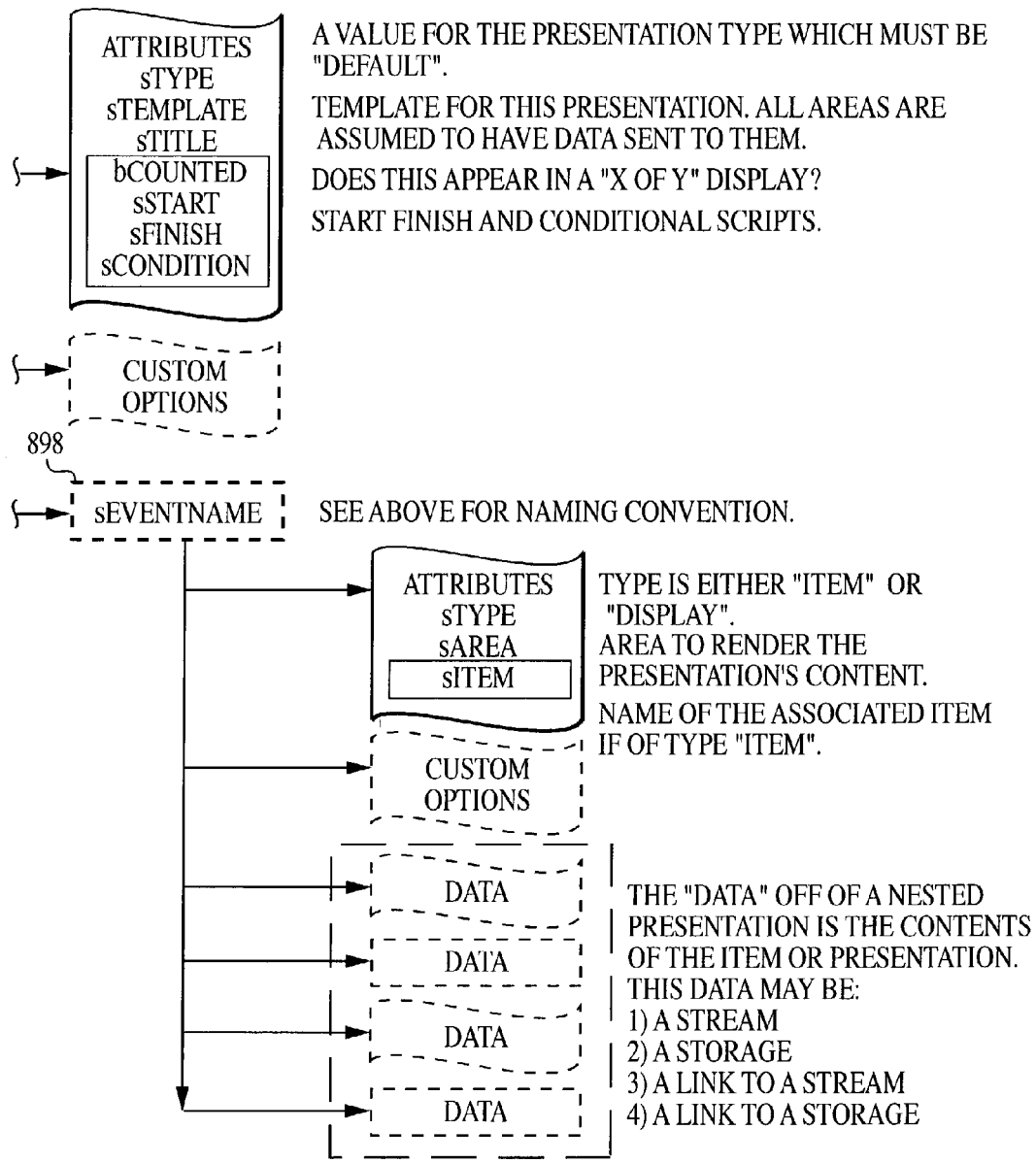

FIGS. 20A, 20B, 20C, and 20D illustrate the events sub-branch of groups branch 850 in greater detail in accordance with one embodiment of the invention. In FIG. 20A, events sub-branch 862 can store information for various events. For example, events sub-branch 862 is storing information in events name sub-branch 880, event name sub-branch 890, and event name sub-branch 897. Attributes storage 881, in FIG. 20B, under events name storage 880 stores, for example, type information 882, template information 883, and optionally stores title information 884, counted information 885, start information 886, finish information 887, and condition information 888. Type information 882 indicates, for example, whether the event is an item or a display. Template information 883 indicates, for example, which template is being used with the event. Counted information 885 indicates, for example, whether a presentation should be included in the totals of presentations presented to the examinee in a section. Generally, presentations with items, or questions, are counted and introductory presentations are not counted. Start information 886, finish information 887, and condition information 888 indicates, for example, start, finish, and conditional scripts respectively. Any optional, customized information regarding the event is stored in custom storage 889. The "key" for each custom attribute will be a string. Event name storage 890 indicates, for example, a different event, which contains different attributes. Additionally, area information 891 indicates, for example, which area is rendering the presentations content and item information 892 indicates, for example, the name of the associated item if the event is of the item type. Additionally, data storage 893, data stream 894, data storage 895, and data storage 896 contain information used in a nested presentation. The data off of a nested presentation are the contents of the item or the presentation. This data may be a stream, a storage, a link to a stream, a link to a storage, or other format. In FIG. 20C, event name 897 indicates, for example, another event, which includes a sub-event 898, in FIG. 20D.

Figure 21:
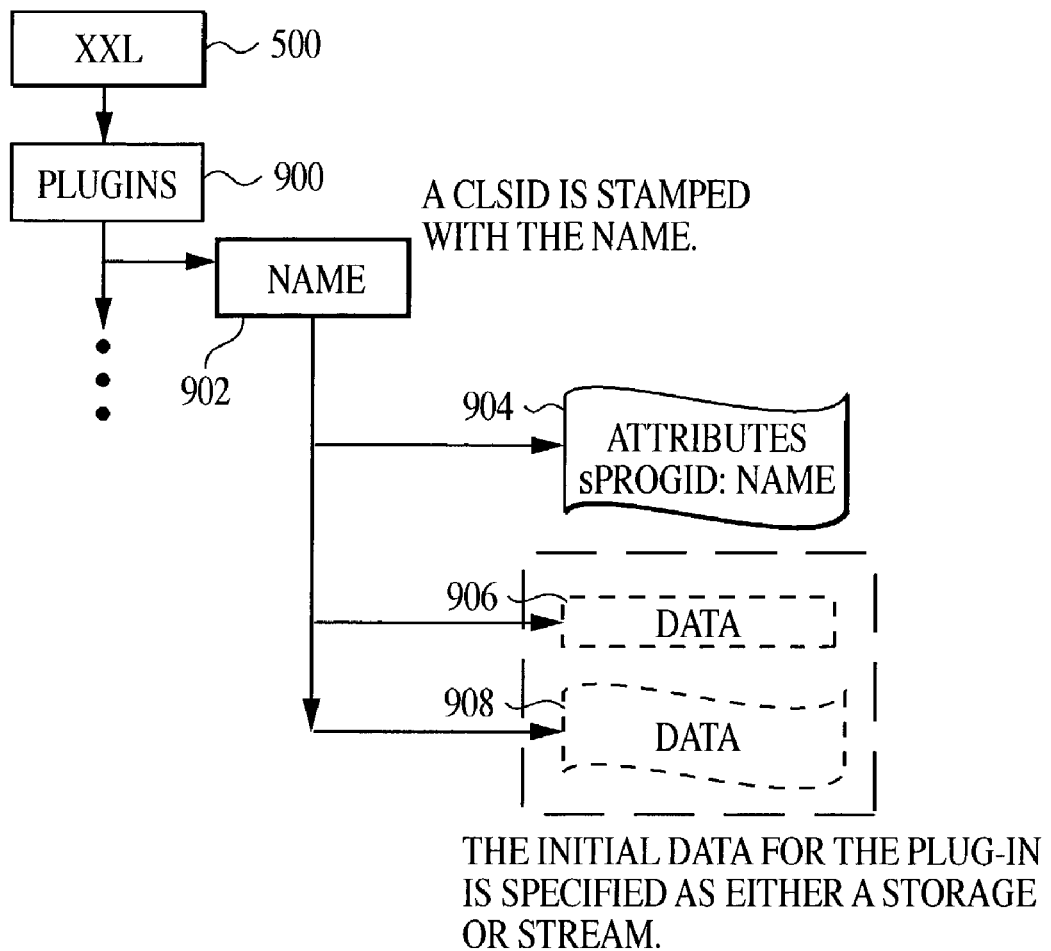
FIG. 21 is a block diagram illustrating a plugins branch of the exam resource file.

Plugins branch 900, as seen in FIG. 21, stores, for example, the primary attributes, properties, and data that govern any plugins 150 used for the test. Plugins branch 900 can store information for various plugins, as is denoted by the three, vertical ellipses. A single plugin is identified by the data stored in name attribute storage 902. A CLSID is stamped with the name of the plugin 150. Attributes storage 904 stores, for example, information identifying the plugin 150 by a program ID. Data storage 906 and data storage 908 store initial data for the plugin as either a storage element or a stream of data respectively.

Figure 22:
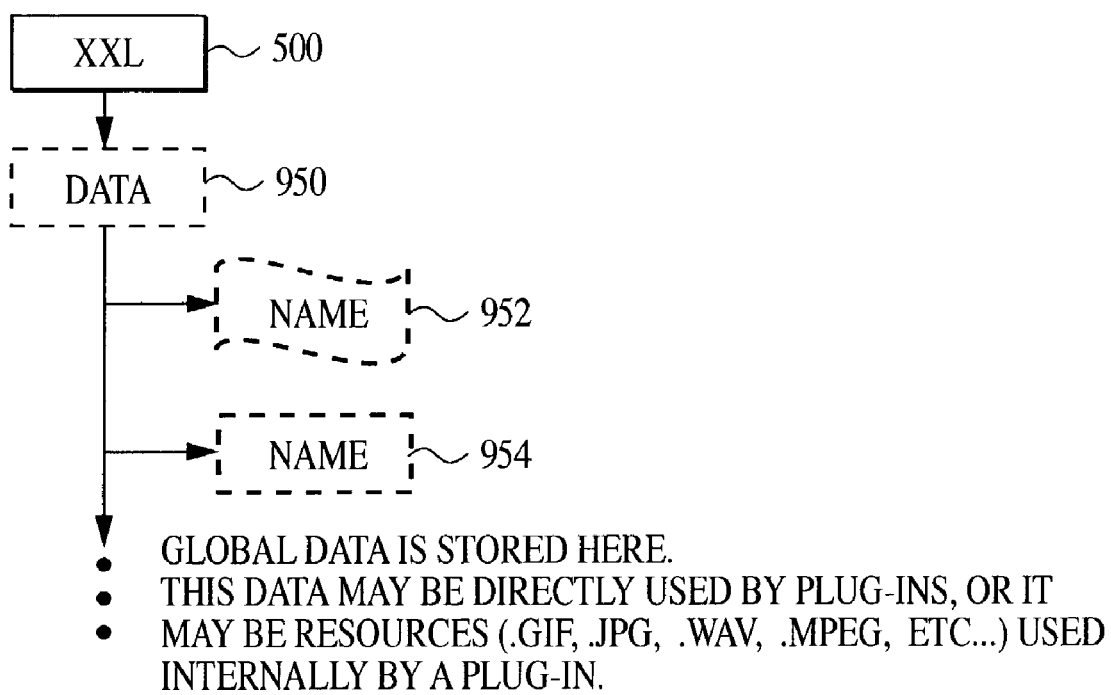
FIG. 22 is a block diagram illustrating a data branch of the exam resource file.

Data branch 950, as indicated in FIG. 22, stores, for example, any global data needed for the test. Data stored optionally under data branch 950 may be stored as either a storage element or a stream of data as indicated by data storage 952 and data storage 954. Data stored under data branch 950 may be directly used by a plugin 150 or the data may be resources (.gif, .jpeg, .wab, .mpeg, etc.) used internally by a plugin 150.

Figure 23:
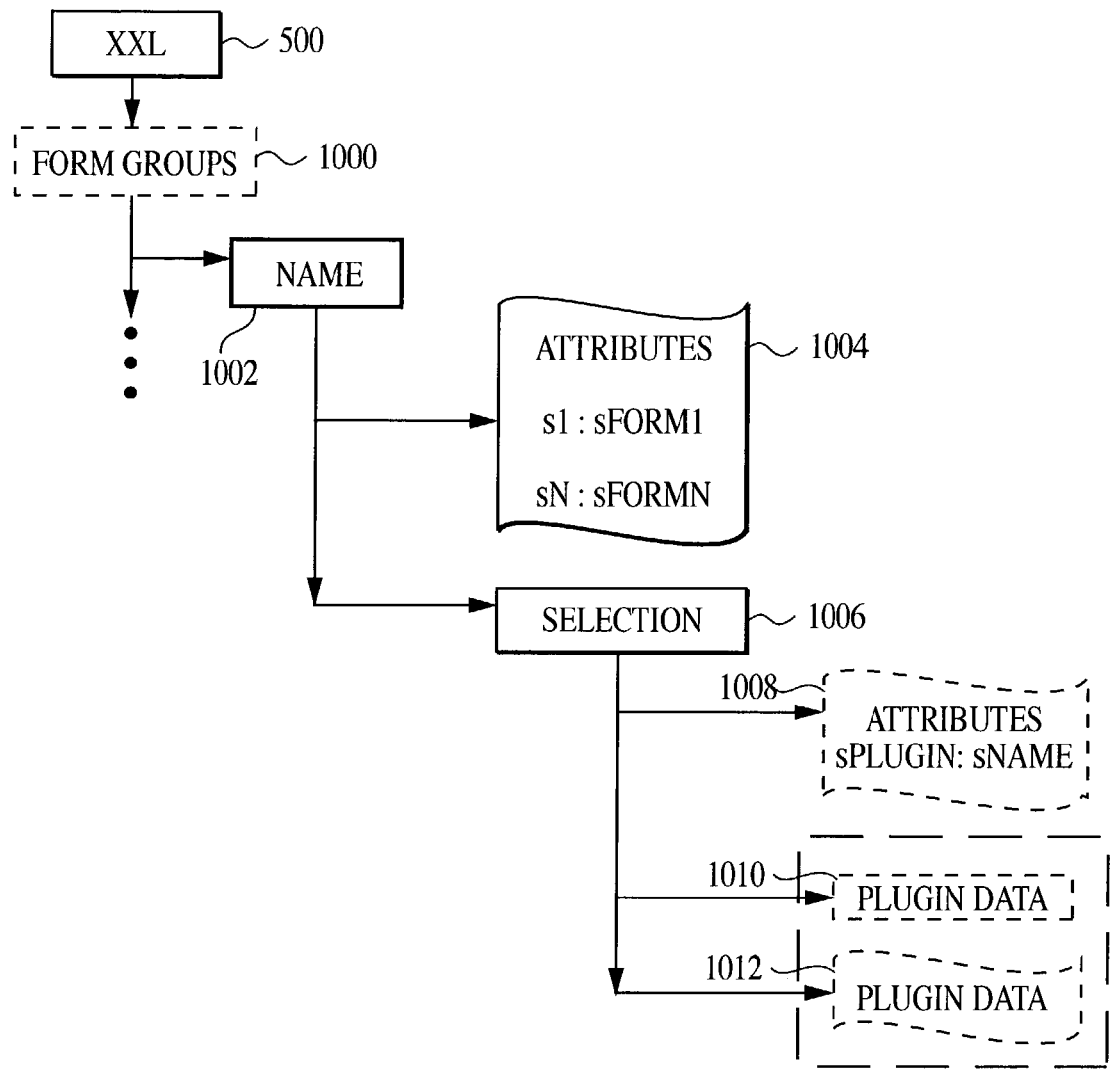
FIG. 23 is a block diagram illustrating a formGroups branch of the exam resource file.
Figure 24:
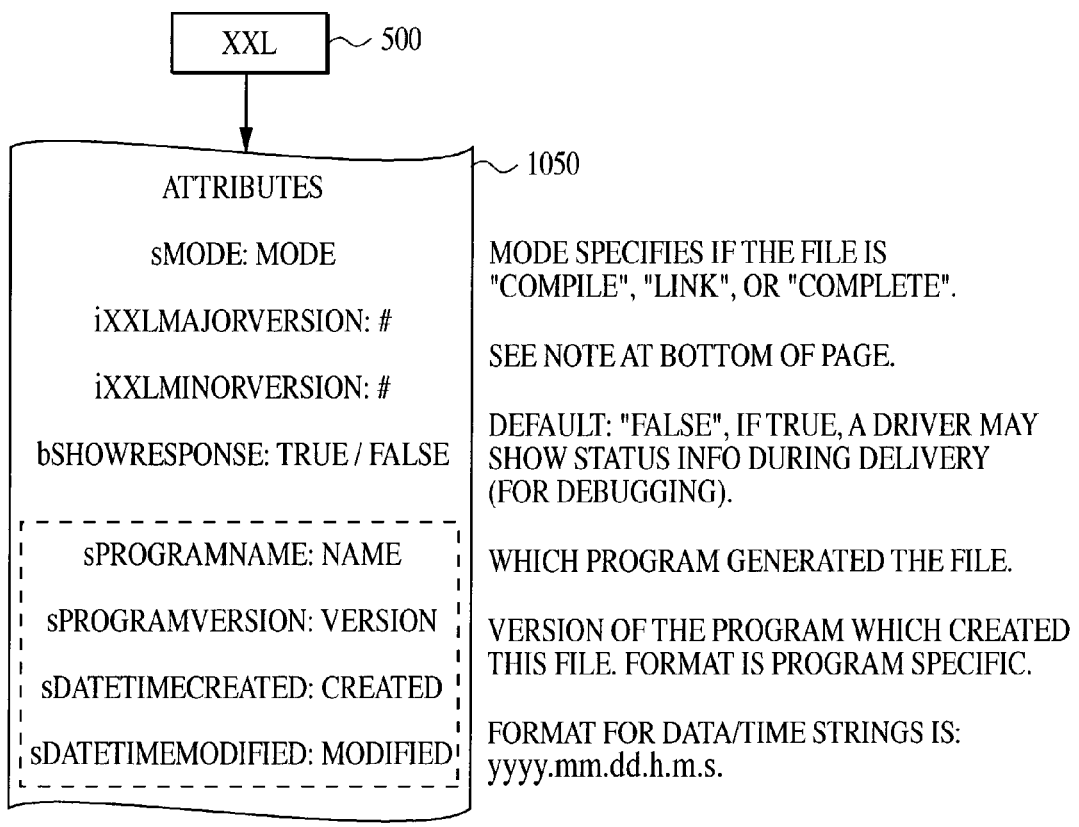
FIG. 24 is a block diagram illustrating an attributes branch of the exam resource file.
Figure 25:
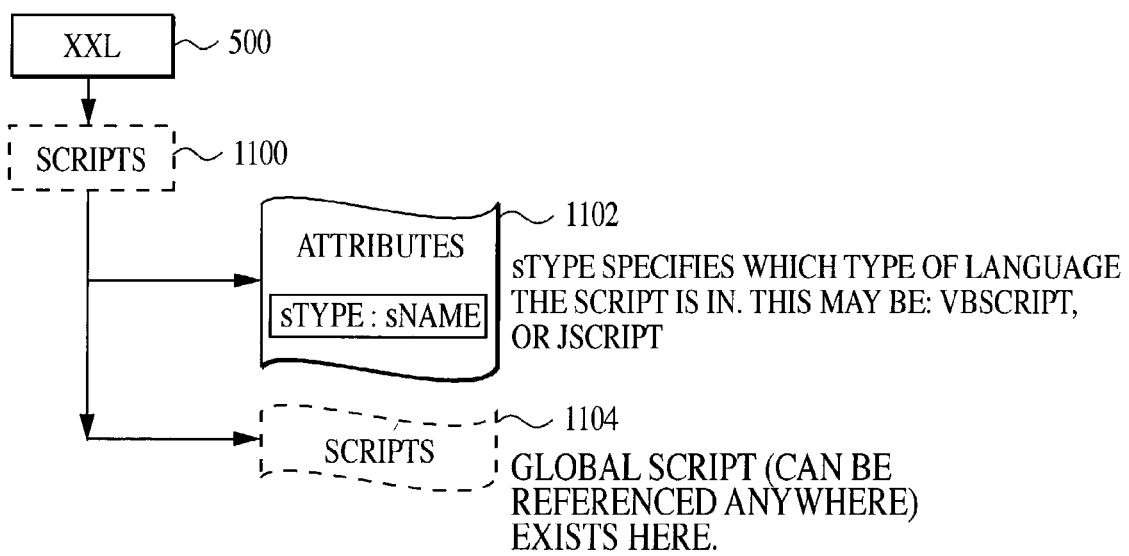
FIG. 25 is a block diagram illustrating a scripts branch of the exam resource file.
Figure 26:
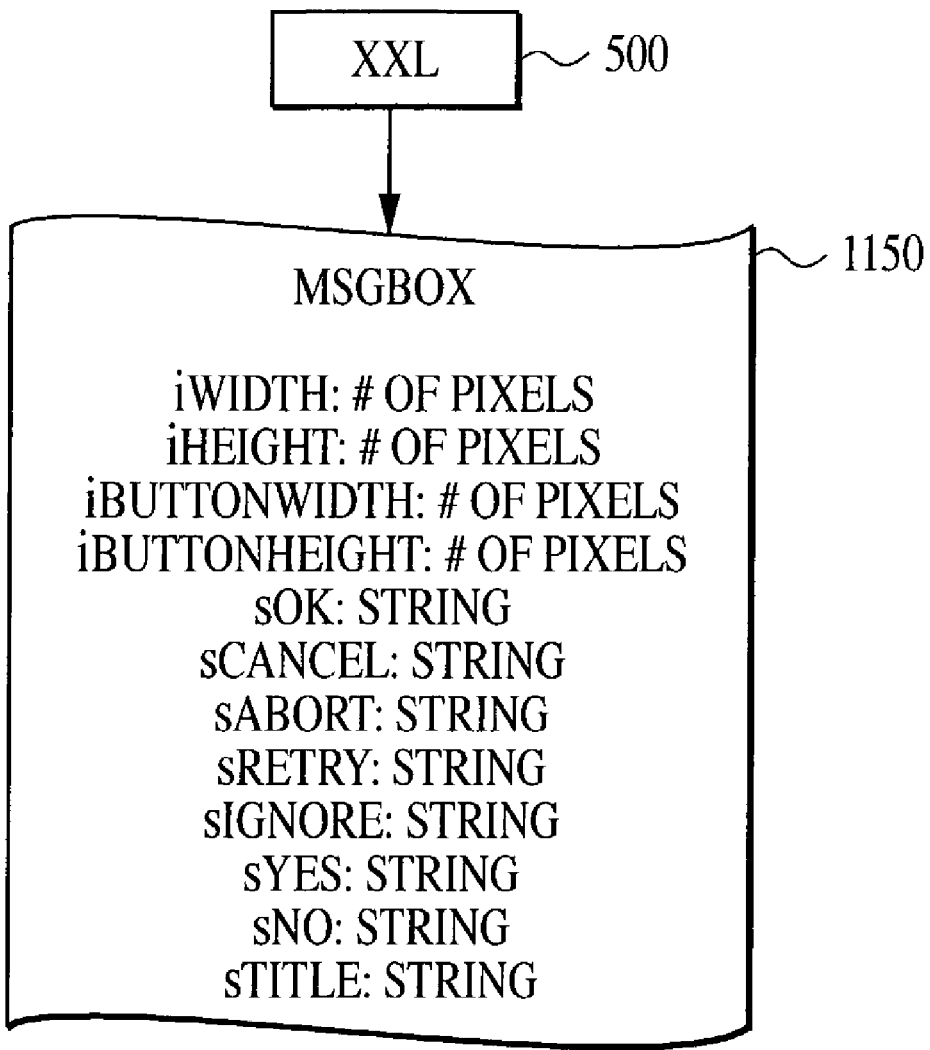
FIG. 26 is a block diagram illustrating a message box branch of the exam resource file.

FormGroups branch 1000, as seen in FIG. 23, stores, for example, the primary attributes properties and data that govern the formGroups of the test. FormGroups branch 1000 can store information for various formGroups, as is denoted by the three, vertical ellipses. A single formGroup is identified by the data stored in name attributes storage 1002. The various formGroups may each be identified by a different name, as denoted by the solid border around name attributes storage 1002. Attributes storage 1004 stores, for example, information indicating which forms are to be used within the formGroup. Selections storage 1006 stores, for example, information relating to the selection of items within the formGroup. Attributes storage 1008 indicates, for example, which selection plugin 160 is to be used with the formGroup. Plugin data storage 1010 and plugin data storage 1012 store any information needed for the selection plugin 160. Attributes storage branch 1050 stores, for example, attribute information that is global to exam resource file 120. This includes the last execution state of XXL compiler 140 [sMode], the major [iXXLMajorVersion] and the minor version [iXXLMinorVersion] of the XXL language.

Scripts branch 1100 stores, for example, information relating to scripts used within the test. Attributes storage 1102 stores, for example, type information that specifies which type of language the script is in. For example, VB script of J script. Scripts storage 1104 stores, for example, global scripts used within the test that may be referenced by the test driver. MsgBox branch 1150 stores, for example, information relating to the size and content of any message boxes that may be delivered to the examinee during the test. Message boxes may be triggered by plugins 150 during the exam.

D. POLESS Exam Instance File

Figure 27B:
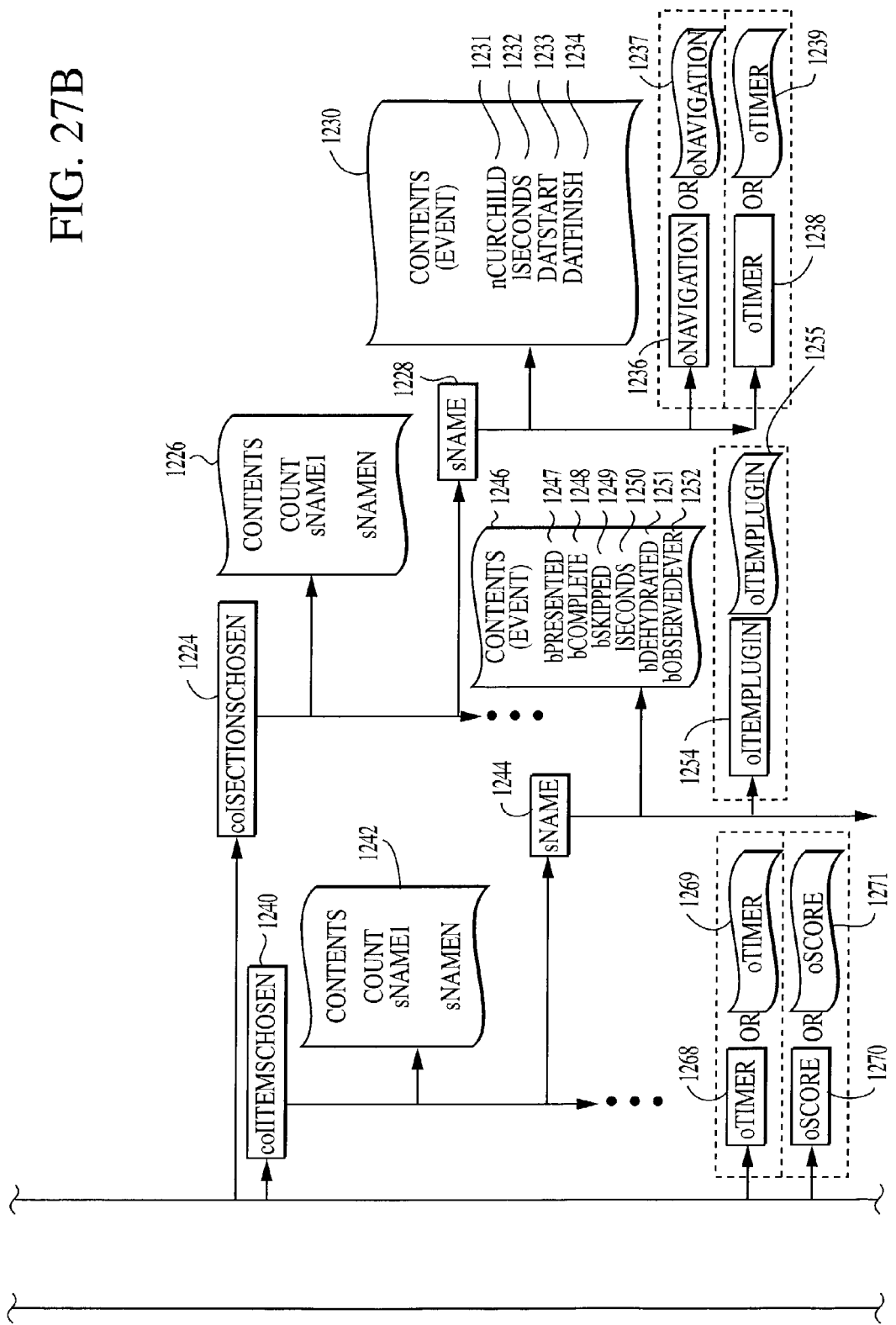
Figure 27D:
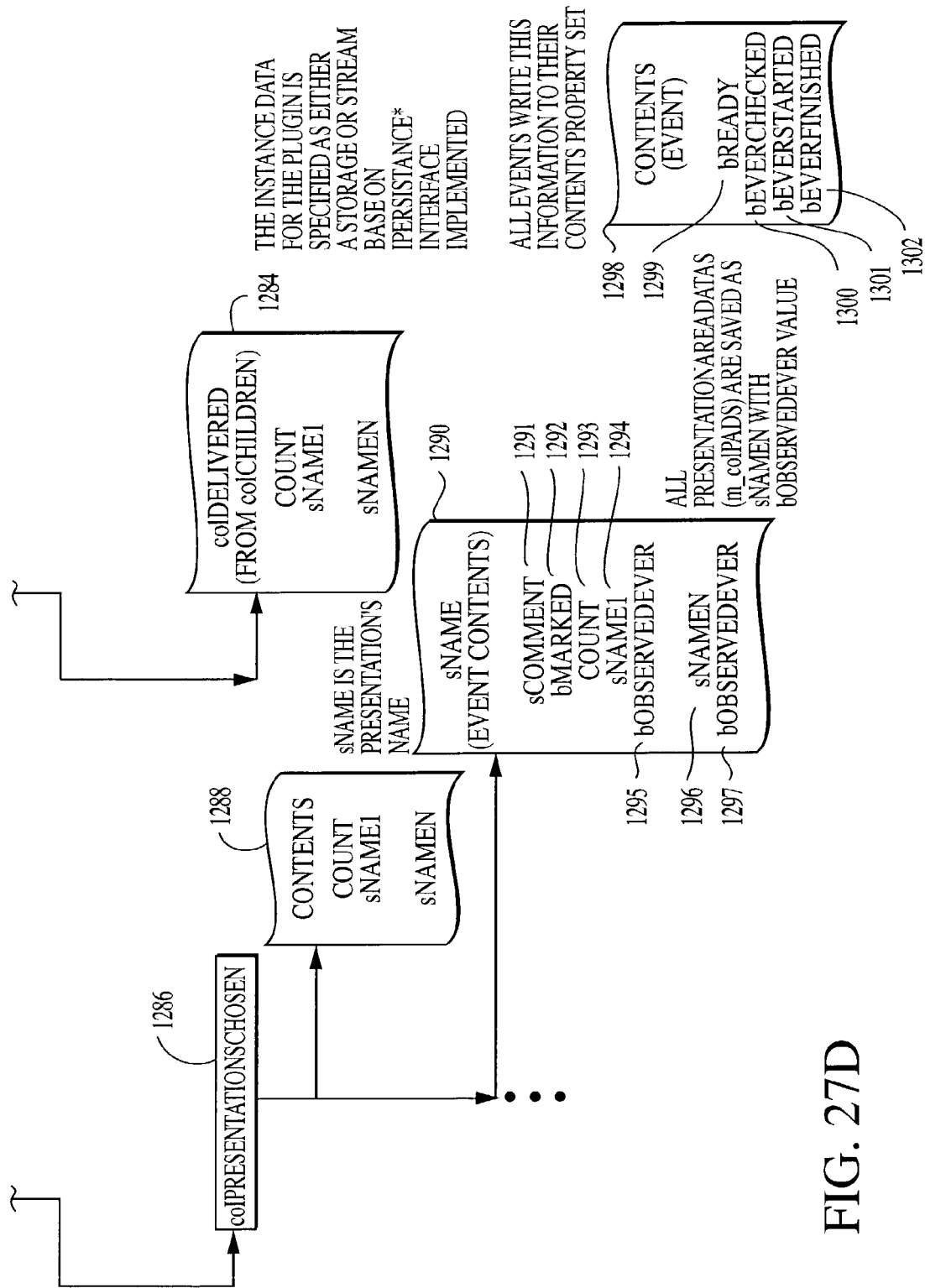

FIGS. 27A, 27B, 27C, and 27D illustrate the POLESS layout of exam instance file 170 according to the present invention. Exam instance file 170 stores, for example, information regarding the current examinee's test. Exam instance file 170 is created when a test starts for an examinee. Exam instance file 170 is destroyed when the test successfully completes. If the examinee must restart her test due to some interruption, for example, a power failure, the state of the test is restored from Exam instance file 170. In a preferred embodiment, the layout of exam instance file 170 is in a hierarchical POLESS format. As seen in FIG. 27A, the top-level storage branches of exam instance file 170 from root 1200 are, for example: running branch 1202; contents branch 1310; and history branch 1320. Root 1200 relates to POLESS cStorageRoot class 406 (FIG. 27), which instantiates exam instance file 170.

Running branch 1202 stores, for example, the state information of all running objects in test driver 110 and plugins 150. Plugins 150 use one of IPersistInstanceStream interface 196a, IPersistInstanceSet interface 196b, or IPersistInstanceStore interface 196c to store information to exam instance file 170 as a stream of data, a set of data, or a store of data, respectively. Any of plugins 150, except display plugin 152, results plugin 166, report plugin 168, and helm plugin 154, which do not contain examination state information, store examination state information to exam instance file 170. Test driver 110 determines the storage location in exam instance file 170 that stores, for example, a particular piece of examination state information.

Exam sub-branch 1204 contains examination state information relating to the exam. Contents storage 1206 stores, for example, exam status information 1207 and version information 1208. Exam status information 1207 indicates, for example, the status of the exam, for example, initializing or terminating. Template storage branch 1210 stores, for example, examination state information relating to templates running in the exam. Name attribute storage 1212 stores, for example, count information 1214 and observed ever information 1215. Observed ever information 1215 indicates, for example, whether or not the template's content has ever been fully seen by the examinee.

Form storage branch 1216 contains information relating to the forms used within the exam. Contents storage branch 1218 stores, for example, seconds information 1219, date start information 1220, date finish information 1221, current section information 1222, and version information 1223. Current section information 1222 indicates, for example, the current section being delivered to the examinee in the form. Version information 1223 indicates, for example, the identification of the form.

Sections chosen storage branch 1224, as illustrated in FIG. 27B, stores, for example, information relating to sections in the form being delivered to the examinee. Contents storage 1226 stores, for example, the names of the sections that have been or will be delivered to the examinee. Name attribute storage 1228 indicates, for example, the name of a particular section. Contents storage 1230 stores, for example, current child information 1231, seconds information 1232, date start information 1233, and date finish information 1234. Navigation storage 1236 and navigation storage 1237 store the state information of navigation plugin 162. Navigation storage 1236 stores, for example, the examination state information from navigation plugin 162 if navigation plugin 162 implements the IPersistInterfaceSet 196b or IPersistInterfaceStore 196c. Navigation storage 1237 stores, for example, the information from navigation plugin 162 if navigation plugin 162 implements IPersistInterfaceStream 196a. Timers storage 1238 and timers storage 1239 store information from timer plugin 158. Timer storage 1238 is used if timer plugin 158 implements IPersistInterfaceSet 196b or IPersistInterfaceStore 196c. Timers storage 1239 is used if timer plugin 158 uses IPersistInterfaceStream 196a.

Items chosen sub-branch storage 1240 stores, for example, information relating to items that have been or will be delivered to the examinee. Contents storage branch 1242 stores, for example, the names and order of all the items that have been or will be delivered to the examinee. Name attributes storage 1244 indicates, for example, the identification of a particular item. Contents storage branch 1246 stores, for example, presented information 1244, complete information 1248, skipped information 1249, seconds information 1250, dehydrated information 1251, and observed ever information 1252. Presented information 1247 indicates, for example, whether the item has ever been delivered to the examinee. Completed information 1248 indicates, for example, whether or not the item has been completed. Skipped information 1249 indicates, for example, whether the item has been skipped. Item plugin storage 1254 and item plugin storage 1255 stores, for example, examination state information from item plugin 156. Item plugin storage 1254 is used if item plugin 156 uses IPersistInterfaceSet 196b or IPersistInterfaceStore 196c. Item plugin storage 1255 is used if item plugin 156 uses IPersistInterfaceStream 196a.

In FIG. 27C, item light storage 1256 exists only if the item was dehydrated (to save memory or when a section ends). The dehydrated item stores the data but actions on the data are no longer available until the item is re-hydrated. Item light storage 1256 stores, for example, score candidate information 1257. Score minimum information 1258, score nominal information 1259, score maximum information 1260, complete information 1261, skipped information 1262, correct answer display 1263, response results 1264, and correct answer results 1266. Timers storage 1268 and timers storage 1269 store information from timer plugin 158. Timer storage 1268 is used if timer plugin 158 implements IPersistInterfaceSet 196*b* or IPersistInterfaceStore 196*c*. Timers storage 1269 is used if timer plugin 158 uses IPersistInterfaceStream 196*a*. Score storage 1270 and Score storage 1271 store information from timer plugin 158. Timer storage 1270 is used if timer plugin 158 implements IPersistInterfaceSet 196*b* or IPersistInterfaceStore 196*c*. Score storage 1271 is used if timer plugin 158 uses IPersistInterfaceStream 196*a*.

Groups chosen sub-branch storage 1272 indicates, for example, which groups have been or will be delivered to the examinee. Contents storage 1274 stores the names of the groups. Name attributes storage 1276 indicates, for example, the name of a particular group. Contents storage 1278 stores, for example, names of groups and the order of groups. Scoring storage 1280 and scoring storage 1281 store examination state information from score plugin 164. Scoring storage 1280 is used if score plugin 164 implements IPersistInterfaceSet 196*b* or IPersistInterfaceStore 196*c*. Scoring storage information 1281 is used if score plugin 164 implements IPersistInterfaceStream 196*a*. Selection storage 1282 and selection storage 1283 store information from selection plugin 160. Selection storage 1282 is used if selection plugin 160 implements IPersistInterfaceSet 196*b* or IPersistInterfaceStore 196*c*. Selection storage 1283 is used if selection plugin 160 implements IPersistInterfaceStream 196*a*. Delivered storage 1284, in FIG. 26D, stores, for example, an ordered list of groups chosen for delivery. Delivered storage 1285 stores, for example, an ordered list of the sub-classes of the form, for example: sections, reports and results.

Presentations chosen storage sub-branch 1286 indicates, for example, any presentations that have been or will be delivered to the examinee. Contents storage 1288 stores, for example, the names of the presentations. Names storage sub-branch 1290 stores, for example, the name of the presentation. Names storage 1290 also stores, for example, comment information 1291, marked information 1292, count information 1293, name information 1294, observed ever information 1295, name information 1296, and observed ever information 1297. Name information 1294 and observed information 1295 relate to the name of the first presentation area stored under presentations chosen sub-branch 1286 and whether or not the presentation has ever been observed, and name information 1296 indicates, for example, the last presentation area that was delivered to the examinee and whether or not the presentation was ever observed. Contents storage 1298 stores, for example, information leading to events. Contents storage stores, for example, ready information 1299 ever checked information 1300, ever started information 1301, and ever finished information 1302. Ready information 1299 indicates, for example, whether the event is ready to be delivered to the examinee. Ever checked information 1300 indicates, for example, whether an event's conditional delivery script ever been checked. Preferably, the conditional delivery script is only checked once. Ever started information 1301 indicates, for example, whether the event was ever started by the examinee. Ever finished information 1302 indicates, for example, whether the event was completed by the examinee.

Contents branch 1310 stores, for example, a property set containing information to identify the examination instance and the examination start count 1312. The identifying information used is the examinee appointment identification 1311, the name 1313 of exam resource file 120, and the name 1314 of the specified form or group.

History branch 1320 is a single stream of chronological text messages that logs the history of the test. These text messages are used by staff at system headquarters to diagnose problems that occurred in the field. Each text message is prefixed with the date, time, and a level of severity, for example: information, warning, or error. Test driver 110 will filter the text messages to a level of diagnostics desired for test driver 110, such as determining errors in test driver 110 or detail history tracking, including general information.

V. Expansion of Test Driver Using Plugins

Figure 28:
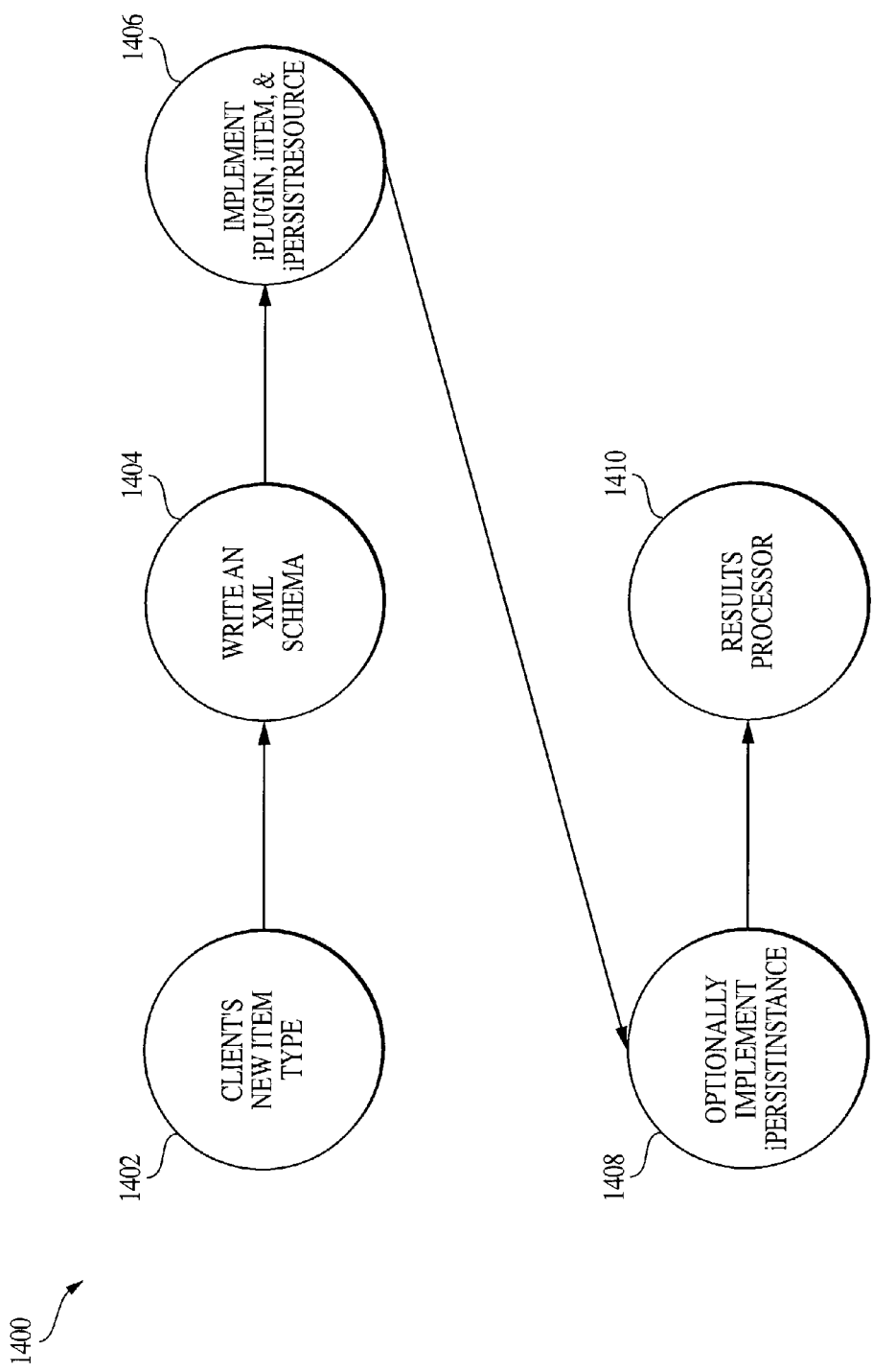
FIG. 28 is a flow diagram of a method of computerized test customization according to the present invention.

FIG. 28 illustrates the process for customizing test based on specific requirement from the client using plugins 150, denoted generally by reference numeral 1400. First, the client presents the new requirements, for example, a new item type, to the test developer, step 1402. The test developer then writes and XML schema to define the XXL test specification, step 1404. The schema is subsequently used to validate the XXL test specification. An example of the XXL schema is as follows:

```
<!--    [linear_navigate-schema.xml]       _    -->
<!--
===========================================================
===============    -->
<!--
-->
<!-- <linearNavigate>
                                                       -->
<!--
-->
<!-- ATTRIBUTE            REQ? DESCRIPTION
                                                -->
<!-- initialReview         no     [true] (false)
Whether a candidate may   -->
<!--
review items from the very beginning of a    -->
<!--
section.
    -->
<!-- markAllowed           no     [true]
(false) Whether a candidate may   -->
<!--                                                       mark
items during the exam for_review    -->
<!--
purposes.
-->
<!-- incompleteEndAllowed  no     [true]
(false)_Whether a candidate may   -->
<!--                                                       end
a     section that contains incomplete        -->
<!--
items.
    -->
<!-- endSectionPrompt      no     The message to
disply when ending a   -->
<!--
section.
    -->
<!-- endIncompleteSectionPrompt
                                                   -->
<!--                                      no           The
message to display when ending a  -->
<!--
section with incomplete items.                          -->
<!-- quitExamPrompt        no     The message to
disply when quiting an    -->
<!--
exam.
-->
<!-- comment               no     [false]
(true)    If the candidate can   -->
<!--                                                       make
comments during this section.     -->
<!-- readOnly              no     [false]
(true) If the items are set to    -->
<!--                                                       be
read-only.
```

-continued

```
-->
<!-- nextOrMore          no    [true]
(false) Whether to show "Next"    -->
<!--
button with "More" button
-->
<!--
-->
<!-- SUB-ELEMENTS <!-- none
-->
<!--
-->
<!-- NOTES
-->
<!-- -     Non-adaptive navigation plug-in.
                                            -->
    <!-- -     Allows for simple "movement" between items
and sections       -->
    <!-- -     For "markAllowed" to have an effect a_helm
which supports marking        -->
    <!      -- of items must be used in the exam too.
                                            -->
    <!-- -     The button labels will appear exactly_as
entered including       -->
    <!      -- capitalization.

<!-- -     It is a common case to set comment="true"
and readOnly="true" and -->
    <!--      re-deliver a section for the sole purpose of
commenting.           -->
    <!--
-->
    <!--
==========================================================
===============   -->
<ElementType name="linearNavigate" order="many"
content="empty" model="closed">
    <AttributeType name="initialReview"
dt:type="enumeration" dt:values="true false" default="true"
required="no"/>
    <AttributeType name="markAllowed"
dt:type="enumeration" dt:values="true false" default="true"
required="no"/>
    <AttributeType name="incompleteEndAllowed"
dt:type="enumeration" dt:values="true false" default="true"
required="no"/>
    <AttributeType name="endSectionPrompt"
dt:type="string" required="no" default="This will end your
section. Do you wish to end?"/>
    <AttributeType name="endIncompleteSectionPrompt"
dt:type="string" required="no" default="You have not fully
answered all items. If you end incomplete items will be
marked as incorrect. Do you wish to end?"/>
    <AttributeType name="quitExamPrompt"
dt:type="string" required="no" default="You are about to
exit the exam. Do you wish to exit?"/>
    <AttributeType name="comment"
dt:type="enumeration" dt:values="true false"
default="false" required="no"/>
    <AttributeType name="readOnly"
dt:type="enumeration" dt:values="true false"
default="false" required="no"/>
    <AttributeType name="nextOrMore"
dt:type="enumeration" dt:values="true false" default="true"
required="no"/>
        <attribute type="initialReview"/>
        <attribute type="markAllowed"/>
        <attribute type="incompleteEndAllowed"/>
        <attribute type="endSectionPrompt"/>
        <attribute type="quitExamPrompt"/>
        <attribute type="endIncompleteSectionPrompt"/>
        <attribute type="comment"/>
        <attribute type="readOnly"/>
        <attribute type="nextOrMore"/>
</ElementType>
```

The above sample schema is defining the attributes and elements associated with the top-level XXL element "linearNavigate." A more detail description of the XXL schema is given in the co-pending application filed on the same date, entitled "EXTENSIBLE EXAM LANGUAGE (XXL) PROTOCOL FOR COMPUTER BASED TESTING," incorporated herein by reference.

The test developer next writes the appropriate plugin 150, in this example, item plugin 156. The test developer also implements the IPlugin interface 167 and IPlugin interface and IItem interfaces 169. Additionally, the test developer implements IPersistResource interface 192 (FIG. 3) to enable persistence of compiled test information from item plugin 156 to exam resource file 120. The test developer can optionally implement IPersistInstance interface 196 (FIG. 3), step 1408, to enable persistence of examination state information from item plugin 156 to exam instance file 170. After the appropriate interfaces have been implemented, item plugin 156 is valid and operating. Finally, after the test is delivered to the examinee, the result processor accumulates results from the examinee, 1410. The results processor must be able to understand the new item type to correctly process the results. Customization process 1400 only required the test developer to write one piece of software, item plugin 156, to accommodate the client's customizations rather than multiple pieces of software.

A. Test Production and Test Delivery

Figure 29:
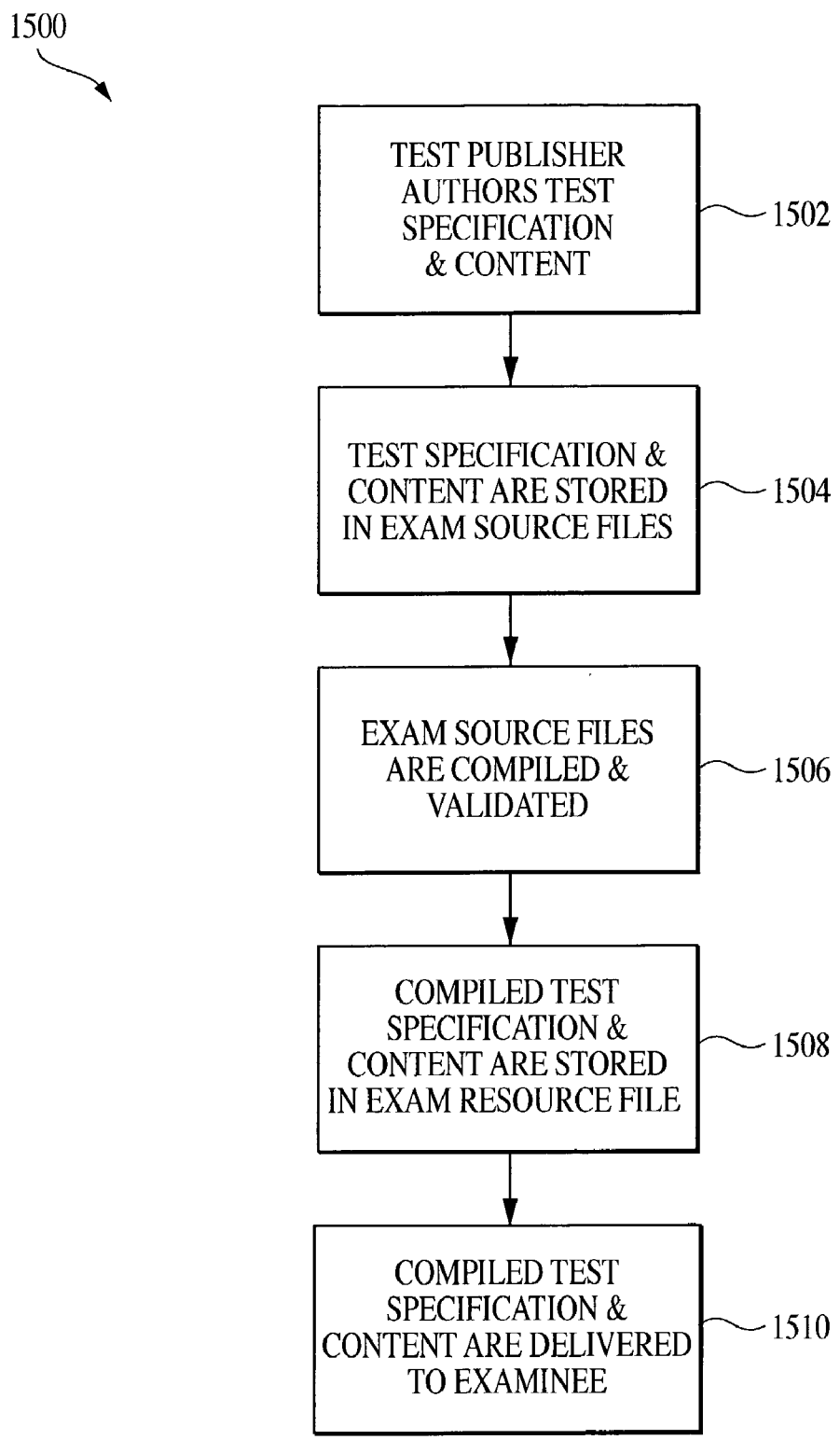
FIG. 29 is a flow chart of a method of test production and test delivery according to the present invention.

FIG. 29 is a flow chart illustrating the overall method of test production and test delivery according to the present invention, denoted generally by reference numeral 1500. The test publisher first authors the test specification and content, step 1502. The test specification and content are then stored in exam source files 130, step 1504. Exam source files 130, for example, the content of XXL files 134, are then compiled and validated, step 1506. The compiled test specification and content are stored in exam resource file 120, step 1508. Finally, the compiled test specification and content are delivered to the examinee, step 1510.

Figure 30:
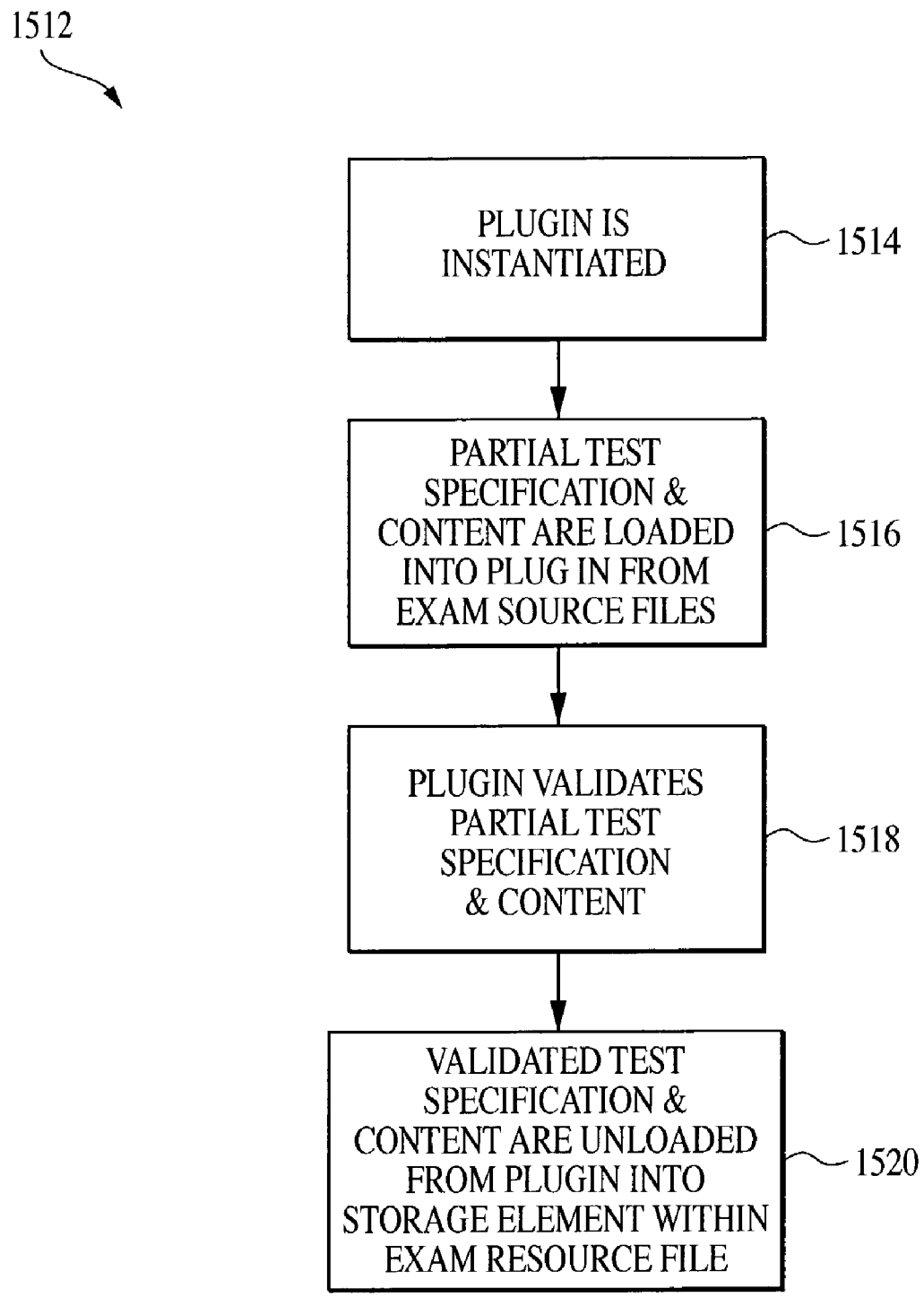
FIG. 30 is a flow chart of a method of validation of test specification and content according to the present invention.

The validation of the test specification and content is illustrated in greater detail in FIG. 30, by the method denoted generally by reference numeral 1512. When the test specification and content stored in exam source files 130 specifically references a plugin 150, that plugin 150 is instantiated, step 1514. Partial test specification and content relating to that plugin 150 are loaded into the plugin 150 from exam source files 130, step 1516. In an alternative embodiment, the partial test specification and content are loaded into a private memory in data communication with the plugin 150. The plugin 150 validates the partial test specification and content, step 1518. The validated test specification and content are then unloaded from the plugin 150 into a storage element within exam resource file 120.

Figure 31:
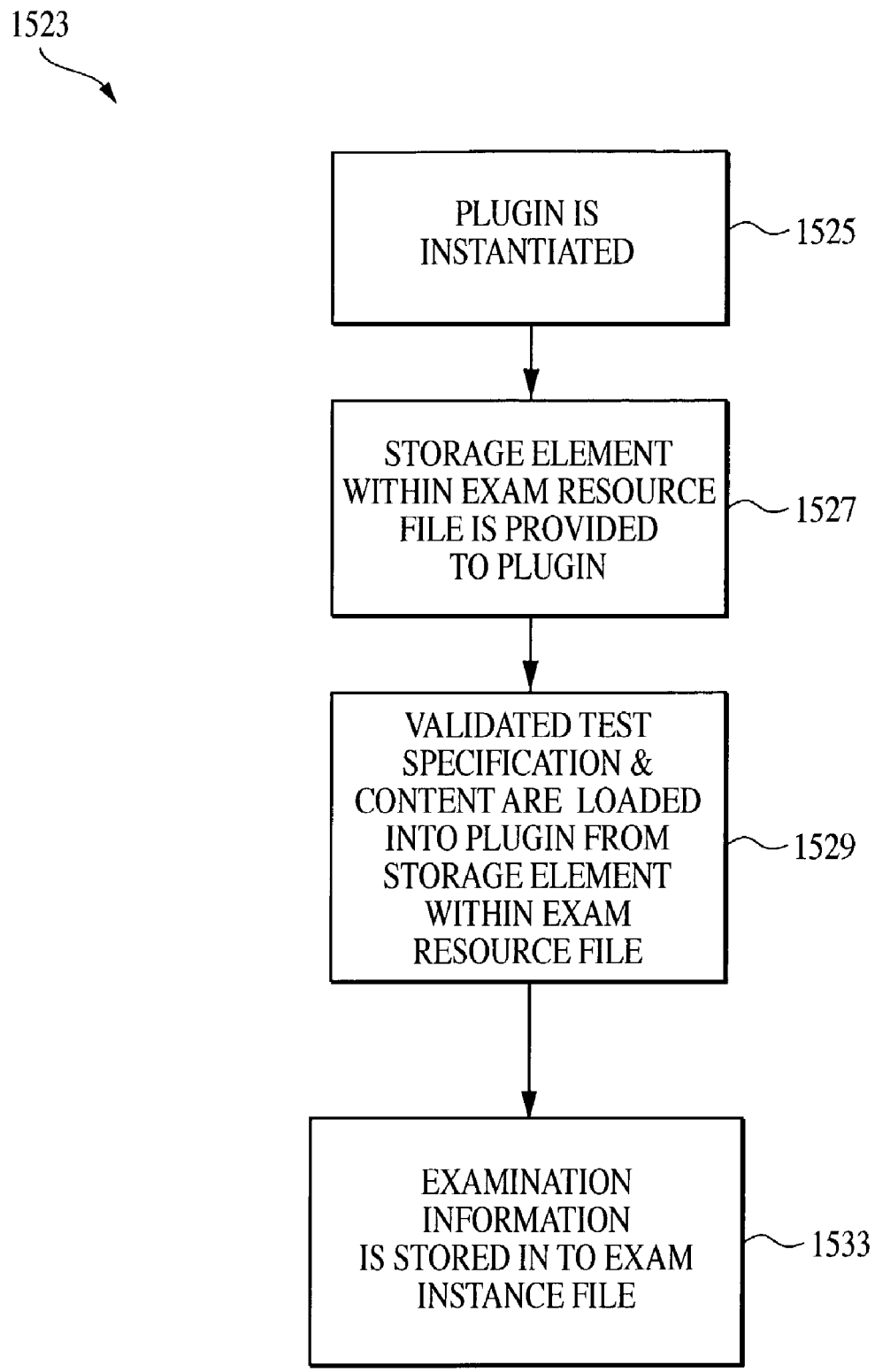
FIG. 31 is a flow chart of a method of test delivery according to the present invention.

FIG. 31 illustrates the method of the test delivery cycle in greater detail. When the previously validated test specification and content stored in exam resource file 120 references a plugin 150, the plugin 150 is instantiated, step 1525. The storage element in exam resource file 120 containing the validated test specification and content are provided to the plugin 150, step 1527. The validated test specification and content are loaded into the plugin 150 from the storage element within exam resource file 120, step 1529. Finally, the examination state information, which includes, for example, the examinee's responses, is stored into exam instance file 170, step 1533.

Figure 32:
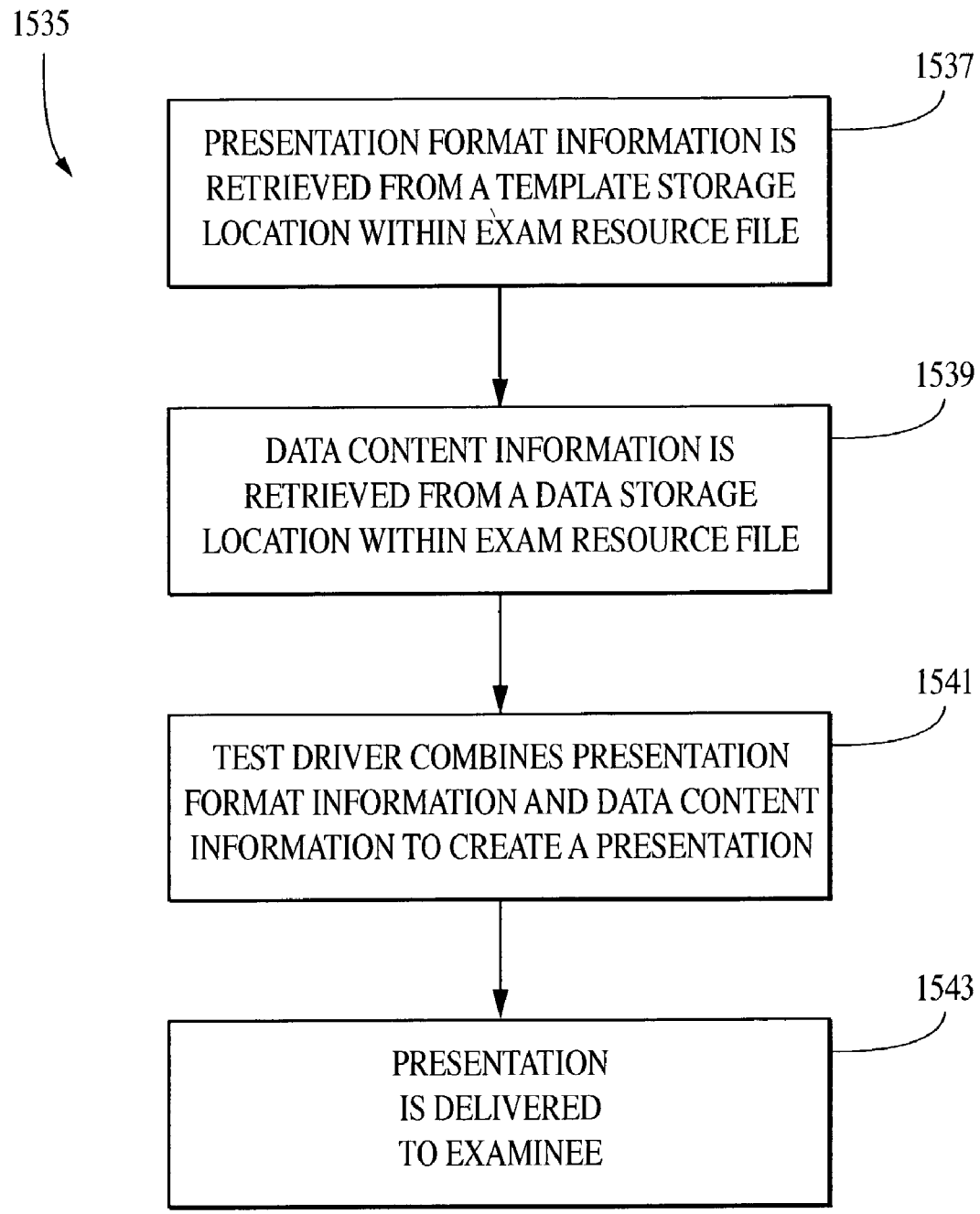
FIG. 32 is a flow chart of a method of creating and delivering a presentation according to the present invention.

FIG. 32 illustrates the method of restarting a test after interruption in greater detail. In test restart method 1535, test driver 110 is started, step 1537. Test driver 110 determines whether the test has already started, step 1539. If the test delivery has not already started, plugins 150 reload validated test specification and content from exam resource file 120, step 1543. If the test has already started, plugins retrieve examination information from exam instance file 120, step 1541. Plugins 150 then reload the validated test specification and content from exam resource file 120, step 1543. Test driver 110 then delivers the exam to the examinee, step 1545.

B. Plugin Life Cycle

Figure 33:
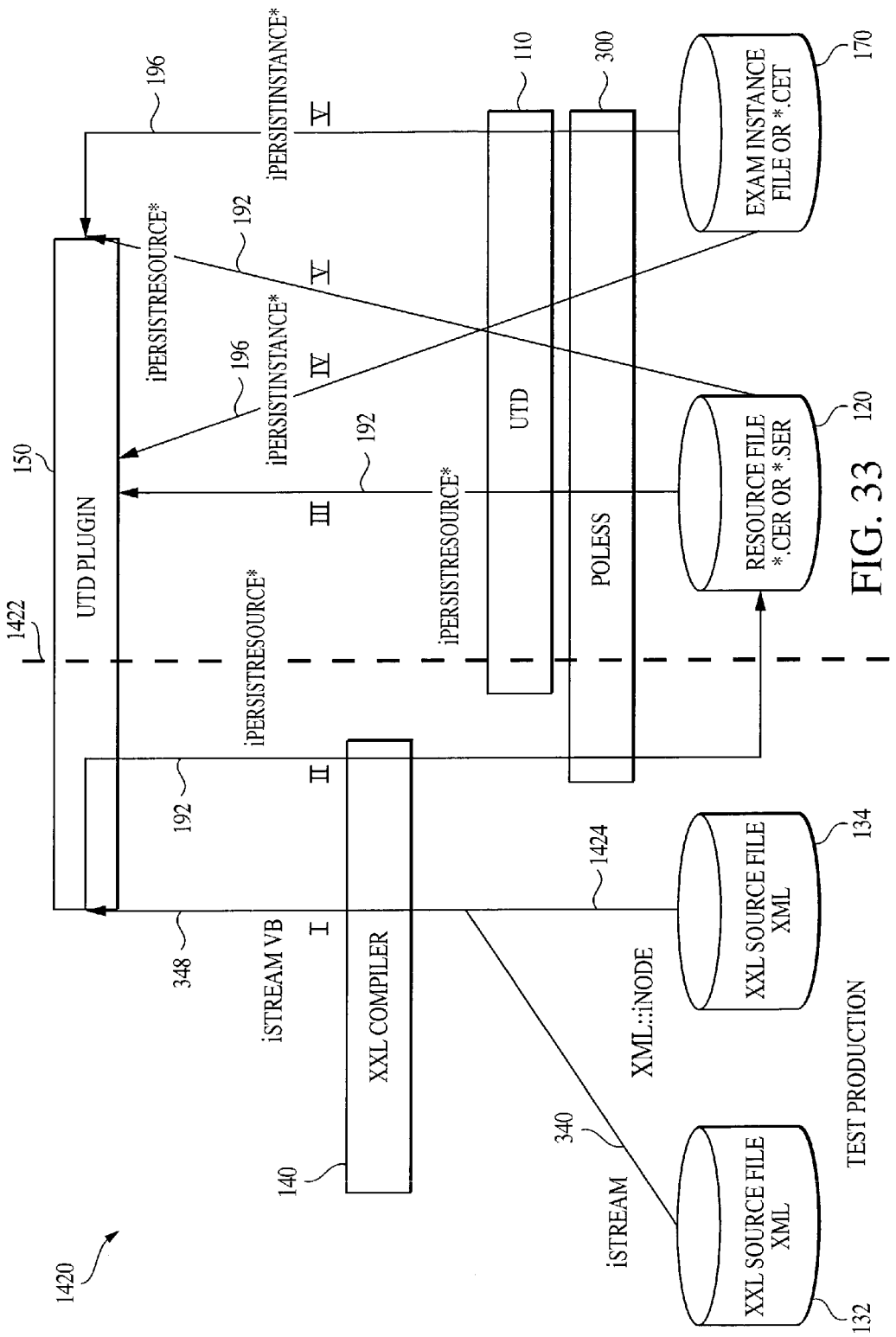
FIG. 33 is a diagram of a life cycle of a plugin according to the present invention.

FIG. 33 illustrates the life cycle of plugin 150 from test production to test delivery, denoted generally by reference numeral 1420. Dashed vertical line 1422 divides the plugin life cycle 1420 into a test production cycle, to the left of dashed vertical line 1422, and a test delivery cycle, to the right of dashed vertical line 1422. The test production cycle occurs only occasionally when new plugins 150 are developed to satisfy the requirements of a client. The test delivery cycle occurs whenever the test is delivered to the examinee, for example, daily.

Exam source files 130, of which data files 132 and XXL files 134 are shown, contain every aspect of the test as written by the test publisher. In step I, XXL compiler 140 reads from XXL files 134 and interprets instructions that call for the use of a plugin 150. Plugin 150 is identified in the XXL test definition language by both a name and a program identification ("prog ID"). When XXL compiler receives the prog ID from XXL files 134, XXL compiler knows that a plugin 150 is required to complete the compilation of exam source files 130. Below is an example of an XXL schema used to define ten plugins 150 of various types:

```
<?xml version="1.0" ?>
<xxl version="1.16" xmlns="x-schema:c:\UTDSDK\xxl-master-schema.xml">
    <!--
==========================================================
===============    -->
    <!--
        -->
    <!--    This contains all of the plugins used for this
exam.           -->
    <!--
        -->
    <!--
==========================================================
===============    -->
    <!-- TIMERS -->
    <plugin name="clockTime" progid="UTDP.StandardTimer"/>
    <!-- SCORING -->
    <plugin name="testScore" progid="UTDP.ScoreTable"/>
    <!-- RESULTS -->
    <plugin name="testResults"
progid="slsOutputPlugin.cOutputResults"/>
    <!-- NAVIGATIONS -->
    <plugin name="refNav" progid="REF.cNavigation"/>
    <plugin name="linearNav" progid="UTDP.cLinearNavigate"/>
    <!-- SELECTIONS -->
    <plugin name="sequential"
progid="UTDP.SequentialExhaustive"/>
    <!-- DISPLAYS -->
    <plugin name="label" progid="REF.udLabel"/>
    <!-- ITEMS -->
    <plugin name="hotArea" progid="hotArea.hotAreaItem"/>
    <plugin name="multi" progid="UTDP.MultiChoiceItem"/>
    <!-- HELMS -->
    <plugin name="backForward" progid="REF.udBackForward"/>
</xxl>
```

The ten plugins defined in the previous example represent eight different types of plugins 150. Not all of the possible types of plugins 150 are required to build any one test. Also, more than one plugin 150 is implemented for a specific type. In the above example, two navigation plugins 162 and two item plugins 156 are defined. XXL compiler 140 reads information from exam source files 130 using IStream interface 340, iNode interface 1424, which is the Microsoft interface used to access a node of an XML document in the document object model ("DOM"), and IStreamVB interface 348. XXL compiler 140 instantiates the requested plugin 150 using, for example, the call CoCreateInstance. CoCreateInstance( ) creates a single, uninitialized object of the class associated with a specified CLSID, using a prog ID that has been converted into the CLSID.

If the data referring to plugin 150 has been customized by the test developer, XXL compiler 140 may not recognize the new data. Therefore, XXL compiler 140 passes the data directly to plugin 150 and plugin 150 loads the data into a private memory (not shown). In one embodiment, the private memory is internal to plugin 150, and in another embodiment, the private memory is external to plugin 150. Plugin 150 can then validate the data using the XXL schema. If the data is invalid, plugin 150 reports the error. In an alternative embodiment, plugin 150 can validate the data using an XML document type definition ("DTD"). A DTD is a formal description in XML Declaration Syntax of a particular type of document. Similar to a schema, a DTD sets out what names are to be used to the different types of elements, where they may occur, and how they all fit together. However, the XXL schema is preferred for validation since schemas are easier to read than a DTD and are very flexible.

If plugin 150 declares that the data is valid, XXL compiler 140 prepares a POLESS storage object 300 in exam resource file 120 to which plugin 150 saves the data at a command from XXL compiler 140, in step II. As described previously, XXL compiler 140 determines where the data from plugin 150 is to be saved in exam resource file 120 and creates the appropriate storage location. The name, CLSID, and data associated with plugin 150 is stored in plugins branch 900 in exam resource file 120 (FIG. 21). Plugin 150 implements IPersistResource interface 192 to store the data to exam resource file 120. Data storage 906 stores, for example, the data, for example, as either a stream, set of data, or as a storage element if plugin 150 implements either IPersistResourceStream 192a, IPersistResourceSet interface 192b, or IPersistResourceStore interface 192c, respectively. Data storage 908 stores, for example, the data as a stream of data if plugin 150 implements IPersistResourceStream interface 192a. Plugin 150 can choose the format used to store the data into exam resource file 120. Steps I and II are repeated until exam source files 130 are completely compiled and exam resource file 120 is completely populated with the compiled test information.

Figure 34:
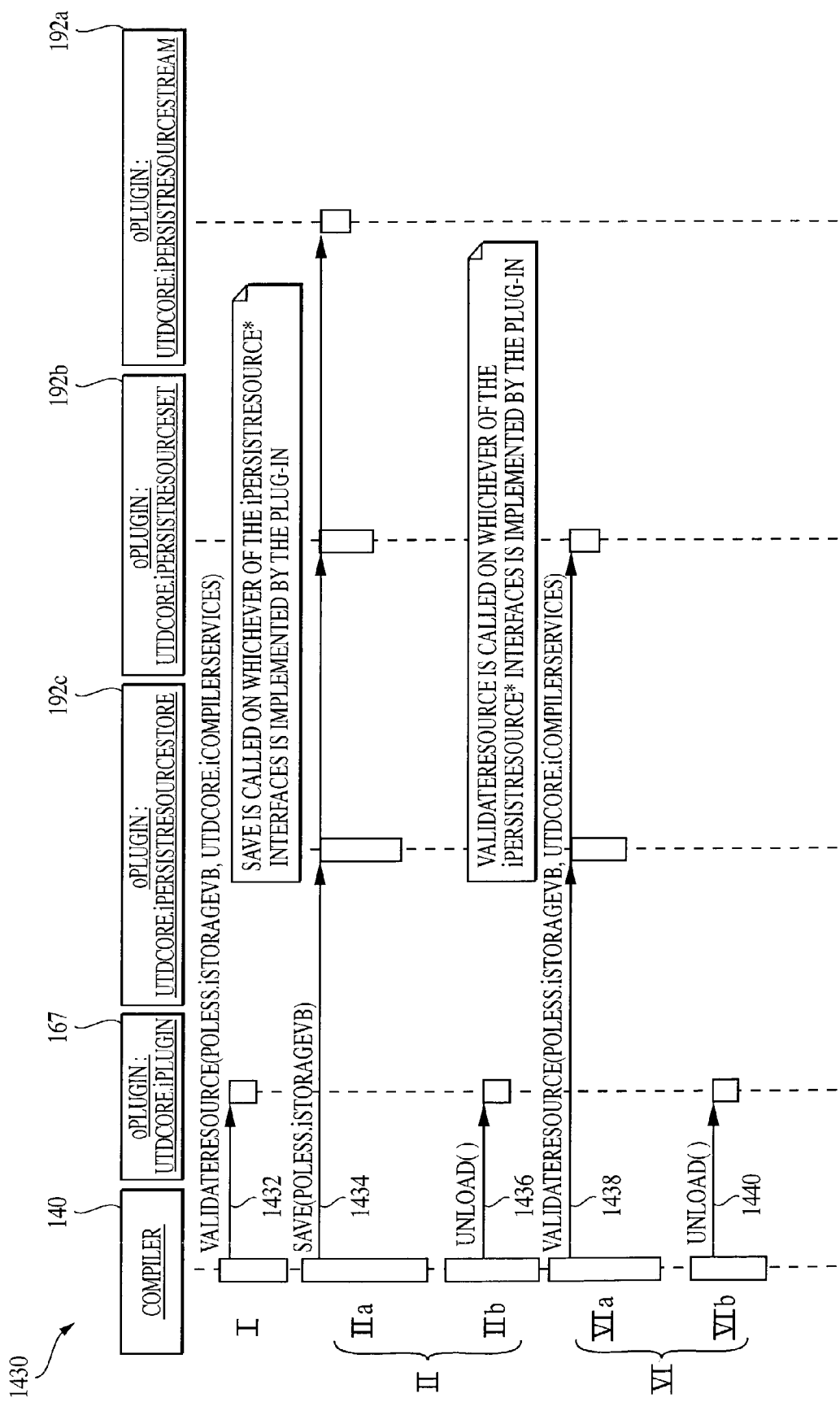
FIG. 34 is a flow diagram of a process for compiling plugins according to the present invention.

The compile sequence of a plugin 150, as shown in steps I and II in FIG. 33, are illustrated in greater detail in FIG. 34. Plugin compile sequence 1430 begins as XXL compiler 140 asks plugin 150 to validate the information from exam source files 130 that pertain to plugin 150 using IPlugin::ValidateSource( ) call 1432, in step I. Plugin 150 validates whether or not the data received from exam source files 140 is correctly formatted based on the XXL schema. If the data is not valid, plugin throws a structured COM error. Plugin 150 does not validate that all required source elements are present, but rather, that what is present is correctly formatted.

Step II contains two steps, indicated as step IIa and IIb. In step IIa, XXL compiler 140 creates the appropriate storage element in exam resource file 120 using POLESS object 300. The storage element type is determined based on the type of IPersistResource interface 192 that plugin 150 implements, for example: IPersistResourceStream interface 192a; IPersistResourceSet interface 192*b*; or IPersistResourceStore interface 192*c*. XXL compiler 140 then calls IPersistResource*::Save( ) call 1434 for the appropriate IPersistResource interface. Plugin 150 saves the compiled information from exam source files 130 to exam resource file 120 through the POLESS object 300 passed by XXL compiler 140. In step IIb, XXL compiler 140 instructs plugin 150 to unload, or flush, its content using Unload( ) call 1436. As stated previously, steps I, IIa, and IIb are repeated until all of exam source files 130 is compiled.

Step VI, which is shown as steps VIa and VIb, concerns amalgamation of exam resource file 120. Amalgamation enables data for a specific plugin to exist virtually as one storage location even if the data appears at different locations within the storage hierarchy. Amalgamation can be performed on exam resource file 120 if plugin 120 has implemented either IPersistResourceSet interface 192*b* or IPersistResourceStore interface 192*c* which storing data to exam resource file 120. In step VIa, XXL compiler 140 amalgamates one to three storage elements in exam resource file 120 and passes the amalgamated POLESS object to plugin 150 using IPersistResource*::ValidateResource( ) call 1438. Plugin 150 determines whether or not the amalgamated POLESS object creates a complete and valid set. Plugin 150 throws a structured COM error if the amalgamated POLESS object does not create a complete and valid set. In step VIb, XXL compiler 140 instructs plugin 150 to unload, or flush, its content using Unload( ) call 1440. Steps VIa and VIb are interspersed among steps I, IIa, and IIb cycles and can also occur multiple times during the compilation of exam source files 130. Amalgamation is described in greater detail, in the co-pending application filed on the same date, entitled "EXTENSIBLE EXAM LANGUAGE (XXL) PROTOCOL FOR COMPUTER BASED TESTING," incorporated herein by reference.

Referring again to FIG. 33, during the test delivery cycle, test driver 110 reads the test specifications stored in exam resource file 120 through POLESS objects 300. Test driver 110 reads information from exam resource file 120 through POLESS objects 300 in order to retrieve the encrypted, compressed, and structured elements within exam resource file 120. When the XXL test definition language calls a plugin 150 by a prog ID, as described previously, test driver 110 instantiates the plugin 150 that was called, in step III. Test driver 110 provides the POLESS object 300 from exam resource file 120 and plugin 150 initializes itself from the POLESS object 300, for example, data storage 906 or data storage 908 stored under name attribute storage 902, using the appropriate IPersistResource interface 192. The information loaded into plugin 150 is the same information as was stored into exam resource file 120 by plugin 150 during the test production cycle (step II). Since plugin 150 chose the storage format used to store the information into exam resource file 150, plugin 150 can always read the information from exam resource file 150, giving plugin 150 complete flexibility. Test driver 110 need not be able to read the information that is used by plugin 150. Therefore, any customizations to the test facilitated by plugin 150 does not require any changes to test driver 110. The test then progresses with plugin 150 enhancing the functionality of test driver 110 based on the new requirements from the client.

Periodically, based on a request either from test driver 110 or from plugin 150, the state of all running objects will save to exam instance file 170, which is a unique file for each examinee, indicating the progress and the status of the test for that examinee. Test driver 110 asks plugin 150 if plugin 150 is "dirty," meaning that plugin 150 is storing has some updated examination state information. For example, when the examinee selects distractor A on a multi-choice item, item plugin 156, in this case, becomes dirty. If plugin 150 is dirty, test driver 110 provides plugin 150 a POLESS object 300 in exam instance file 170 and plugin saves the examination state information to exam instance file 170 using IPersistInstance interface 196, in step IV. For example, item plugin 156 saves the examinee's answer to item plugin storage 1254 or to item plugin storage 1255 (FIG. 27). Item storage 1254 stores, for example, the data as either a set of data or as a storage element if item plugin 156 implements either IPersistInstanceSet interface 196*b* or IPersistInstanceStore interface 196*c*, respectively. Item storage 1255 stores, for example, the data as a stream of data if item plugin 156 implements IPersistInstanceStream interface 196*a*.

Step V occurs if the test is interrupted, for example, because of a power failure, and the test needs to restart. When test driver 110 is required to return to a particular operation state, test driver 110 reads the examination state information from exam instance file 170. Plugin 150 is provided the storage object containing the state of plugin 150 as saved in step IV using IPersistInstance interface 196. Using the previous example, item plugin 156 retrieves its state information from item plugin storage 1254 or for item plugin storage 1255. Plugin 150 is able to become operational from the retrieved state information, enabling a restart of the test from the point at which the test was interrupted.

Figure 35A:
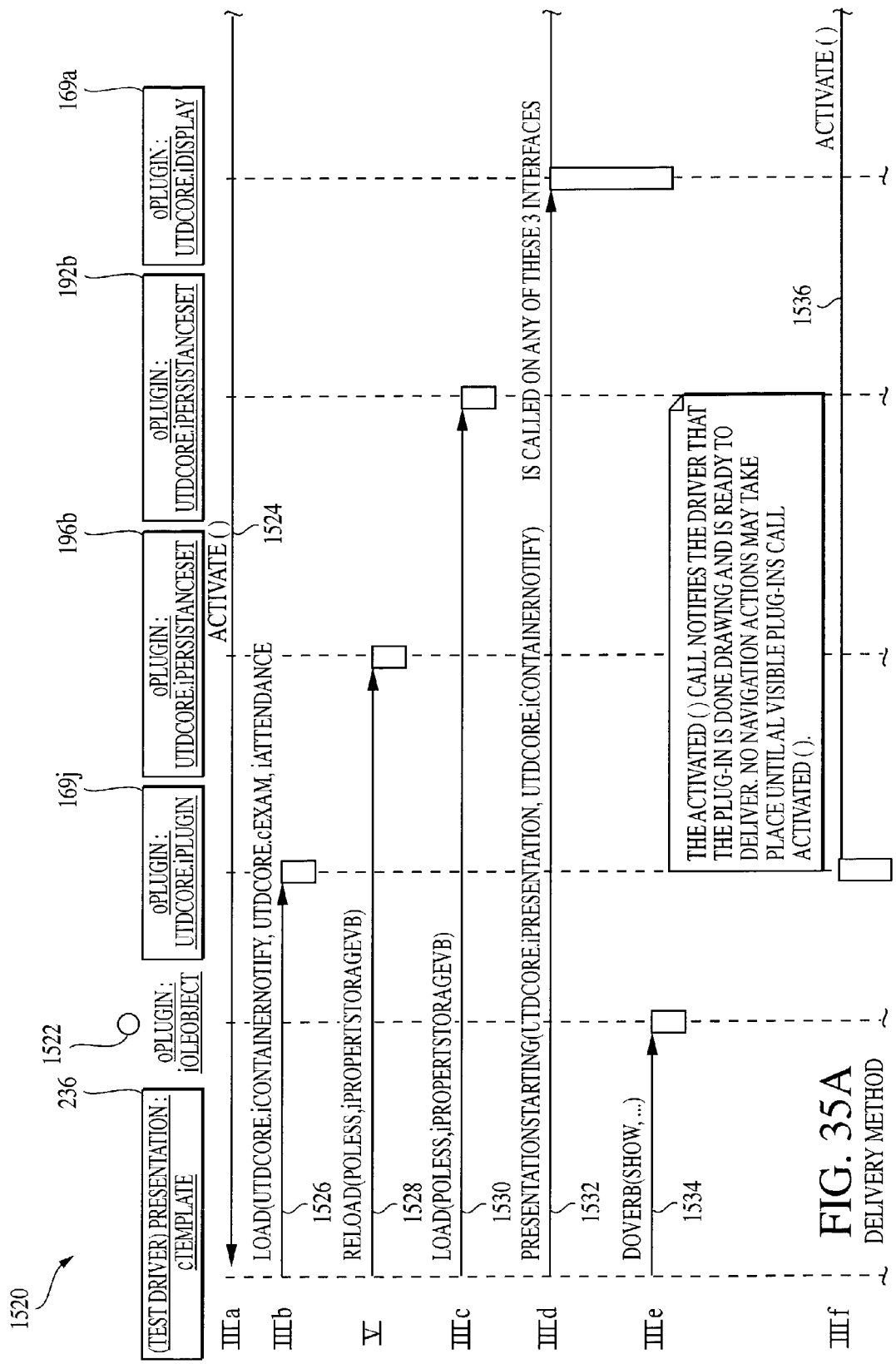
Figure 35B:
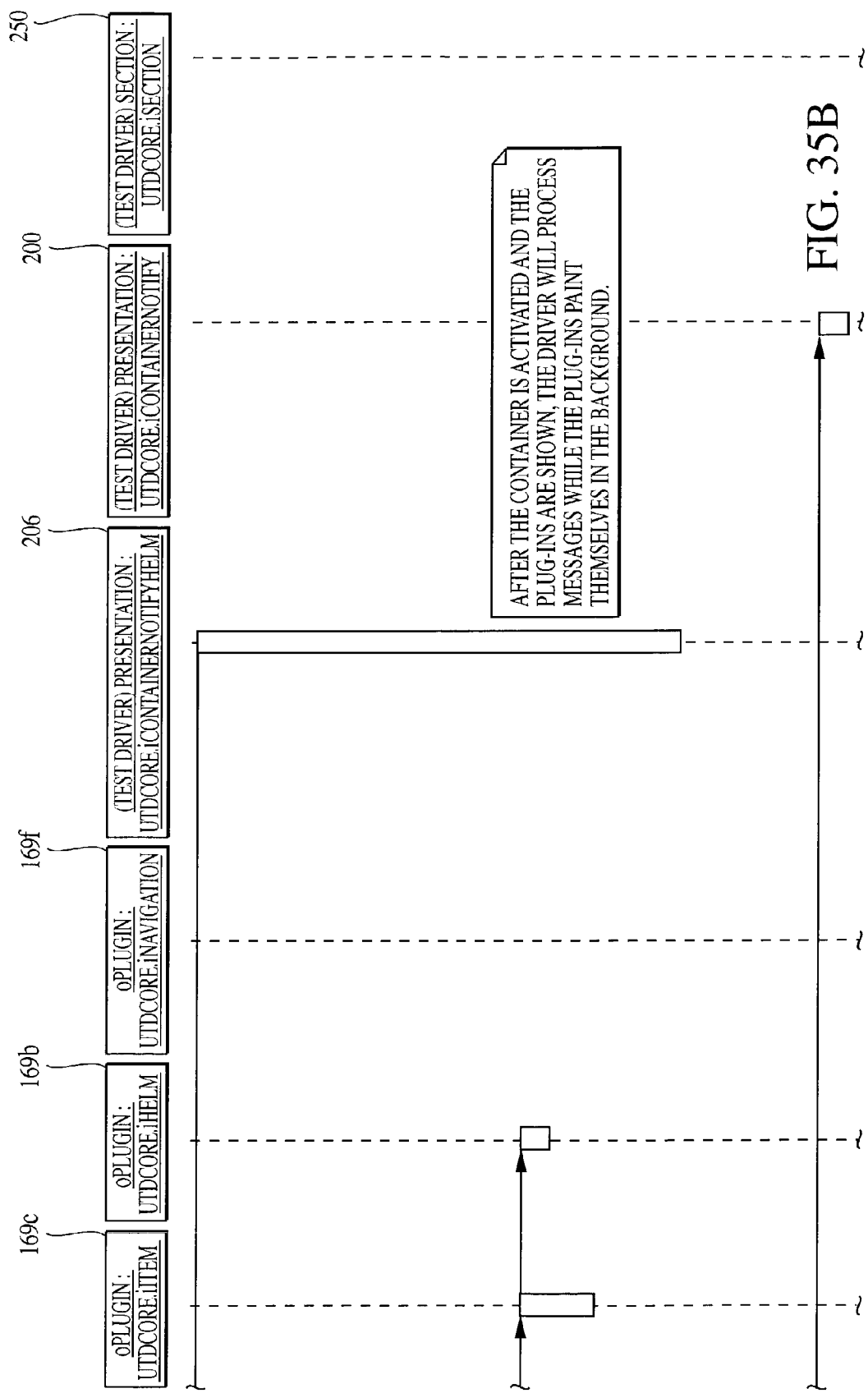

The delivery sequence of a plugin 150, as shown in steps II, IV, and V in FIG. 33, are illustrated in greater detail in FIGS. 35A, 35B, 35C, and 35D. As seen in FIG. 35A, delivery sequence 1520 particularly relates to visible plugins 150, e.g., display plugin 152, helm plugin 154, and item plugin 156. Step III contains sub-steps labeled IIIa-IIIb. Plugin delivery sequence 1520 begins, in step IIIa, when the current delivering presentation requests its template to activate with IContainerNotifyHelm::Activate( ) call 1524. Activate( ) call 1524 is activated when the examinee navigates on the test using a helm navigation control activated by helm plugin 154. IContainerNotifyHelm interface 206 allows helm plugin 154 to request navigation from test driver 110. IContainerNotifyHelm interface 206 sends Activate( ) call 1524 to cTemplate class 236 in test driver 110 (see FIG. 9).

In step IIIb, cTemplate class 236 in test driver 110 uses IPlugin::Load( ) call 1526 to set the core object references from test driver 110 into the plugin 150 being delivered. The core object references include IContainerNotify interface 200, the cExam class (not shown), and the IAppointment interface 176, which passes information regarding the examinee and appointment to plugin 150.

Step V, which is interspersed with step III, occurs only if the test is interrupted and plugin 150 loses state. cTemplate class 236 in test driver 110 uses IPersistInstance*::Reload( ) call 1528 to call on the reload method of exam instance file 170. Exam instance file 170 reloads plugin 150, through IPersistInstance interface 192, for example, IPersistInstanceSet 192*b*, with the state saved to the appropriate storage location in exam resource file 170 (see FIG. 27).

Step IIIc is performed for both initial delivery of plugin 150 and during restart of the test, in conjunction with step V. cTemplate class 236 in test driver 110 uses IPersistResource*::Load( ) call 1530 to call on the load method of exam resource file 120. Exam resource file 120 loads plugin 150, through IPersistResource interface 192, for example IPersistResourceSet interface 192*b*, with the test specification and content from the appropriate storage location in exam resource file 120. Plugin 150 is loaded with test specification and content from exam resource file 120 when being initially delivered to the examinee. Plugin 150 is also loaded with test specification and content from exam resource file 120 and with examination state information from exam instance file 170, as described above, when the test has been interrupted and plugin 150 must recover state.

After plugin 150 is properly loaded, cTemplate class 236 in test driver 110 uses, I*::PresentationStarting( ) call 1532 (continued in FIG. 35B) to inform visible plugin 150 that the presentation is starting, in step IIId. I*::Presentation Starting( ) call 1532 is made to any visible plugin 150 being used in the presentation on the appropriate interface, for example: IDisplay interface 169a, IItem interface 169c, or IHelm interface 169b. For example, an IItem::Presentation-Starting( ) call is used for item plugin 156. cTemplate class 236 then instruct visible plugins 150 to display using IOleObject::DoVerb(Show, . . . ) command 1534, step IIIe. IOleObject interface 1522 is the Active Document interface used to implement the Active Document presentation. (See FIG. 5). IOleObject interface 1522 is the combination of the Active Document interfaces described in conjunction with FIG. 8. After instructing visible plugins 150 to display, test driver 110 awaits notification from each visible plugin 150 that the specific visible plugin 150 has successfully shown. Visible plugins 150 call back to test driver 110 using IContainerNotify::Activated( ) call 1536, step IIIf. Now, the presentation is started and active such that the examinee can interact with the presentation.

The deactivation of the presentation begins with a request from the helm for navigation. For example, if the examinee has finished a question and wishes to move on to the next question on the next presentation, the examinee can choose the "NEXT" button on the helm. The navigation request is sent from IHelm interface 169b, which receives the request from the examinee, to test driver 110 using IContainerNotifyHelm interface 206. As seen in FIG. 35D, the request is made using IContainerNotifyHelm::RequestMove( ) call 1538, step IIIg. Test driver 110 then asks each item plugin 156 being used in the presentation template if the examinee is allowed to leave the current presentation and to proceed to the next presentation. The query is made using IItem::bProceed( ) call 1540, step IIIh. If all item plugins 156 respond in the affirmative, test driver 150 passes the navigation request to navigation plugin 162, which is an invisible plugin 150. Test driver 110 passes the request using INavigate::RequestMove( ) call 1542, step IIIi. Navigation plugin 162 determines the resultant location of the requested navigation. In FIG. 35, for example, navigation plugin 162 determines the section of the test to which the examinee will proceed using ISection::ChildNext( ) call 1544, step IIIj.

Figure 35C:
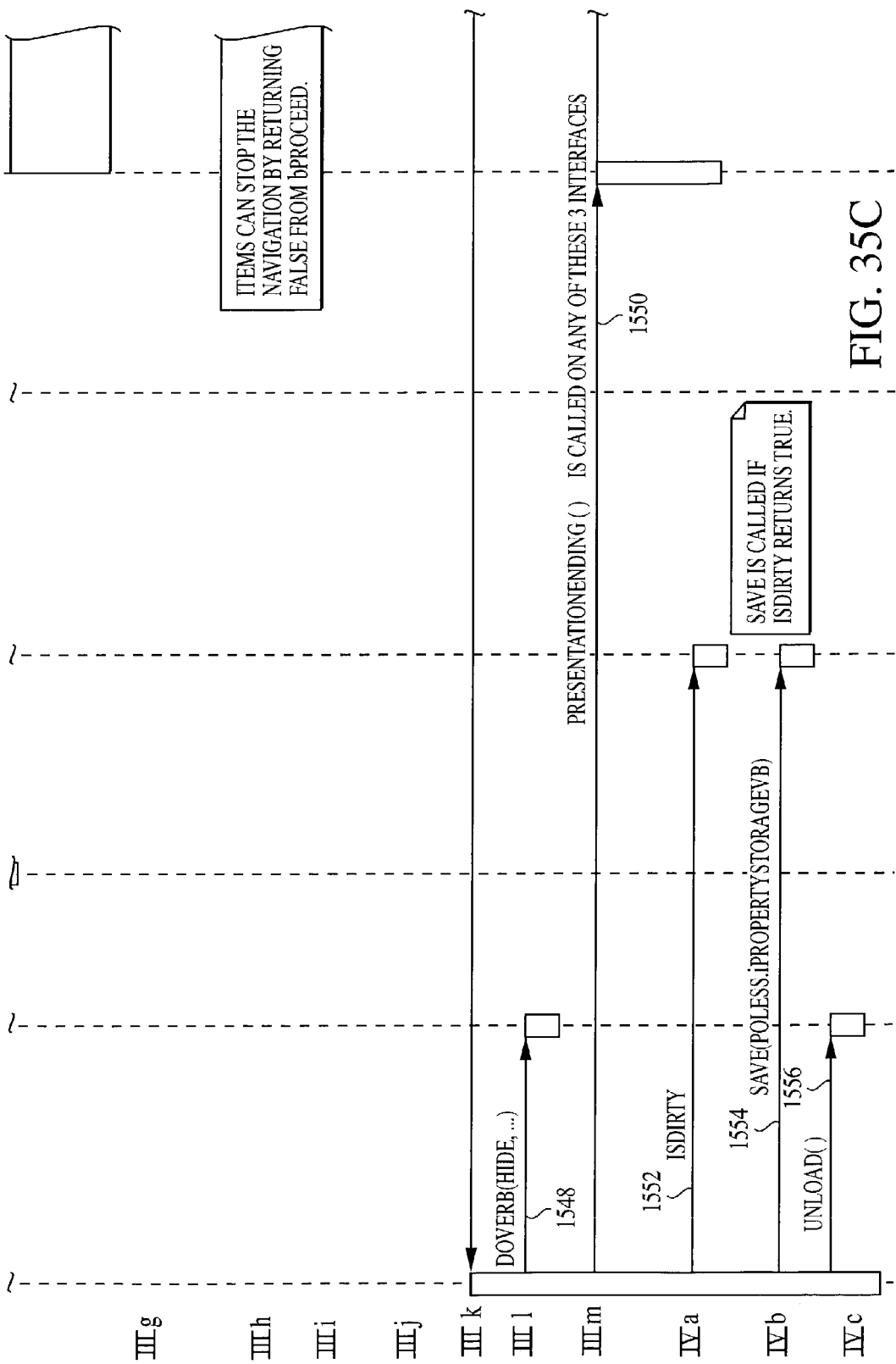

The active presentation then instructs the template to deactivate using cTemplate::Deactivate( ) call 1546, step IIIk (continued in FIG. 35C). Referring back to FIG. 35D, cTemplate class 236 in test driver 110 requests that visible plugins 150 hide from the Active Document using IOleObject::DoVerb(Hide, . . . ) call 1548, step IIIl. cTemplate class 236 in test driver 110 informs visible plugins 150 that the current presentation is ending using I*::PresentationEnding( ) call 1550, step IIIm. For example, cTemplate informs helm plugin 154 that the current presentation is ending using the IHelm::PresentationEnding( ) call.

Step IV, which contains sub-steps IVa-c, is the process to save plugin state data to exam instance file 170. Test driver 110 requests the "dirty" state of plugin 150 to determine whether plugin 150 is storing any state information that would be necessary if the test were to be interrupted. Test driver 110 uses IPersistInstance*::IsDirty( ) call 1552 to make the request, step IVa. For example, test driver 110 uses IPersistInstanceSet::IsDirty call 1550 if the state data is a property set. If plugin 150 is storing state data that is not already stored in exam instance file 170, IPersistInstance*::IsDirty( ) call 1552 returns true. If plugin 150 is "dirty", test driver 110 instructs plugin 150 to save the state data to exam instance file 170 in the POLESS object provided (FIG. 27) using IPersistInstance*::Save( ) call 1554, step IVb. Finally, test driver 110 instructs plugins 150 to unload all objects using IPlugin::Unload( ) call 1556, step IVc.

B. Customizing Test Appearance Using Visible Plugins

1) Templates and Presentations in XXL

Figure 36:
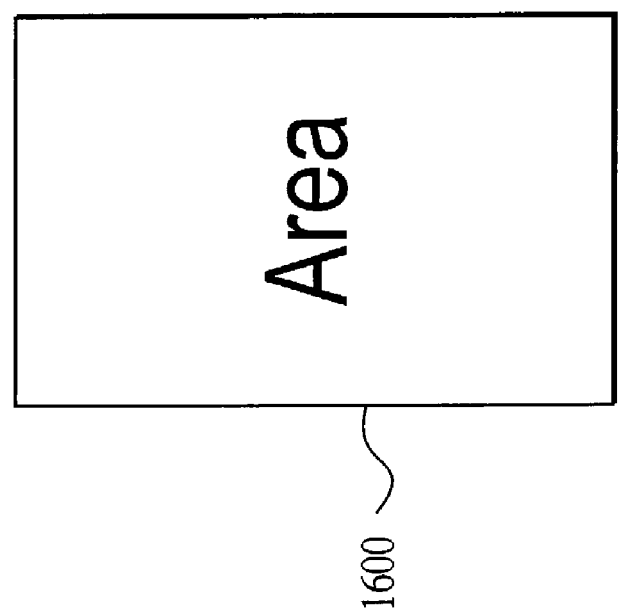
FIG. 36 is an illustration of various areas as used to create displays according to the present invention.
Figure 36:
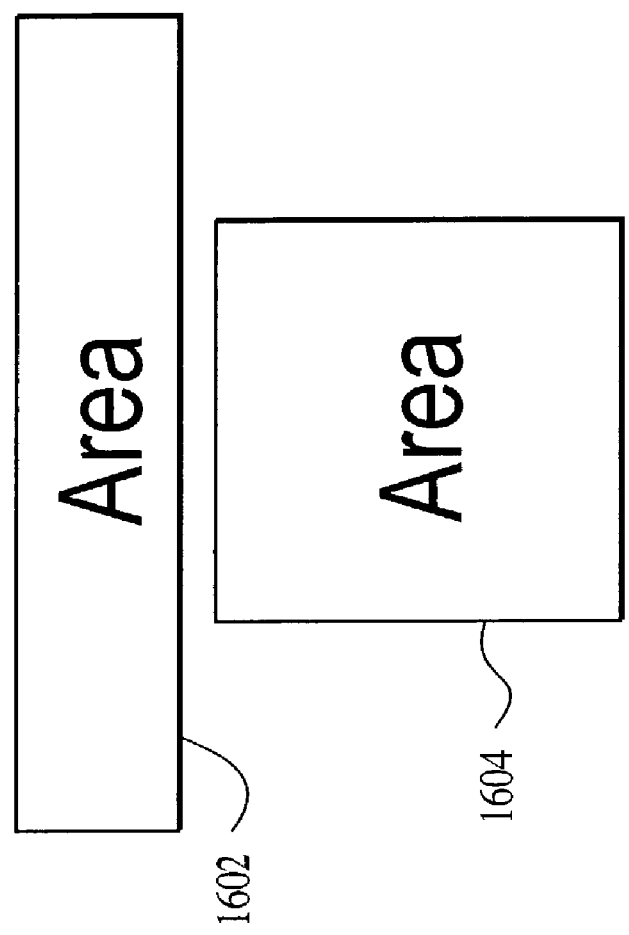

The presentation is what is currently seen by the examinee on the display device at a particular instant during the test. When a presentation is rendered, the template is chosen and the screen divided into areas. Each area is an Active Document container 112 (FIG. 3) that hosts the specified visible plugin 150 that is an Active Document server. The specified visible plugin 150 is chosen by prog ID. FIG. 36 shows several different types of areas. Area 1600 is a vertically elongated rectangle. Area 1602 is a horizontally elongated rectangle. Area 1604 is a square. Areas can take any rectilinear shape as is dictated by the needs of the presentation or template. Other shapes besides rectangular shapes may optionally be used.

Using XXL, the test publisher can define many templates. Each template is named and divided into areas. The layout of the template is based on the division of the screen into areas. Each sub-element of the template divides the screen space by rows or columns. This layout technique is similar to HTML frame sets. The test publisher can use a particular template many times in different presentations, allowing the test publisher to customize the look of the test. Below is an example of XXL used to define a template:

```
<template name="multiItem_Template" split="rows">
    <area name="titlebar" size="40" plugin="displayTitlebar">
        <data>
            <titlebarHelm done="false" calc="false" help="false" />
        </data>
    </area>
    <area name="item" plugin="itemMultiChoice" size="*" />
    <area name="helm" size="40" plugin="helmNextPrevious">
        <data>
            <nextPrevious bgcolor="#D4D0C8">
                <button action="next" img=". ./images/continue.bmp" />
            </nextPrevious>
        </data>
    </area>
</template>
```

Figure 37:
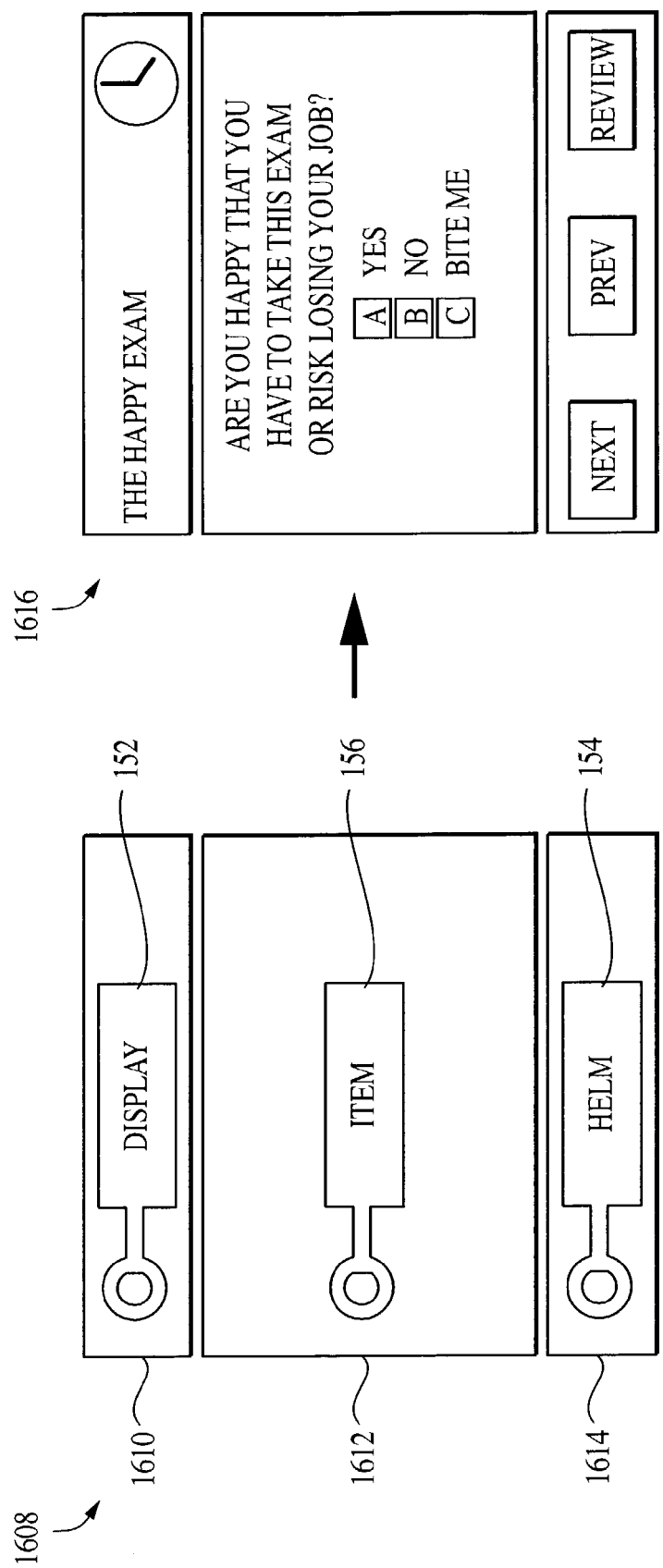
FIG. 37 is an illustration of containing visible plugins within areas to create displays according to the present invention.

The template above is named "multiItem_Template", which divides the display device, e.g., a computer screen, horizontally by rows. The "split" attribute, which in this example has the value "rows", defines how the display device is split in the template. "MultiItem_Template" has three areas: "titlebar"; "item"; and "helm". FIG. 37 shows the layout of these three areas. The size of "titlebar" area 1610 and "helm" area 1614 are defined at 40 pixels high. The size of "item" area 1612 is defined by an "*", which instructs "item" area 1612 to take up any remaining space not used by "titlebar" area 1610 and "helm" area 1614.

A template is created by combining areas together. Template 1608 is formed by grouping "titlebar" area 1610, "item" area 1612, and "helm" area 1614. It should be noted that there is no rule governing where a particular area must appear in the template. The test publisher can create any type of template using the XXL test definition language. A presentation is created by containing a visible plugin 150 in each area of a template. In the XXL example above, as shown in FIG. 37, "titlebar" area 1610 contains "displayTitlebar" display plugin 152, "item" area 1612 contains "itemMultiChoice" item plugin 156, and "helm" area 1614 contains "helmNextPrevious" helm plugin 154. The areas and plugins 150 combine to create presentation 1616. Presentation 1616 displays a non-interactive display in "titlebar" area 1610, a multi-choice item in "item" area 1612, and test navigation controls in "helm" area 1614.

Figure 38:
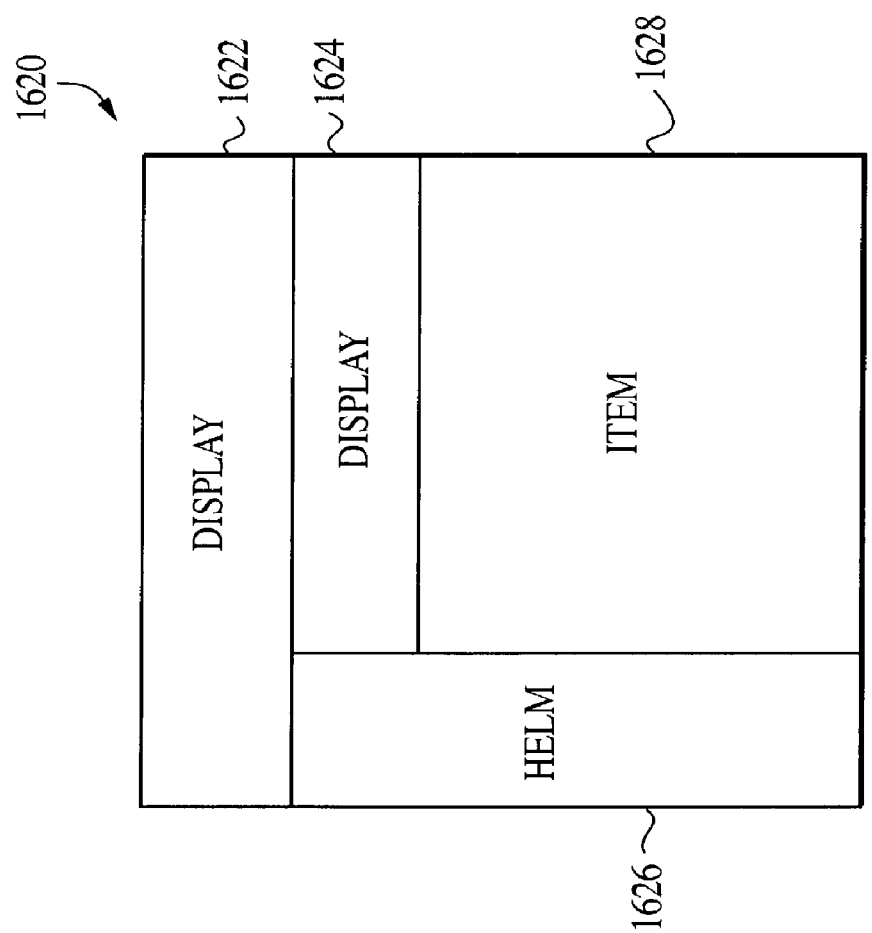
FIG. 38 is an illustration of templates used to create displays according to the present invention.
Figure 39:
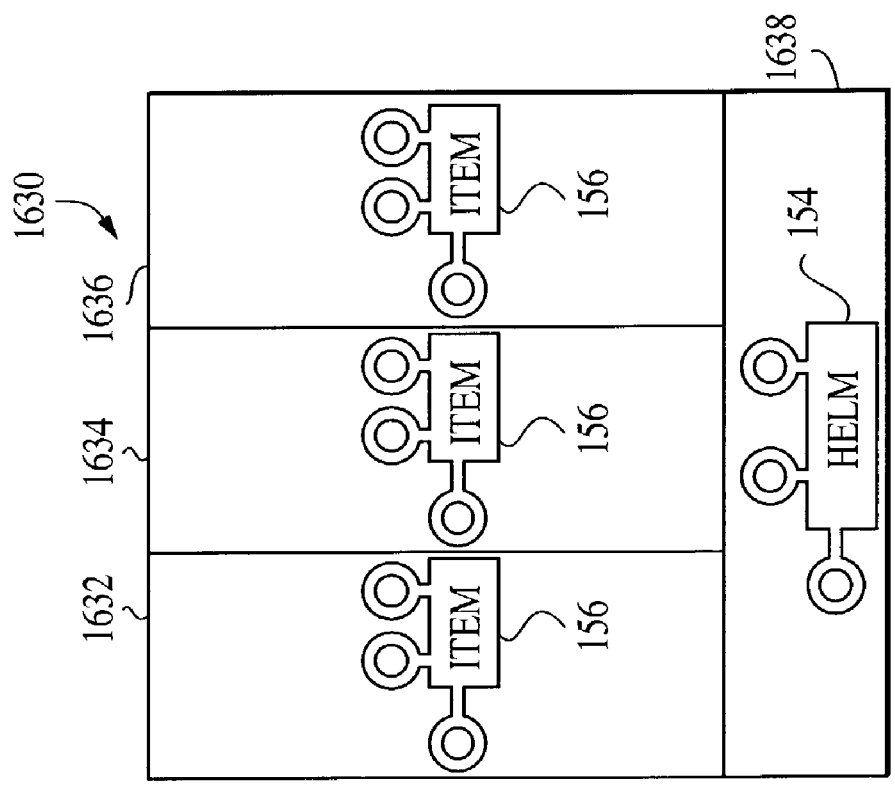
FIG. 39 is an illustration of how plugins are used with templates to create displays according to the present invention.

FIG. 38 and FIG. 39 show further examples of templates and presentations. In FIG. 38, template 1620 is formed by grouping display area 1622, display area 1624, item area 1628, and helm area 1626. There is no limit on the arrangement of areas with a template and there is no restriction on the type of areas used. In FIG. 39, presentation 1630 is formed by grouping area 1632, which contains an item plugin 156, area 1634, which contains an item plugin 156, area 1636, which contains and item plugin 156, and area 1638, which contains a helm plugin 154. There is no display area or display plugin 152 used in presentation 1630. There is no requirement that any particular visible plugin 150 appear within a presentation or that all three types of visible plugins 150 must appear within a single presentation.

Typically, each time a template is used, the areas in the template receive new data, thus creating a new presentation. The "presentation" XXL element links a template to the data used in the template and places the template and related data into the test delivery hierarchy. Some areas in the template may have data defined at the template level. Other areas will not receive their data until the presentation is defined. Some areas in the template may have data defined at the template level that is overridden using amalgamation at the presentation level.

For example, a template "main_temp" defines the data for all areas except an area "main_item". The area "main_item" will have a different item, or question, for each different presentation, even though the items all relate to the same scenario. Below is the XXL for the three presentations that use the "main_temp" template:

```
<group name="group01" >
    <selection plugin="sequential" />
    <scoring plugin="testScore" />
    <presentation item="item101" template="main_temp" area="main_item" />
    <presentation item="item102" template="main_temp" area="main_item" />
    <presentation item="item103" template="main_temp" area="main_item" />
</group>
```

The "group" element contains three "presentation" elements. Each "presentation" element delivers different item data in the "main_item" area.

Templates can be nested to create vertical and horizontal divisions of the display device. Below is a more complex description of a template in XXL:

```
<template name="main_temp"  split="cols">
    <area name="title" plugin="browserDisplay" size="170" >
        <data>
            <browserDisplay URI="displays/titlebar.htm" />
        </data>
    </area>
    <template name="rest" split="rows" size="*">
        <template name="top" split="cols" size="*">
            <area name="scenario"  plugin="browserDisplay" size="60%" >
                <data>
                    <browserDisplay URI="displays/train.htm" />
                </data>
            </area>
            <area name="main_item" plugin="multi" size="40%" />
        </template >
        <template name="bottom" split="cols" size="170">
            <area name="next_helm" plugin="nextPrevious" size="4*" >
                <data>
                    <nextPrevious bgcolor="#FFFFFF">
                        <button img="images/previou.bmp" action="previous" />
                        <button img="images/next.bmp" action="next" />
                    </nextPrevious>
                </data>
            </area>
            <area name="calc" plugin="browserDisplay" size="3*" >
                <data>
                    <browserDisplay URI="displays/calculator.htm" />
                </data>
            </area>
        </template >
    </template >
</template >
```

Figure 40:
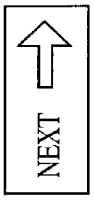
FIG. 40 is an example of a presentation created according to the present invention.

FIG. 40 shows the rendering of "main_temp" template 1640. "Main_temp" template 1640 divides the screen into five areas. "Title" area 1642, "scenario" area 1644, and "calc" area 1650 are display areas containing display plugins 152. The XXL definition for "scenario" area 1644 contains further plugin data, "URI" attribute with the value "displays/train.htm". The "URI" attribute links the XXL definition to an external file that contains the multimedia content of "scenario" area 1644. The "URI" attribute for display plugin 152 in the XXL definition for "title" area 1642 defines the appointment information in the title bar. "Main_item" area 1646 contains "multi" item plugin 156. "Helm" area 1648 contains "nextPrevious" helm plugin 154. The additional data in the XXL definition for "helm" area 1648 defines the appearance of the test navigation control button. "Calc" area 1650 contains "browserDisplay" display plugin 152. The "URI" attribute contains a link to an interactive calculator that the examinee can use during the question.

"Main_temp" template 1640 uses nested sub-templates to create the configuration of the five areas. The first sub-template is named "rest". The "rest" template defines the appearance of the screen after "title" area 1642 has been rendered. "Title" area 1642 splits the screen into columns and has a "size" defined as 170 pixels wide. The "rest" template splits the remainder of the screen into rows. The "size" attribute for the "rest" template is defined with an "*" so that its size is limited only by the size of "title" area 1642.

The "rest" template has two sub-templates named "top" and "bottom". The "top" template contains "scenario" area 1644 and "main_item" area 1646. The "top" template splits its portion of the screen into columns. The "size" attribute for the "top" is defined with the indeterminate and is, therefore, limited in size only by the "bottom" template. "Scenario" area 1644 has a "size" attribute that defines "scenario" area 1644 as taking up 60% of the space available in the "top" template while the "size" attribute of "main_item" area 1646 limits "main_item" area 1646 to 40% of the available space.

The "bottom" template contains "next_helm" area 1648 and "calc" area 1650. The "bottom" template also splits its portion of the screen into columns. The "bottom" template is defined by its "size" attribute as being 170 pixels high. The "size" attribute for "next_helm" area 1648 is defined as "4*" while the "size" attribute for "calc" area 1650 is defined as "3*", meaning that "next_helm" area takes up 4/7

$$\left(\frac{4}{(4+3)}\right)$$

the amount of space as does "calc" area 1650 within the space available within the "bottom" template.

2) HTML Aspects of Templates and Presentations

Active Document plugins 150 make use of a visible control to render HTML. Test driver 110 utilizes a browser control that encapsulates the core portion of Internet Explorer. The browser control uses HTML rendering capabilities, script interpretation (VBscript and Jscript), Java applet support and Active-X control support.

Multi-choice item plugin 156 is utilized in "main_item" area 1646. Multi-choice item plugin 156 houses the browser control and uses the browser control to render the HTML containing the question stem and possible responses, or distracters. In an alternative embodiment, extensible HTML ("XHTML") is used. XHTML, which has many of the same elements as HTML, has a slightly different syntax than HTML to conform to the rules of XML. Below is the HTML used in "main_item" area 1646:

```
<body background="RS:trainback.gif" bgproperties="fixed">
    <!------ ITEM (item1) ------->
    <div id="item1" border="1">
        <blockquote>
            <p>
                <!-------- STEM TEXT --------->
                What is the relative velocity of the two
trains?
            </p>
            <form>
                <blockquote>
                    <p>
                        <input type="radio" value="A"
                            id="Aitem1"
name="item1" />
                        <label for="Aitem1" accesskey="A">
                        <!-- Distractor A TEXT --------->
                        A. 20 MPH</label></p>
                    <p>
                        <input type="radio" value="B"
                            id="Bitem1"
name="item1" />
                        <label for="Bitem1" accesskey="B">
                        <!-- Distractor B TEXT --------->
                        B. 60 MPH
                        </label></p>
                    <p>
                        <input type="radio" value="C"
                            id="Citem1"
name="item1" />
                        <label for="Citem1" accesskey="C">
                        <!-- Distractor C TEXT --------->
                        C. 80 MPH
                        </label></p>
                    <p>
                        <input type="radio" value="D"
                            id="Ditem1"
name="item1" />
                        <label for="Ditem1" accesskey="D">
                        <!-- Distractor D TEXT --------->
                        D. 140 MPH
                        </label></p>
            </form>
        </blockquote></blockquote>
    </div>
</body>
```

The code above is standard HTML. Multi-choice item plugin 156 links up to the input elements by way of the browser control in order to control the appearance of the item.

In some cases, the test publisher needs to access test driver 110 objects to display core or plugin 150 properties. For example, "title" area 1642 contains information about the examinee, the test, the form, the section, and the time. All of this information exists in the test driver 110 objects. The browser supports script interpretation using Windows Scripting Host ("WSH"). The scripting environment is granted access to test driver 110 object by was of the "Window.External" object. Below is a portion of the HTML for "title" area 1642:

```
<p>
    Appointment:<br>
    <table border="2" style="border-style:inset">
        <tr>
            <td>
                <SCRIPT Language="VBSCRIPT">
                    Document.write
Window.External.oAppointment.sAppointmentID
                </SCRIPT>
            </td>
        </tr>
    </table>
    Candidate:<br>
    <table border="2" style="border-style:inset">
        <tr>
            <td>
                <SCRIPT Language="VBSCRIPT">
                    Document.write
Window.External.oAppointment.sName
                </SCRIPT>
            </td>
        </tr>
    </table>
    City:<br>
    <table border="2" style="border-style:inset">
        <tr>
            <td>
                <SCRIPT Language="VBSCRIPT">
                    Document.write
Window.External.oAppointment.Properties.Item("CandidateCity
").Value
                </SCRIPT>
            </td>
        </tr>
    </table>
</p>
<p>
    Exçm:<br>
    <table border="2" style="border-style:inset">
        <tr>
            <td>
                <SCRIPT Language="VBSCRIPT">
                    Document.write Window.External.oExam.sTitle
                </SCRIPT>
            </td>
        </tr>
    </table>
```

-continued

```
Form:<br>
<table border="2" style="border-style:inset">
    <tr>
        <td>
            <SCRIPT Language="VBSCRIPT">
                Document.write Window.External.oForm.sTitle
            </SCRIPT>
        </td>
    <tr>
</table>
Section:<br>
<table border="2" style="border-style:inset">
    <tr>
        <td>
            <SCRIPT Language="VBSCRIPT">
                Document.write
Window.External.oSection.sTitle
            </SCRIPT>
        </td>
    </tr>
</table>
</p>
```

In the above example, the appointment object, exam object, form object, and section object are all referenced from the "Window.External" property.

Further, test driver 110 implements an Internet Explorer pluggable protocol. The pluggable protocol supplies the requested data from exam resource file 120 using composite moniker interfaces. The composite moniker interfaces allow resolution of hyperlinks to test content data. Exam resource file 120 is an OLE structure storage accessed with the composite moniker interfaces.

A standard HTML web page will reference other pages (hyperlinks) and multi-media via the HTTP protocol. Use of the HTTP protocol requires transfer of content from a separate file over the internet or an intranet. Such transfer requirements are not acceptable in computer-based testing. Individual pages could be missing, the communications could be unavailable, or the transmissions could be intercepted.

Test driver 110 solves the problem of unreliability by placing all content in the encrypted exam resource file 120 using POLESS. To allow the test publisher the flexibility of HTML and still provide the reliability and security of a single file, test driver 110 utilizes the pluggable protocol. Asynchronous pluggable protocols enable developers to create pluggable protocol handlers, MIME filters, and namespace handlers that work with Microsoft Internet Explorer and a URL moniker.

POLESS implements the pluggable protocol to allow direct access to storage elements within exam resource file 120. Test driver 120 registers data branch 950 of exam resource file 120 with POLESS under the protocol prefix "RS". Therefore, the test publisher can reference other pages with hyperlinks and multi-media data in the HTML. By prefixing the name with the "RS:", the items will be fetched from exam resource file 120. Below is the HTML for "scenario" area 1644:

```
<html>
    <body bgproperties="fixed" scroll="no">
        <center>
            <table border="2" bgcolor="white">
                <tr>
                    <td>
                        <p>Scenario:</p>
                        <p><i>Train A</i> left Chicago heading
east to New York at
```

-continued

```
                            60 MPH. At the
                            same time, <i>Train B</i> left New
York heading west to
                            Chicago at 80
                            MPH. The distance from New York to
Chicago is 788 miles.</p>
                        </td>
                    </tr>
                </table>
                <p><img border="2" src="RS:ChicagoNY.gif"
width="410" height="198"></p>
                <table border="0" bgcolor="white" cellpadding="2">
                    <tr>
                        <td><img border="2" src="RS:train.jpg"
width="296" height="198"></td>
                        <td>From: CHICAGO, IL US
                            <p>
                            To: NEW YORK, NY US<p>
                            Total Distance: 788 miles</td>
                    </tr>
                </table>
        </center>
    </body>
</html>
```

The "img" element in the above HTML references embedded images using the "src" attribute and the "RS" protocol.

2) Items

Items defined in XXL are made up of two components: a visual component and a properties component. The visual component controls what the examinee sees on the display device and is rendered using HTML, as described above. The properties component controls the attributes of an item, e.g., the correct answer for the item, the weight of the item, the minimum number of responses for the item, etc. The item's visual component and properties component are stored under item branch 650 in data storage 662 or data stream 664 in exam resource file 120 (FIG. 15).

Every item defined in the test specification is given a name. In XXL files 134, in exam source files 130, the item is given a property name, i.e., "quest01". In HTML file 138, also in exam source files 130, the item is wrapped in a <div> tag which contains the same identification for the item. Therefore, the XXL definition for the item is:

```
<item name="quest01"
...
</item>
```

The HTML definition for the same item is:

```
<div id = quest01>
...
</div>
```

The XXL test definition language along with HTML can be used to define many different types of items. Some common item types include, for example: multi-choice items, hot area items, and fill-in-the-blank or essay items. All items are rendered using a combination of XXL definition and HTML definition. And example of the XXL and HTML definitions of a multi-choice item follows:

XXL:
```
<item    name="985"    templates="multiQuest"
    area="main"    weight="1.0"
            scored="true"    skipAllowed="false"
    >
    <data>
        <multiChoice    correctAnswer="B"
        autoPrompt="false"
                minResponses="1"
        maxResponses="1"
                URI="item_bank.htm1#985"
        />
    </data>
</item>
HTML:
<div id="985"    border="1">
    <blockquote>
        <p>How do you feel today? </>
        <form>
            <p><input type="radio" valuer="A" id="A985"
name="985"/>
            <label for="A985" accesskey="A">
                A. Happy
            </label>
            </p>
        </p><input type="radio" value="B" id="B985"
name="985" />
            <label for="B985" accesskey="B">
                B. Sad
                </label>
            </p>
            </p><input type="radio" value="C" id="C985"
name="985" />
            <label for="C985" accesskey="C">
                C. A bit Kylish
                </label>
                </p>
        </form>
    </blockquote>
</div>
```

FIG. 41 illustrates the visual rendering of item "985". The "985" identifier for the item is used in both the XXL definition and the HTML definition. According to the attributes defined in the XXL definition, item "985" appears in area "main" of template "multiQuest". Item "985" is a scored item that is weighted as one point and may not be skipped by the examinee. The <data> tag assigns further properties to item "985". In the above example, the correct answer to item "985" is "B" and only one response is allowed for the item. Finally, the "URI" attribute assigns the visual rendering of item "985" to the above HTML file.

Figure 42:
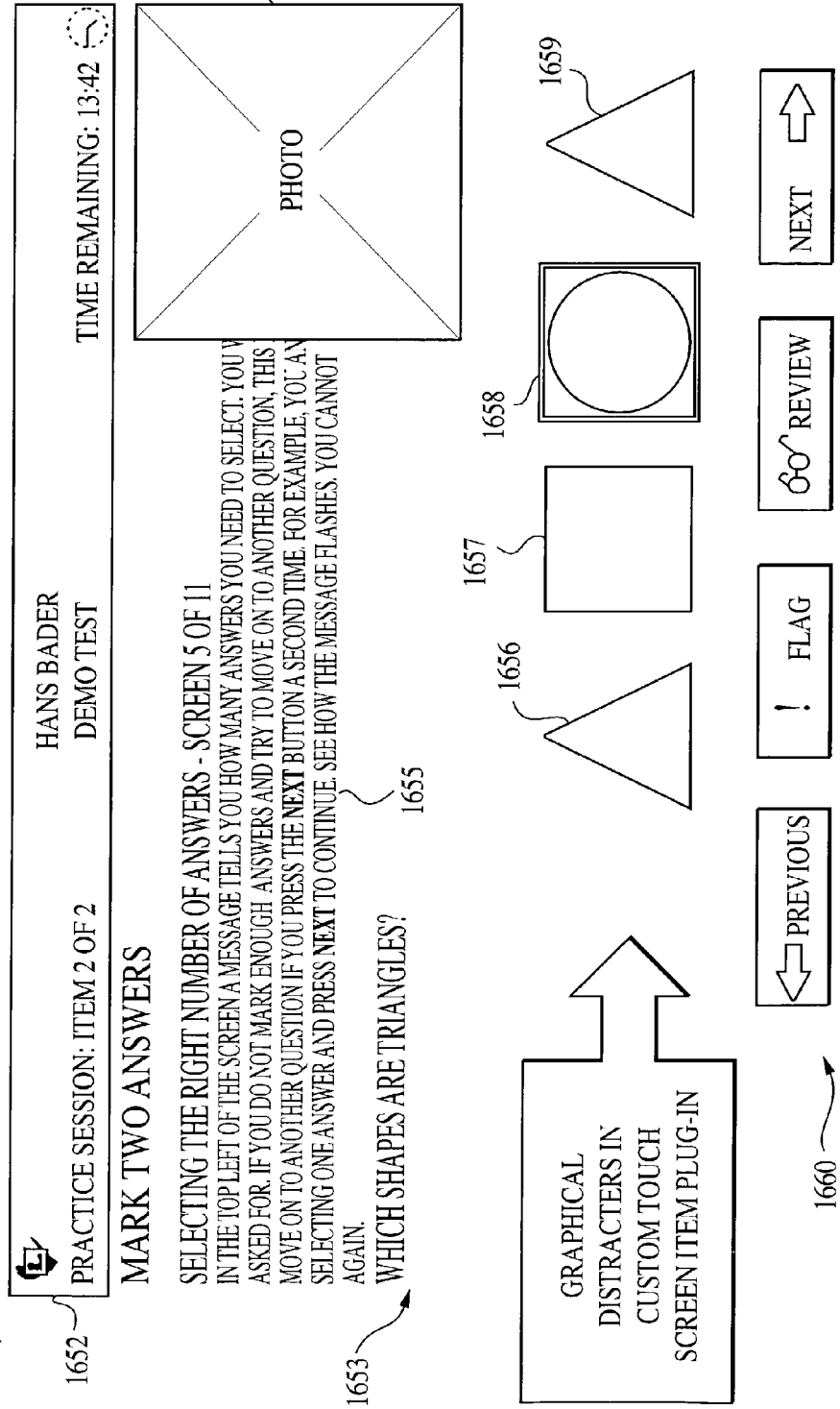
FIG. 42 is an example of a presentation of a multiple choice item using graphical distractors created according to the present invention.

FIGS. N-7 to N-12 illustrate further examples of the use of items in presentations. FIG. 42 shows a multi-choice item presentation using graphical distracters in a touch screen environment. Presentation 1651 has title area 1652, item area 1653, and helm area 1660. Title area 1652 contain display plugins 152 that present a variety of display information, such as, the examinee's name, Hans Bader, the number of the current item, the fact that the test is a demonstration, and the time remaining in the test. Item area 1653 contains an item plugin 156 that defines a multi-media visual 1654 and touch screen graphical distracters 1656, 1657, 1658, and 1659 using an "URI" attribute that defines a related HTML file. Helm area 1660 contains a helm plugin 154 that provides a variety of test navigation controls.

Figure 43:
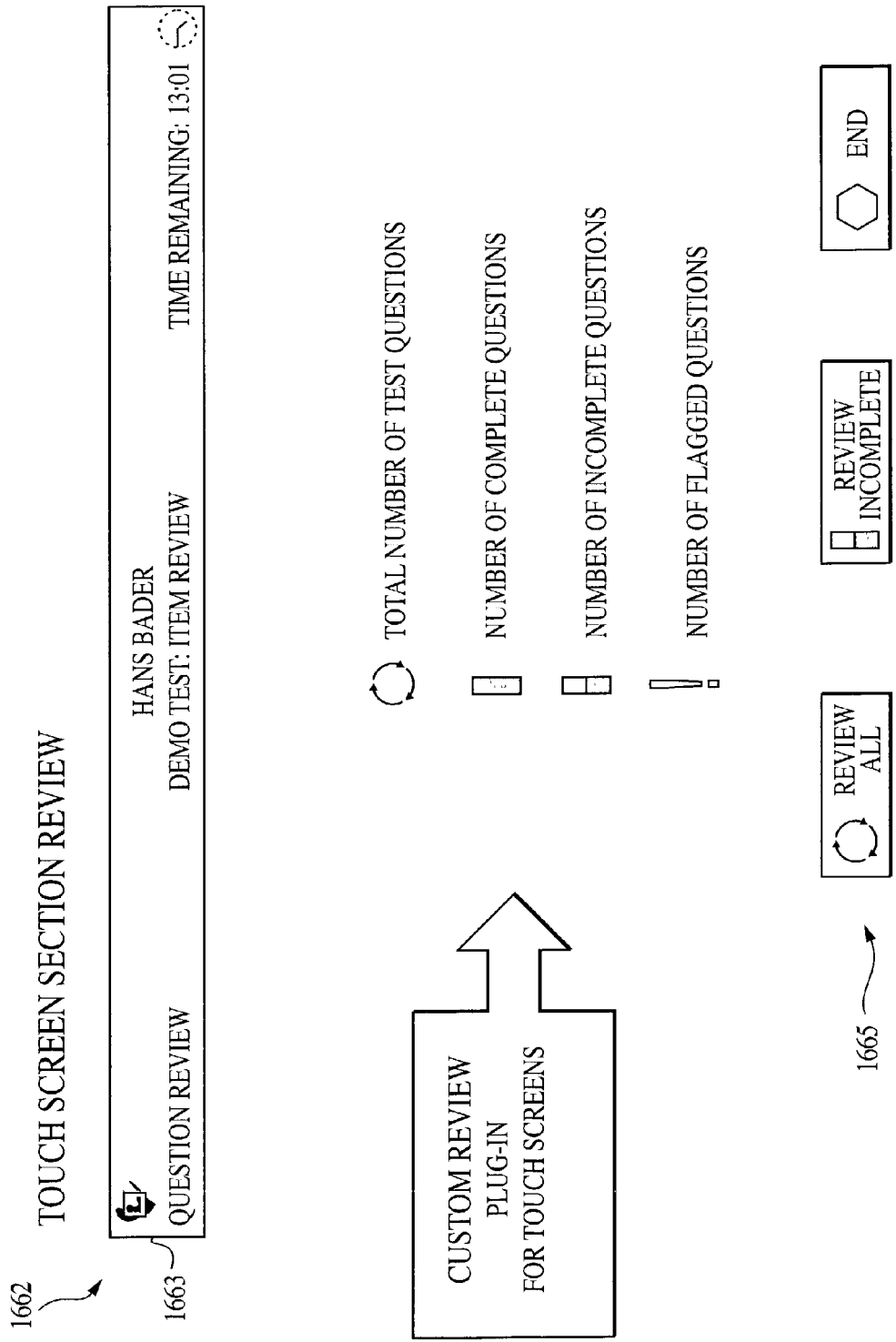
FIG. 43 is an example of a presentation of a review screen created according to the present invention.

FIG. 43 shows review screen 1662, presents the results of the demonstration test shown in FIG. 42. Title area 1663 contains display plugins 152 that present information about the examinee, the fact that the current presentation is a review screen, and the time elapsed for the test. Main area 1664 contain display plugin 152 that present information about the examinee's performance on the test. Helm area 1665 contains a helm plugin 1665 that provides a variety of test navigation controls.

Figure 44:
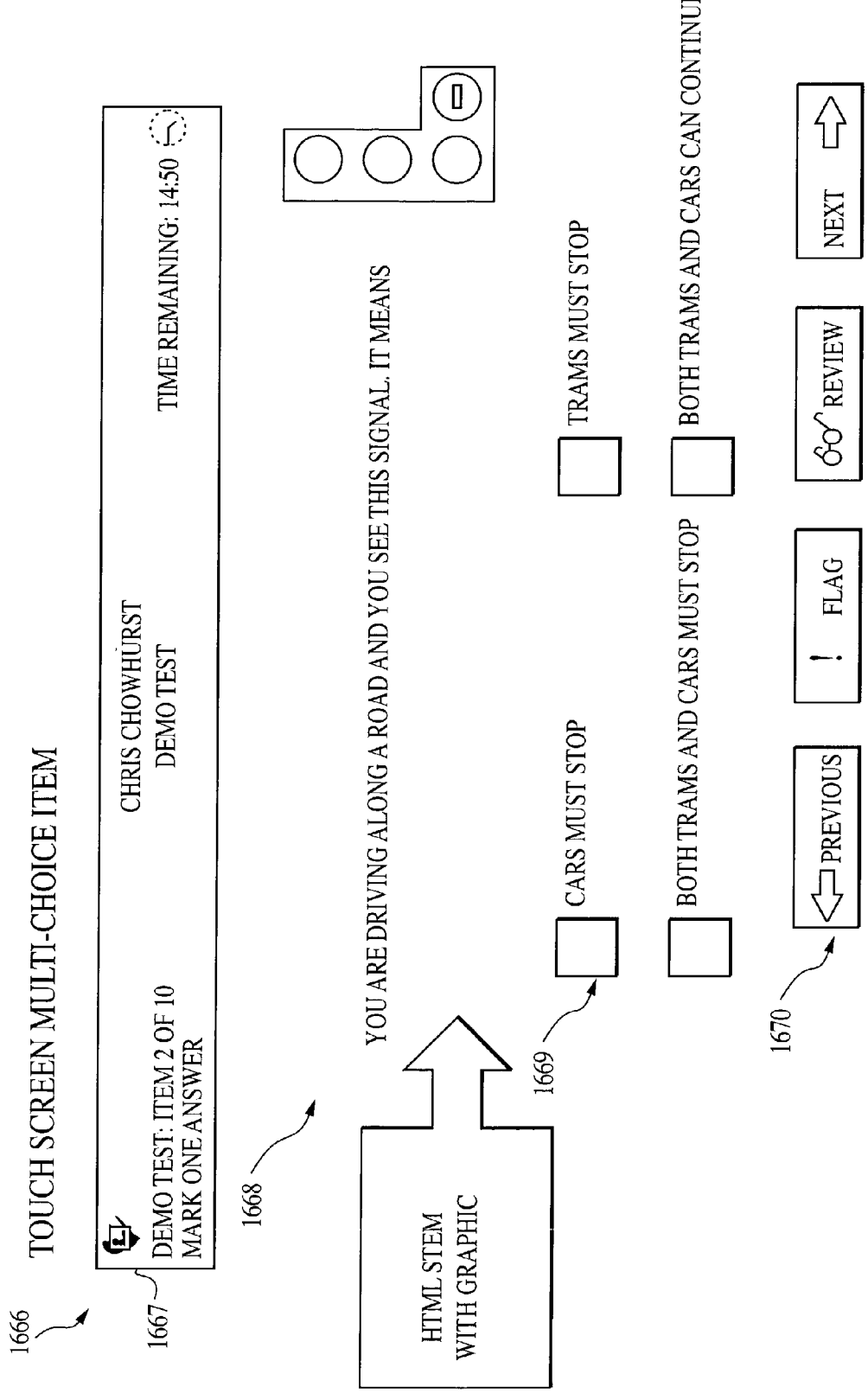
FIG. 44 is an example of a presentation of a multiple choice item using HTML created according to the present invention.

FIG. 44 shows another touch screen multi-choice item. Presentation 1666 has title area 1667, scenario area 1668, item area 1669, and helm area 1670. Title area 1667 contains display plugins 152 that present various information about the examinee and the test. Scenario area 1668 contains a display plugin 152 with a "URI" attribute that defines an HTML stem and a graphic. Item area 1669 contains an item plugin 156 that presents touch screen distracters using an "URI" attribute that defines a related HTML file. Helm area 1670 contains a helm plugin 154 that provides a variety of test navigation controls.

Figure 45:
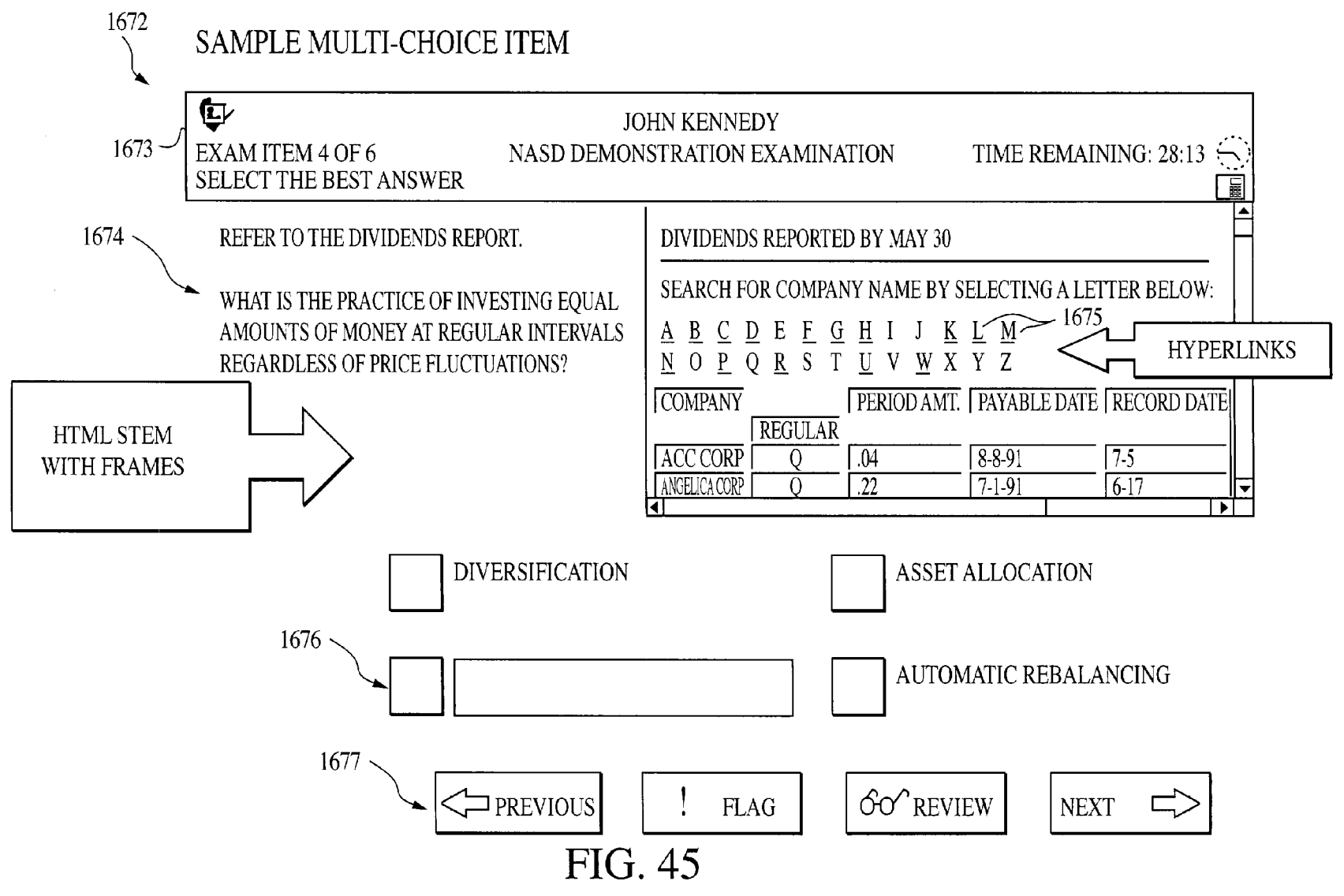

FIG. 45 shows a multi-choice item that utilizes hyperlinks. Presentation 1672 has title area 1673, scenario area 1674, item area 1676, and helm area 1677. Title area 1673 contains display plugins 152 that present various information about the examinee and the test. Scenario area 1674 uses a variety of display plugins 152 to display a prompt, "Select the best answer," and a calculator rendered using an "URI" attribute. Scenario area 1674 also presents a stem that uses both text and hyperlinks 1675. Item area 1676 contains an item plugin 156 that presents touch screen distracters using an "URI" attribute that defines a related HTML file. Helm area 1677 contains a helm plugin 154 that provides a variety of test navigation controls.

Figure 46:
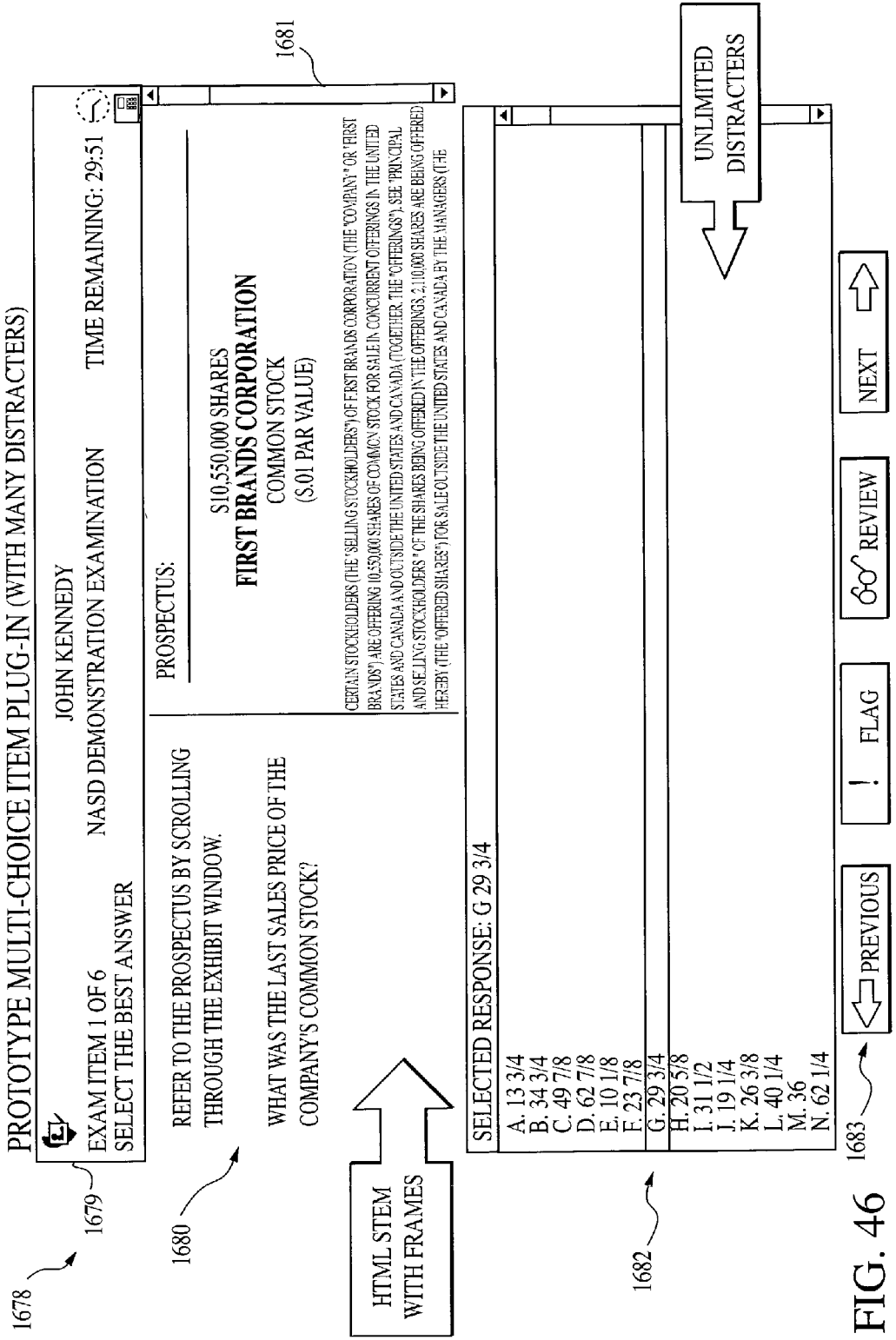
FIG. 46 is an example of a presentation of a multiple choice item using HTML with frames and unlimited distractors created according to the present invention.

FIG. 46 shows a multi-choice item that utilizes scrollbars. Presentation 1678 has title area 1679, scenario area 1680, item area 1682, and helm area 1683. Title area 1679 contains display plugins 152 that present various information about the examinee and the test. Scenario area 1680 uses a variety of display plugins 152 to display a prompt, "Select the best answer," and a calculator rendered using an "URI" attribute. Scenario area 1674 also presents a stem that uses scrollbar 1681 to enable the examinee to view the entire text of the question. Item area 1682 contains an item plugin 156 that presents a large number of distracters using scrolling list. Helm area 1683 contains a helm plugin 154 that provides a variety of test navigation controls.

FIG. 47 shows a "fill-in-the-blank" type item that requires the examinee to manipulate an active Excel spreadsheet. Presentation 1684 has title area 1685, display area 1686, item area 1687, and helm area 1688. Title area 1685 contains display plugins 152 that present various information about the examinee and the test. Display area 1686 uses a display plugins 152 to display two prompts and a calculator rendered using an "URI" attribute. Item area 1687 uses a "URI" attribute to define a moniker link to an active Excel spreadsheet stored within exam resource file 120. The spreadsheet is fully embedded as an Active Document object and is fully controlled by test driver 110. Helm area 1688 contains a helm plugin 154 that provides a variety of test navigation controls.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

What is claimed is:

1. A system for computer based testing for at least one test, the at least one test having a customizable presentation format and data content, stored in a computer readable media comprising:
   a test driver that delivers the at least one test to an examinee using a display device and controls progression of the at least one test;
   a template module, in operative data communication with the test driver, that stores in a computer readable medium customizable presentation format information comprising the customizable presentation format of the at least one test, the customizable presentation format information being accessible to the test driver;
   a data module, in operative data communication with the test driver and the template module, that stores in a computer readable medium data content information comprising the data content of the at least one test, the data content information being accessible to the test driver; and
   the test driver combining the customizable presentation format information with the data content information to create the customizable presentation format and the data content of the at least one test, wherein the combining by the test driver comprises rendering a first customizable presentation format and a first data content and rendering a separately defined second customizable presentation format and second data content, wherein the separately defined second customizable presentation format and second data content provide separate formatting and functionality with respect to the first customizable presentation format and the first data content, while being rendered by the test driver for delivery to the examinee.

2. The system of claim 1, wherein the data module comprises a plug-in.

3. The system of claim 1, wherein the customizable presentation format information segments the display device into a predetermined number of areas in a predetermined arrangement.

4. The system of claim 3, wherein the template module further comprises the predetermined number of areas in the predetermined arrangement.

5. The system of claim 3, wherein the data content stored in the data module combines with at least one of the predetermined number of areas to create the presentation format and data content of the at least one test.

6. The system of claim 1, wherein the data content information stored in the data module comprises at least one of non-interactive display material, test navigation controls, and items.

7. The system of claim 6, wherein the customizable presentation format information segments the display device into a predetermined number of areas in a predetermined arrangement, and wherein the data content information combines with the predetermined number of areas such that the non-interactive display material, the test navigation controls, and the items comprise separate ones of the predetermined number of areas.

8. The system of claim 1, wherein the data content information and the customizable presentation format information are combined using active document technology.

9. The system of claim 1, wherein the data content information further comprises a visual component and a properties component, and wherein the visual component determines a customizable visual aspect of the data content, and wherein the properties component determines an attribute component of the data content.

10. The system of claim 9, wherein the customizable visual component of the data content information comprises hypertext markup language.

11. The system of claim 10, wherein the customizable visual component references additional visual information using a browser pluggable protocol.

12. The system of claim 10, wherein the customizable visual component of the data content information is capable of accessing the properties component of the data content information such that the test driver is capable of presenting up-to-date information regarding the at least one test to the examinee and the progression of the at least one test is capable of being visually tracked by the examinee.

13. The system of claim 9, wherein the customizable visual component of the data content information is capable of referencing additional visual information that is not stored within the data module.

14. The system of claim 13, wherein the customizable visual component of the data content information references the additional visual information using monikers.

15. The system of claim 13, wherein the additional visual information comprises multimedia data.

16. The system of claim 9, wherein the properties component of the data content is defined using extensible markup language.

17. The system of claim 1, further comprising a function interface that enables communication between the test driver and the data module, wherein the function interface enables the test driver to load core object references into the data module at a start of a test delivery cycle and to unload the core object references from the data module at a completion of the test delivery cycle.

18. The system of claim 1, further comprising a feature interface that enables the test driver to instruct the data module to combine the data content information stored in the data module with the customizable presentation format information stored in the template module.

19. The system of claim 18, wherein the feature interface comprises a component object model interface.

20. The system of claim 18, further comprising a combine function interface that enables the data content stored in the data module to combine with the customizable presentation format information stored in the template module and displayed on the display device.

21. The system of claim 20, further comprising a notification interface that enables the data module to notify the test driver that the data module has successfully combined the data content information stored in the data module with the customizable presentation format information stored in the template module.

22. The system of claim 1, further comprising a navigate notification interface that enables the test driver to receive a request from the examinee to progress through the at least one test.

23. The system of claim 22, wherein the data content information comprises a plurality of items, the items comprising at least one test question, further comprising a feature interface that enables the test driver to determine whether the examinee has completed the at least one test question such that the examinee is authorized to progress through the at least one test.

24. The system of claim 22, further comprising a navigation interface that enables the test driver to control the progression of the at least one test.

25. The system of claim 24, further comprising a section interface that enables the test driver to identify a subsequent section of the at least one test to which the at least one test should progress after receiving a request from the examinee to progress through the at least one test.

26. The system of claim 1, further comprising a resource file, in operative data communication with the template module and the data module, the resource file storing the data content information and progression information relating to the progression of the at least one test, the data content information being accessible to the data module.

27. The system of claim 26, wherein the template module is stored within the resource file such that the resource file stores the customizable presentation format information of the at least one test.

28. The system of claim 26, wherein the resource file comprises a structure storage database, and wherein the template module is stored as an object within the resource file.

29. The system of claim 26, wherein the data content information and the progression information of the at least one test comprise extensible markup language format.

30. The system of claim 29, wherein the template module is stored within the resource file, such that the resource file stores the customizable presentation format information, and the template module comprises extensible markup language format.

31. The system of claim 26, wherein the data module retrieves the data content information from the resource file.

32. The system of claim 31, wherein the data content information stored in the resource file further comprises a visual aspect component that determines a visual aspect of the data content.

33. The system of claim 31, wherein the customizable visual component of the data content information is capable of referencing additional visual information, and wherein the additional visual information is stored in the resource file.

34. The system of claim 33, wherein the customizable visual component of the data content information references the additional visual information stored in the resource file using monikers.

35. The system of claim 33, wherein the additional visual information comprises multimedia data.

36. The system of claim 26, further comprising a resource persistence interface that enables communication between the data module and the resource file such that the data module is capable of retrieving the data content information from the resource file.

37. The system of claim 1, further comprising an instance file in operative data communication with the test driver and the data module, the instance file storing examination state information comprising responses provided by the examinee to items presented to the examinee during the at least one test.

38. The system of claim 37, wherein the instance file comprises a structure storage database.

39. The system of claim 37, further comprising an instance persistence interface that enables communication between the data module and the instance file such that the data module is capable of storing the examination state information to the instance file and retrieve the examination from the instance file, wherein, if the at least one test is interrupted, the data module is capable of retrieving the examination state information that was provided by the examinee before the at least one test was interrupted, combine the retrieved examination state information with the customizable presentation format information stored in the template module, and enable the examinee to continue with the at least one test in situ.

40. The system of claim 39, further comprising:
a resource file in operative data communication with the template module and the data module, the resource file storing the customizable presentation format information, the data content information, and progression information relating to the progression of the at least one test; and
a resource persistence interface that enables communication between the data module and the resource file such that the data module is capable of retrieving the data content information from the resource file, wherein, if the at least one test is interrupted, the data module is capable of retrieving the data content information of the at least one test, combine the data content information retrieved from the data module with the customizable presentation format information stored in the template module, and enable the examinee to continue with the at least one test in situ.

41. The system of claim 40, wherein the template module is stored within the resource file.

42. The system of claim 1, wherein a portion of the customizable presentation format information is overridden by another portion of the customizable presentation format information using amalgamation.

43. The system of claim 1, wherein the customizable presentation format information and the data content information is arranged in a hierarchy.

44. A system for computer based testing for at least one test, the at least one test having a customizable presentation format and data content, stored in a computer readable media comprising:
a test driver that delivers the at least one test to an examinee using a display device and controls progression of the at least one test;
a template module, in operative data communication with the test driver, that stores in a computer readable medium customizable presentation format information comprising the customizable presentation format of the at least one test, the customizable presentation format information being accessible to the test driver;
a data module, in operative data communication with the test driver and the template module, that stores in a computer readable medium data content information comprising the data content of the at least one test, the data content information being accessible to the test driver;
the test driver combining the data content information with the customizable presentation format information to create the customizable presentation format and data content of the at least one test, wherein a portion of the customizable presentation format information is overridden by the data content information using amalgamation as the customizable presentation format is changed to receive the data content information during the combining by the test driver;
a resource file, in operative data communication with the template module and the data module, that stores in a computer readable medium the progression of the at least one test, the resource file providing the customizable presentation format information to the template module and providing the data content information to the data module and;
an instance file in operative data communication with the test driver and the data module, the instance file storing in a computer readable medium examination state information comprising responses provided by the examinee to items presented to the examinee during the at least one test.

45. The system of claim 44, wherein the template module further comprises a predetermined number of areas in a predetermined arrangement, wherein:

the customizable presentation format information segments the display device into the predetermined number of areas in the predetermined arrangement;

the data content information combines with at least one of the predetermined number of areas using active document technology to create the customizable presentation format and data content of the at least one test, the data content information being one of non-interactive display material, test navigation control, and items; and the data content information combines with the predetermined number of area such that the non-interactive display material, the test navigation control, and the items comprise separate ones of the predetermined number of areas.

46. The system of claim 44, wherein customizable presentation format is nested in providing the at least one test.

47. A system for computer based testing for at least one test, the at least one test having a customizable presentation format and data content, stored in a computer readable media comprising:

a test driver that delivers the at least one test to an examinee using a display device and controls progression of the at least one test;

a template module, in operative data communication with the test driver, that stores in a computer readable medium customizable presentation format information comprising the customizable presentation format of the at least one test, the customizable presentation format information dividing the display device into a predetermined number of areas in a predetermined arrangement, the customizable presentation format information being accessible to the test driver; and a first data module, in operative data communication with the test driver and the template module, that stores in a computer readable medium first information comprising non-interactive display material of the at least one test, the first information being accessible to the test driver;

a second data module, in operative data communication with the test driver and the template module, that stores in a computer readable medium second information comprising test navigation controls of the at least one test, the second information being accessible to the test driver;

a third data module, in operative data communication with the test driver and the template module, that stores in a computer readable medium third information comprising items of the at least one test, the third information being accessible to the test driver; and the test driver combines the first information, the second information, and the third information with the customizable presentation format information to create the customizable presentation format and data content of the at least one test, wherein the customizable presentation format information and the data content information is arranged in a hierarchy where the hierarchy defines how the data content information appears when displayed after being combined with the customizable presentation format information.

48. A system for computer based testing for at least one test, the at least one test having a customizable presentation format and data content, stored in a computer readable media comprising:

test driver means for delivering the at least one test to an examinee using a display device and controlling progression of the at least one test;

template means, in operative data communication with the test driver means, for storing customizable presentation format information comprising the customizable presentation format of the at least one test, the customizable presentation format information being accessible to the test driver means; and data storage means, in operative data communication with the test driver means and the template means, for storing data content information regarding the data content of the at least one test, the data content information being accessible to the test driver means, the test driver means combining the data content information with the customizable presentation format information to create the customizable presentation format and data content of the at least one test, wherein the combining by the test driver means comprises rendering a first customizable presentation format and first data content and rendering a separately defined second customizable presentation format and second data content, wherein the separately defined second customizable presentation format and second data content provide separate formatting and functionality than the first customizable presentation format and the first data content, while being rendered by the test driver means for delivery to the examinee.

49. A system for computer based testing for at least one test, the test having a presentation format and data content, stored in a computer readable media comprising:

a test driver that delivers the at least one test to an examinee using a display device and controls progression of the test;

a template module, in operative data communication with the test driver, that stores in a computer readable medium customizable presentation format information comprising the customizable presentation format of the test, the customizable presentation format information accessible to the test driver, wherein a portion of the customizable presentation format information is overridden by another portion of the customizable presentation format information using amalgamation;

a data module, in operative data communication with the test driver, that stores in a computer readable medium data content information comprising the data content of the test, the data content information accessible to the test driver; and a presentation module, in operative data communication with the test driver, the template module, and the data content module, that stores in a computer readable medium customizable presentation information determining what is seen by the examinee on the display device during delivery of the at least one test, wherein the customizable presentation information is defined by combining the customizable presentation format information and the data content information to deliver the at least one test where a portion of the customizable presentation format information is overridden by the data content information using amalgamation as the customizable presentation format is changed to receive the data content during the combining process.

50. A method for computer based testing for at least one test, the at least one test having a customizable presentation format and data content, the at least one test being controlled by a test driver, which delivers the at least one test to an examinee using a display device and controls progression of the at least one test, the method comprising steps of:

retrieving customizable presentation format information comprising the customizable presentation format of the at least one test from a template module, the customizable presentation format information dividing the display device into a predetermined number of areas in a predetermined arrangement;

retrieving data content information comprising the data content of the at least one test from a data module;

combining for delivery to the examinee the customizable presentation format information and the data content information to create the customizable presentation format and data content of the at least one test, wherein the customizable presentation format information and the data content information is arranged in a hierarchy where the hierarchy defines how the data content information appears when displayed after being combined with the customizable presentation format information; and delivering on the display device the at least one test.

51. The method of claim 50, wherein the data content information stored in the data module combines with at least one of the predetermined number of areas to create the customizable presentation format and data content of the at least one test.

52. The method of claim 50, wherein the data content information stored in the data module comprises at least one of non-interactive display material, test navigation controls, and items.

53. The method of claim 52, wherein the data content information combines with the predetermined number of areas such that the non-interactive display material, the test navigation controls, and the items comprise separate ones of the predetermined number of areas.

54. The method of claim 50, wherein the data content information and the customizable presentation format information are combined using active document technology.

55. The method of claim 50, further comprising the step of notifying the test driver to create a presentation by combining the customizable presentation format information stored in the template module with the data content information stored in the data module, wherein the presentation is what is seen by the examinee on the display device at a particular instance during the at least one test.

56. The method of claim 55, wherein the test driver is notified to create the presentation when the examinee requests to progress through the at least one test by activating a navigation control interface.

57. The method of claim 50, further comprising the step of loading core object references from the test driver into the data module at a start of a test delivery cycle.

58. The method of claim 50, wherein the data content information is stored in a resource file, further comprising the step of loading the data content information from the resource file into the data module.

59. The method of claim 50, retrieving the data content information from the data module further comprising the step of notifying the data module that a new presentation is being created using a feature interface, wherein the presentation is what is seen by the examinee on the display device at a particular instance during the at least one test, and wherein the presentation is created by combining the customizable presentation formation information and the data content information.

60. The method of claim 59, wherein the data content information comprises at least one of non-interactive display material, test navigation controls, and items and the feature interface enables the test driver to notify the data module that a particular one of the non-interactive display material, the test navigation controls, and the items is to be combined with the customizable presentation format information.

61. The method of claim 50, further comprising the step of notifying the test driver that the data content information in the data module has successfully combined with the customizable presentation format information in the template module.

62. The method of claim 50, further comprising the step of loading examination state information from an instance file into the data module, wherein the examination state information includes responses provided by the examinee to items presented to the examinee during the at least one test, and wherein, if the at least one test is interrupted, the data module is capable of retrieving the examination state information that was provided by the examinee before the at least one test was interrupted, combine the combine the retrieved examination state information with the customizable presentation format information stored in the template module, and enable the examinee to continue with the at least one test in situ.

63. The method of claim 62, further comprising the steps of:

sending an inquiry to the data module to determine whether the data module is storing the examination state information; and saving the examination state information from the data module to the instance file, wherein the data module is capable of subsequently loading the examination state information from the instance file if the at least one test is interrupted.

64. The method of claim 62, wherein the data content information is stored in a resource file, further comprising the step of loading the data content information from the resource file into the data module, wherein, if the at least one test is interrupted, the data module is capable of retrieving the data content information, combine the retrieved data content information with the customizable presentation format information stored in the template module, and enable the examinee to continue with the at least one test in situ.

65. The method of claim 50, further comprising the step of notifying the test driver to deactivate a current presentation by separating the data content information from the customizable presentation format information, wherein the current presentation is what is then currently seen by the examinee on the display device at a particular instance during the at least one test.

66. The method of claim 65, wherein the at least one test driver is notified to deactivate the current presentation when the examinee requests when the examinee requests to progress through the at least one test by activating a navigation control interface.

67. The method of claim 65, wherein the data content information stored in the data module comprises a plurality of items, the items comprising at least one test question, further comprising the step of sending a request to the data module to determine whether the examinee has completed the at least one test question such that the examinee is authorized to progress through the at least one test.

68. The method of claim 65, further comprising the steps of:
identifying a subsequent section of the at least one test to which the at least one test should progress; and
navigating to the subsequent section of the at least one test if the examinee has completed the at least one test question.

69. The method of claim 50, further comprising the step of unloading core object references from the data module into the test driver at a completion of a test delivery cycle.

* * * * *